Sept. 11, 1951 G. DEAKIN 2,567,190

TELEPHONE EXCHANGE SYSTEM

Filed May 14, 1945 28 Sheets-Sheet 1

INVENTOR.
Gerald Deakin

BY R. J. Perry

AGENT

INVENTOR.
Gerald Deakin
BY R. J. Perry
AGENT

INVENTOR.
Gerald Deakin
BY R. J. Perry
AGENT

INVENTOR.
Gerald Deakin
BY
R. J. Perry
AGENT

Sept. 11, 1951 G. DEAKIN 2,567,190

TELEPHONE EXCHANGE SYSTEM

Filed May 14, 1945 28 Sheets-Sheet 5

INVENTOR.
Gerald Deakin
BY
R. J. Perry
AGENT

Sept. 11, 1951 G. DEAKIN 2,567,190

TELEPHONE EXCHANGE SYSTEM

Filed May 14, 1945 28 Sheets-Sheet 6

INVENTOR.
Gerald Deakin
BY
[signature]
AGENT

Sept. 11, 1951 G. DEAKIN 2,567,190

TELEPHONE EXCHANGE SYSTEM

Filed May 14, 1945 28 Sheets-Sheet 7

INVENTOR
Gerald Deakin
BY [signature]
AGENT

INVENTOR
Gerald Deakin
BY
R. J. Perry
AGENT

Sept. 11, 1951 G. DEAKIN 2,567,190

TELEPHONE EXCHANGE SYSTEM

Filed May 14, 1945 28 Sheets-Sheet 9

INVENTOR.
Gerald Deakin

BY

AGENT

INVENTOR
*Gerald Deakin*
BY *R. J. Berry*
AGENT

Sept. 11, 1951

G. DEAKIN 2,567,190

TELEPHONE EXCHANGE SYSTEM

Filed May 14, 1945

28 Sheets-Sheet 11

INVENTOR
GERALD DEAKIN
BY [signature]
AGENT

Sept. 11, 1951 G. DEAKIN 2,567,190

TELEPHONE EXCHANGE SYSTEM

Filed May 14, 1945

28 Sheets-Sheet 12

INVENTOR.
GERALD DEAKIN
BY R. J. Perry
AGENT

Sept. 11, 1951 G. DEAKIN 2,567,190
TELEPHONE EXCHANGE SYSTEM
Filed May 14, 1945 28 Sheets-Sheet 13
Fig. 11. G5R3 OPERATED
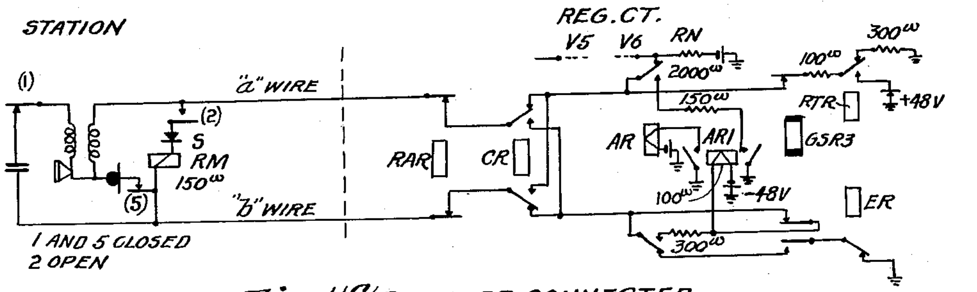
Fig. 11a. REGISTER CONNECTED
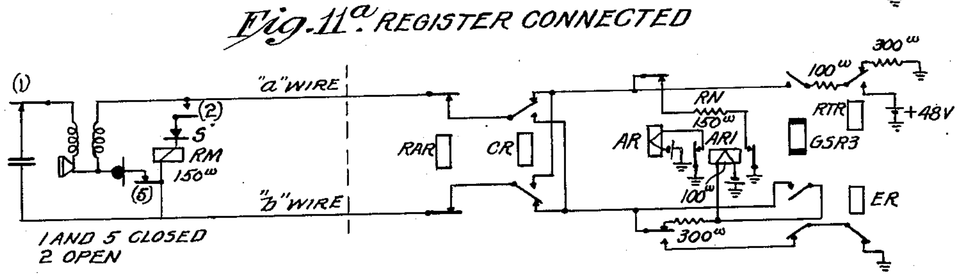
Fig. 11b. KEYING DIGIT 6 TO 0
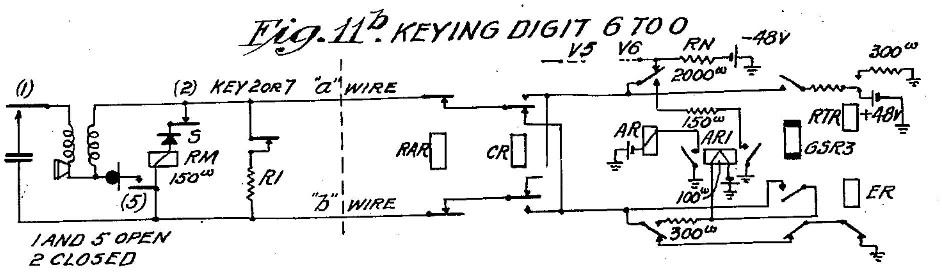
Fig. 11c. REGISTER RELEASES KEY
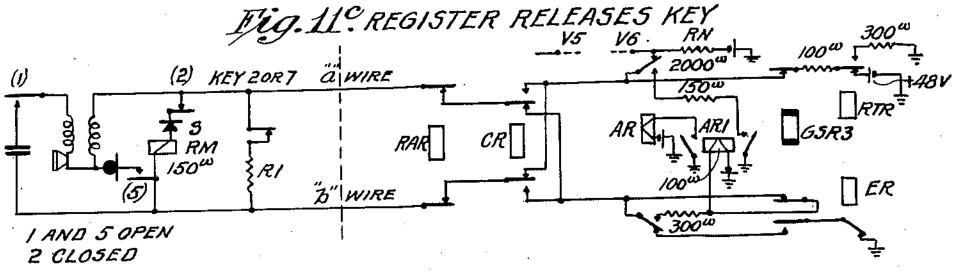
INVENTOR.
Gerald Deakin
BY [signature]
AGENT Sept. 11, 1951 G. DEAKIN 2,567,190

TELEPHONE EXCHANGE SYSTEM

Filed May 14, 1945 28 Sheets-Sheet 14

INVENTOR
Gerald Deakin
BY [signature]
AGENT

Sept. 11, 1951 G. DEAKIN 2,567,190

TELEPHONE EXCHANGE SYSTEM

Filed May 14, 1945 28 Sheets-Sheet 15

INVENTOR
Gerald Deakin
BY R. J. Perry
AGENT

Sept. 11, 1951 G. DEAKIN 2,567,190

TELEPHONE EXCHANGE SYSTEM

Filed May 14, 1945 28 Sheets-Sheet 16

INVENTOR.
Gerald Deakin
BY [signature]
AGENT

Sept. 11, 1951 G. DEAKIN 2,567,190

TELEPHONE EXCHANGE SYSTEM

Filed May 14, 1945 28 Sheets-Sheet 17

NOTE:
NUMBERING FACING SELECTOR ON "LEFT" SIDE OF BAY
NUMBERING FACING SELECTOR ON "RIGHT" SIDE IS THE REVERSE.
LEFT SIDE OF BAY HAS VERTICAL SHAFT AT LEFT
"B" AND "T" TERMINALS STRAPPED AT "TENS" POSITIONS

BANK CHART
FOR FINAL SELECTOR.

INVENTOR
Gerald Deakin
BY R. J. Perry
AGENT

Sept. 11, 1951

G. DEAKIN 2,567,190

TELEPHONE EXCHANGE SYSTEM

Filed May 14, 1945

28 Sheets-Sheet 18

INVENTOR.
Gerald Deakin

BY

AGENT

Fig. 16.

ASSIGNMENT OF BATTERY TEST POTENTIALS

| POSITIVE | | | NEGATIVE | |
|---|---|---|---|---|
| NAME | USE | VOLTS | NAME | USE |
| PN 1 | DIGIT 1 | 2 | PT 1 | "TENS" DIGIT 1 |
| PN 2 | DIGIT 2 | 4 | PT 2 | "TENS" DIGIT 2 |
| PN 3 | DIGIT 3 | 6 | PT 3 | "TENS" DIGIT 3 |
| PN 4 | DIGIT 4 | 8 | PT 4 | "TENS" DIGIT 4 |
| PN 5 | DIGIT 5 | 10 | PT 5 | "TENS" DIGIT 5 |
| PN 6 | DIGIT 6 | 12 | PT 6 | "TENS" DIGIT 6 |
| PN 7 | DIGIT 7 | 14 | PT 7 | "TENS" DIGIT 7 |
| PN 8 | DIGIT 8 | 16 | PT 8 | "TENS" DIGIT 8 |
| PN 9 | DIGIT 9 | 18 | PT 9 | "TENS" DIGIT 9 |
| PN 0 | DIGIT 0 | 20 | PT 0 | "TENS" DIGIT 0 |
| PC 1 | CALLING-UNRESTRICTED | 22 | | SPARE |
| PC 2 | CALLING-RESTRICTED | 24 | | SPARE |
| PC 3 | CALLING-FOR TRANSFER (TR) LINK | 26 | | SPARE |
| PC 4 | CALLING-FOR NIGHT SWITCHING (NS) LINK | 28 | | SPARE |
| | SPARE | 30 | | SPARE |
| PX 1 | SPECIAL-LOCAL TRUNK TO OPERATOR | 32 | | SPARE |
| PX 2 | SPECIAL-TIE LINE | 34 | | SPARE |
| PX 3 | SPECIAL-CONFERENCE CT. | 36 | | SPARE |
| PX 4 | SPECIAL-BROADCAST CALL CT. | 38 | | SPARE |
| | | 40 | | SPARE |
| | | 42 | | SPARE |
| | | 44 | | NOT AVAILABLE |
| | | 46 | | NOT AVAILABLE |
| AUXILIARY EXCHANGE BATTERY | | 48 | MAIN EXCHANGE BATTERY | |

Fig. 16a.

ASSIGNMENT OF NEGATIVE POTENTIOMETER POTENTIALS FOR KEYING

| NAME | VOLTS | USE |
|---|---|---|
| P1 | 29 | DIGITS 1 AND 6 |
| P2 | 26 | DIGITS 2 AND 7 |
| P3 | 23.5 | DIGITS 3 AND 8 |
| P4 | 21 | DIGITS 4 AND 9 |

INVENTOR
Gerald Deakin
BY R. J. Perry
AGENT

Sept. 11, 1951 G. DEAKIN 2,567,190

TELEPHONE EXCHANGE SYSTEM

Filed May 14, 1945 28 Sheets-Sheet 20

INVENTOR.
Gerald Deakin
BY [signature]
AGENT

Sept. 11, 1951 G. DEAKIN 2,567,190

TELEPHONE EXCHANGE SYSTEM

Filed May 14, 1945 28 Sheets-Sheet 21

INVENTOR.
GERALD DEAKIN
BY
[signature]
AGENT

NOTE 1
※ MAKES BEFORE "Ω" BREAKS
(NL) NON LOCKING
"f" LONG CHANGE OVER
NOTE 2 (10 BUTTON KEY)
(2) MAKES FIRST
(3) OPENS FOR AN INSTANT THEN (5) OPENS
(4) REVERSES ONLY WHEN ANY KEY 6 TO 0 IS DEPRESSED

INVENTOR
Gerald Deakin
BY R. J. Berry
AGENT

Sept. 11, 1951 G. DEAKIN 2,567,190

TELEPHONE EXCHANGE SYSTEM

Filed May 14, 1945 28 Sheets-Sheet 23

TRANSMISSION CIRCUIT

INVENTOR.
Gerald Deakin
BY R. J. Perry
AGENT

Sept. 11, 1951 G. DEAKIN 2,567,190

TELEPHONE EXCHANGE SYSTEM

Filed May 14, 1945 28 Sheets-Sheet 24

INVENTOR
Gerald Deakin
BY R. J. Perry
AGENT

Sept. 11, 1951 G. DEAKIN 2,567,190
TELEPHONE EXCHANGE SYSTEM
Filed May 14, 1945 28 Sheets-Sheet 25
Fig. 21. (STA. A CONNECTED TO TRUNK)
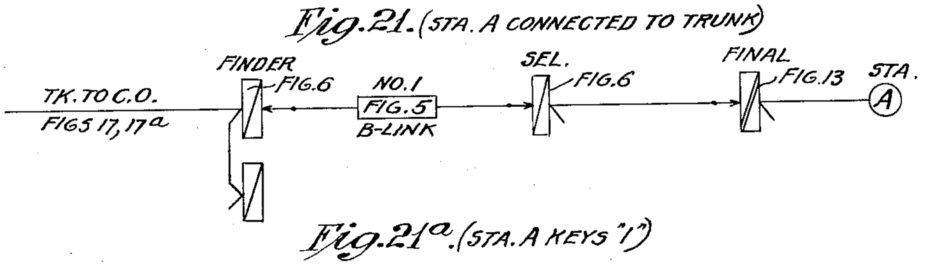
Fig. 21a. (STA. A KEYS "1")
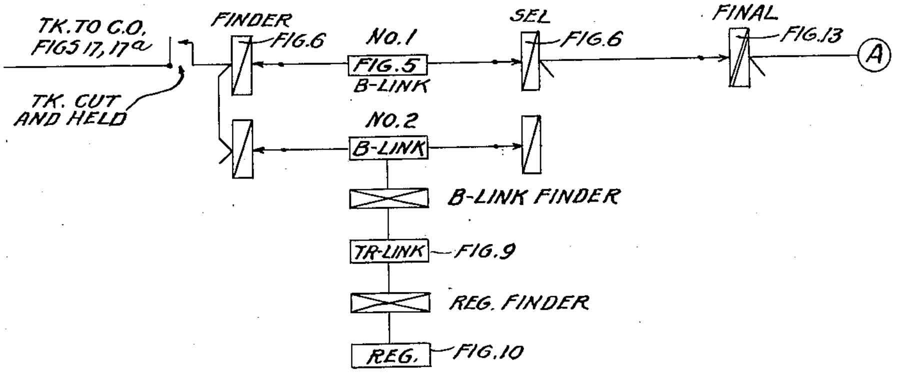
Fig. 21b. (STA. A TALKS TO STA. B)
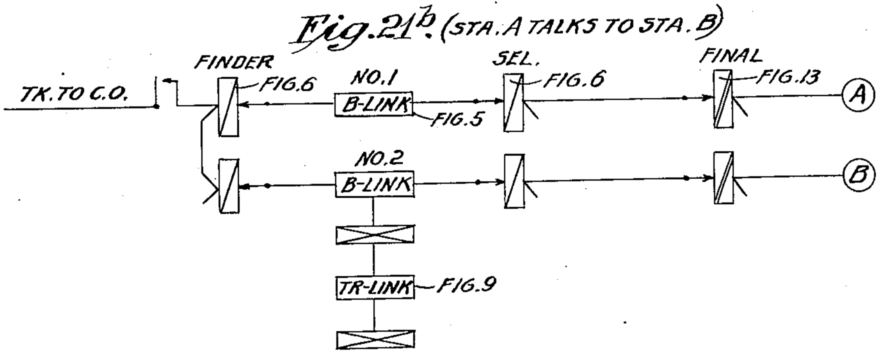
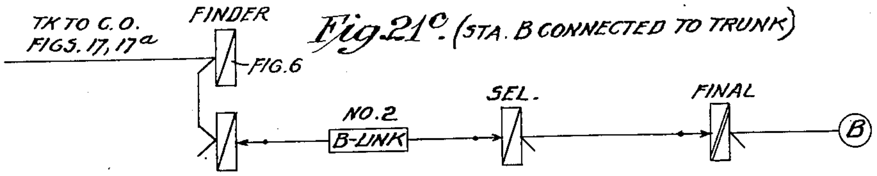
Fig. 21c. (STA. B CONNECTED TO TRUNK)
JUNCTION DIAGRAM
INFORMATION & TRANSFER CALLS
INVENTOR.
Gerald Deakin
BY [signature]
AGENT Sept. 11, 1951 G. DEAKIN 2,567,190

TELEPHONE EXCHANGE SYSTEM

Filed May 14, 1945 28 Sheets-Sheet 26

INVENTOR.
Gerald Deakin
BY [signature]
AGENT

Sept. 11, 1951 G. DEAKIN 2,567,190

TELEPHONE EXCHANGE SYSTEM

Filed May 14, 1945 28 Sheets-Sheet 27

INVENTOR.
GERALD DEAKIN

BY R. J. Perry

AGENT

Sept. 11, 1951 G. DEAKIN 2,567,190

TELEPHONE EXCHANGE SYSTEM

Filed May 14, 1945 28 Sheets-Sheet 28

INVENTOR.
GERALD DEAKIN
BY [signature]
AGENT

Patented Sept. 11, 1951 2,567,190

UNITED STATES PATENT OFFICE 2,567,190

TELEPHONE EXCHANGE SYSTEM

Gerald Deakin, New York, N. Y., assignor to International Standard Electric Corporation, New York, N. Y., a corporation of Delaware Application May 14, 1945, Serial No. 593,602

46 Claims. (Cl. 179—27)

This invention relates to new and useful improvements in telephone exchange systems.

While various features of the invention are applicable to telephone systems generally, they will be here disclosed and are particularly useful in private automatic branch exchanges (PABX).

The objects and features of the invention will be set forth after the description of the drawings in which.

Figure 10:
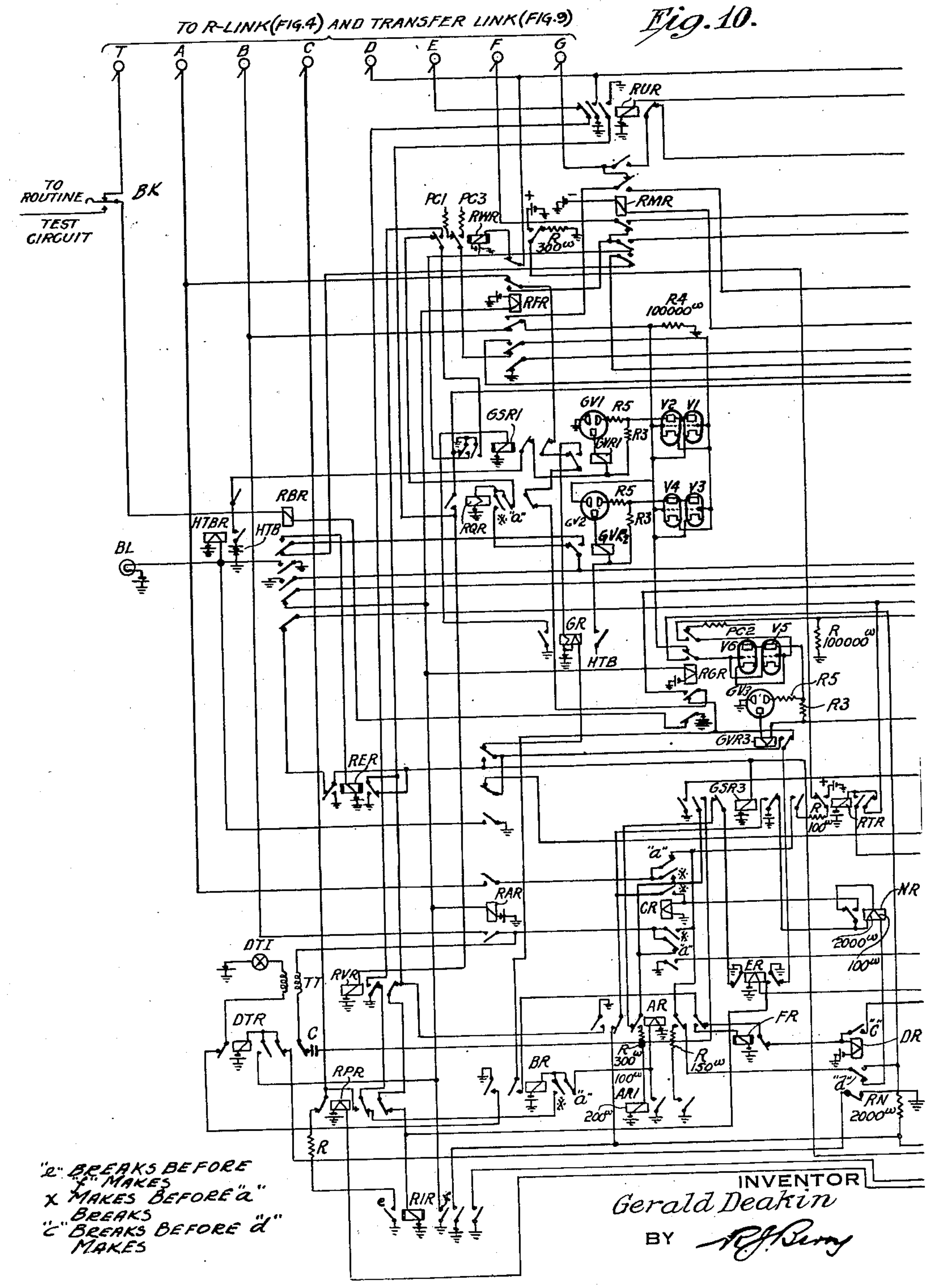
Figure 10A:
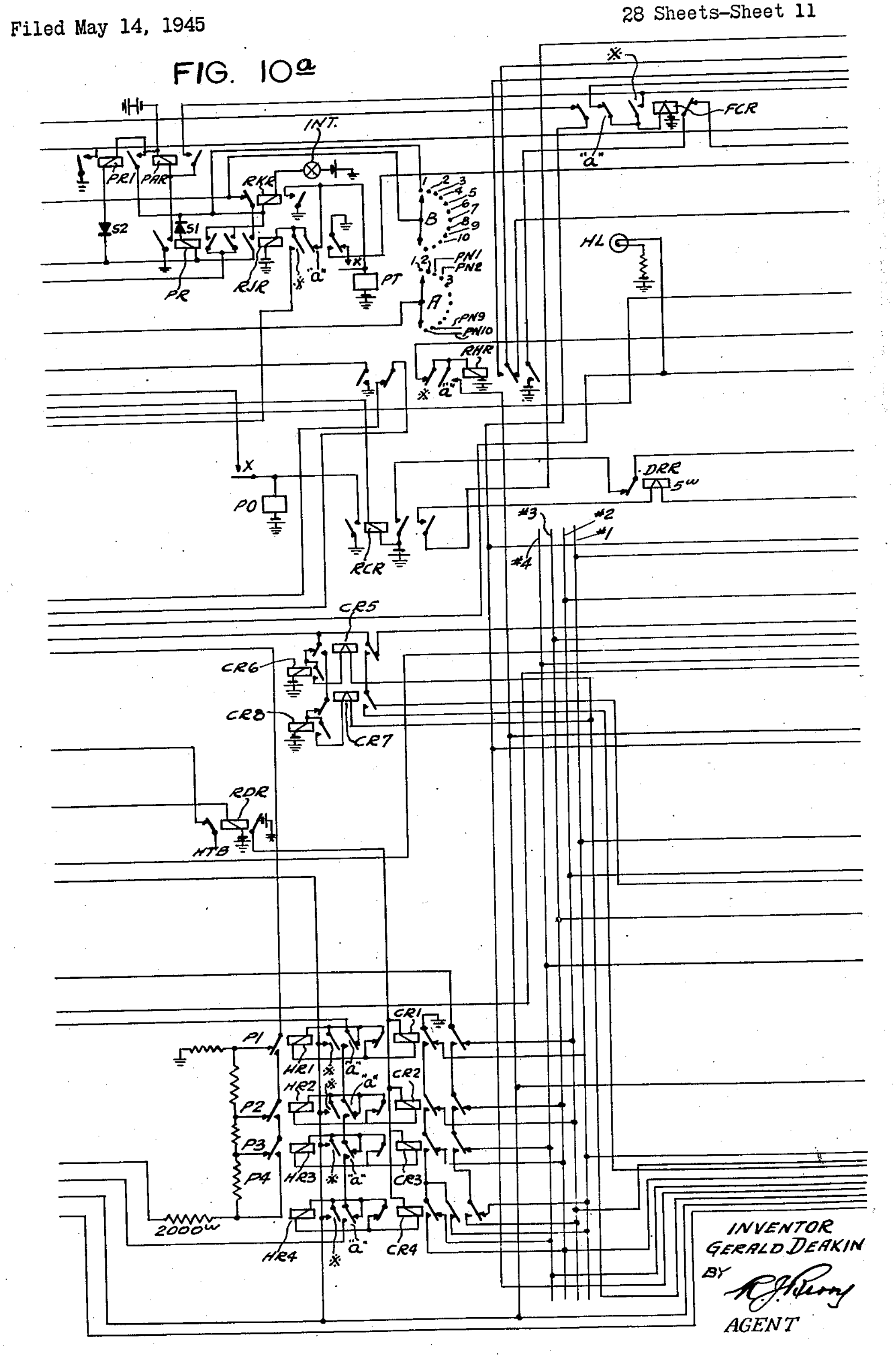
Figure 10B:
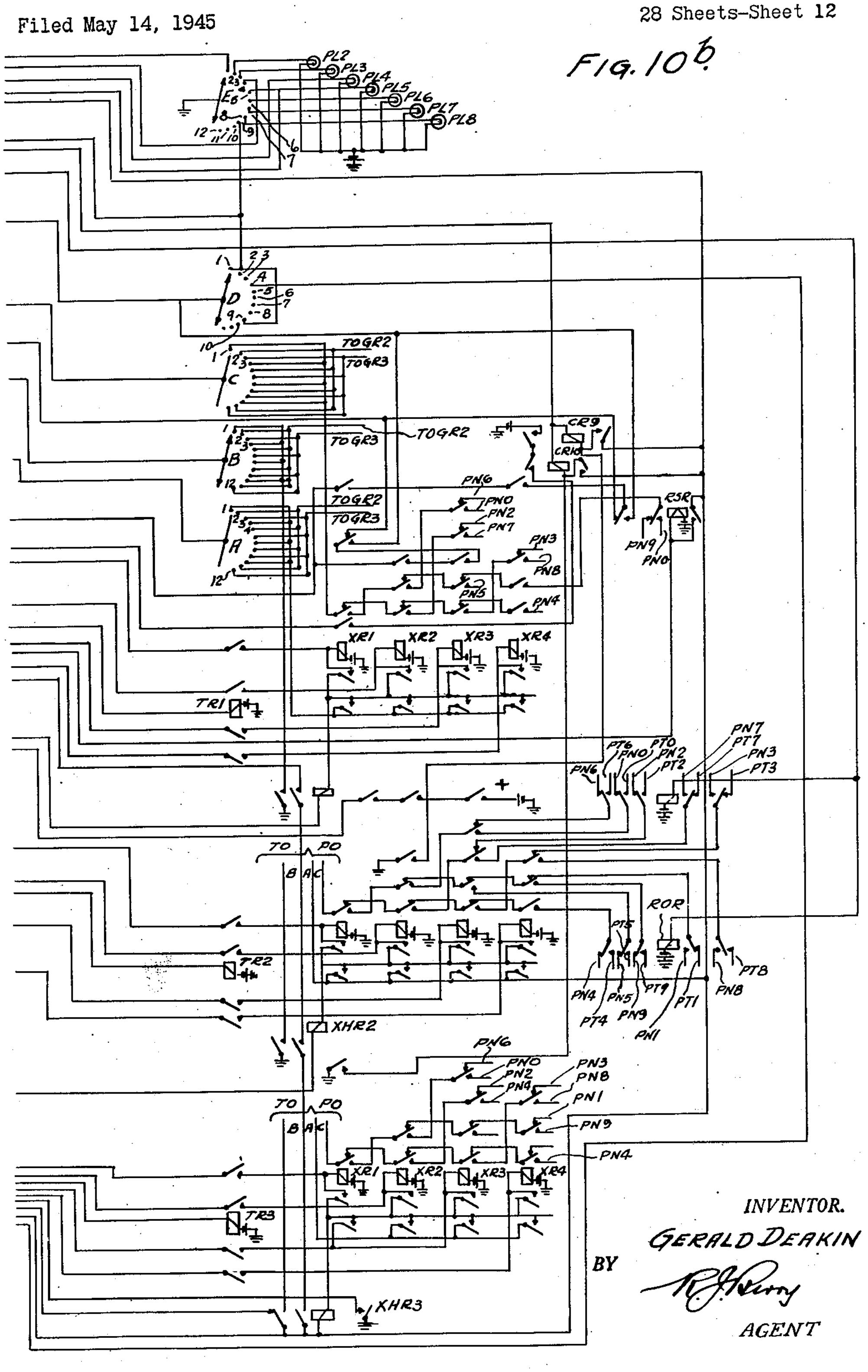
Figures 12, 12A, 12B:
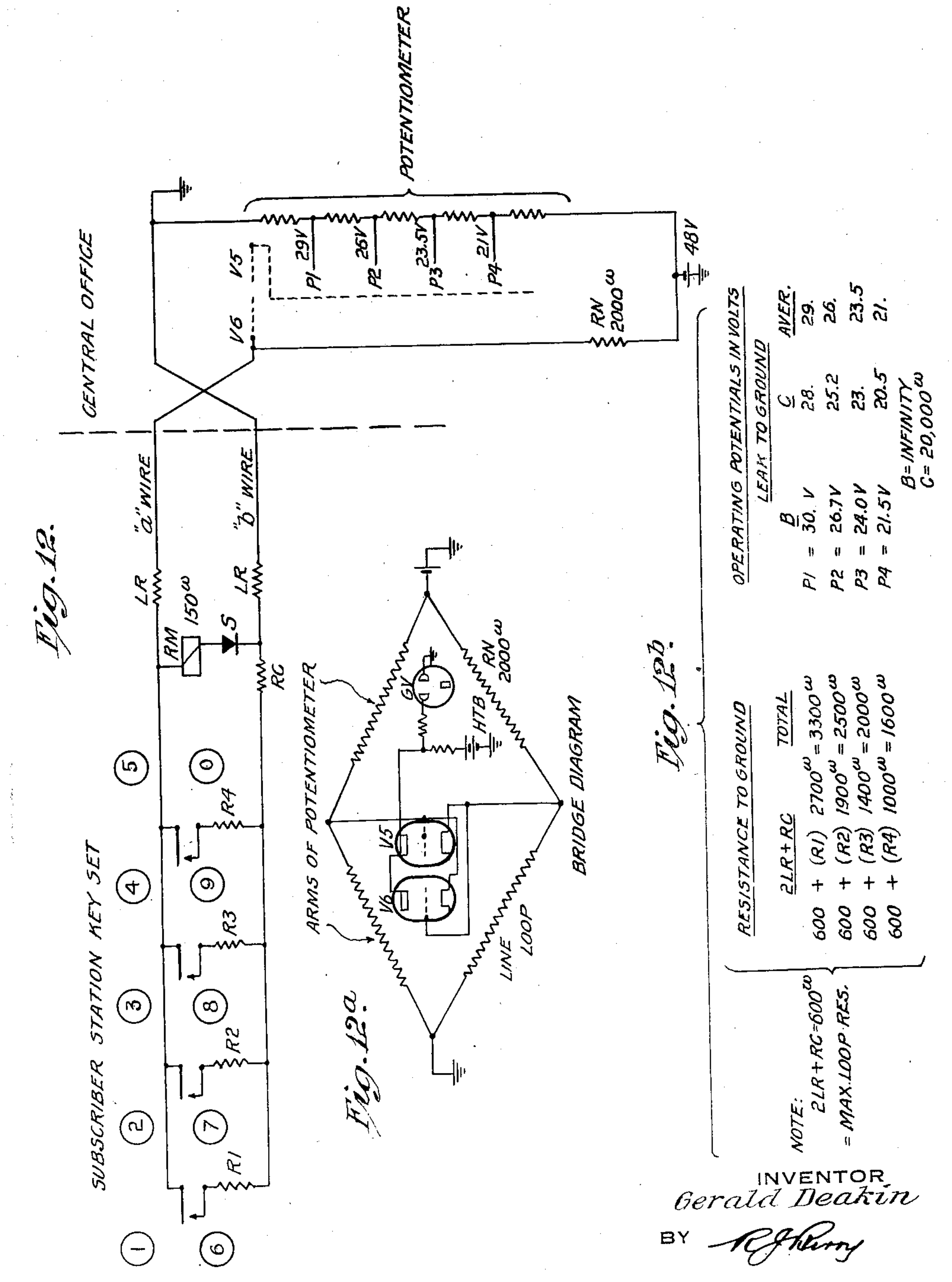
Figure 12C:
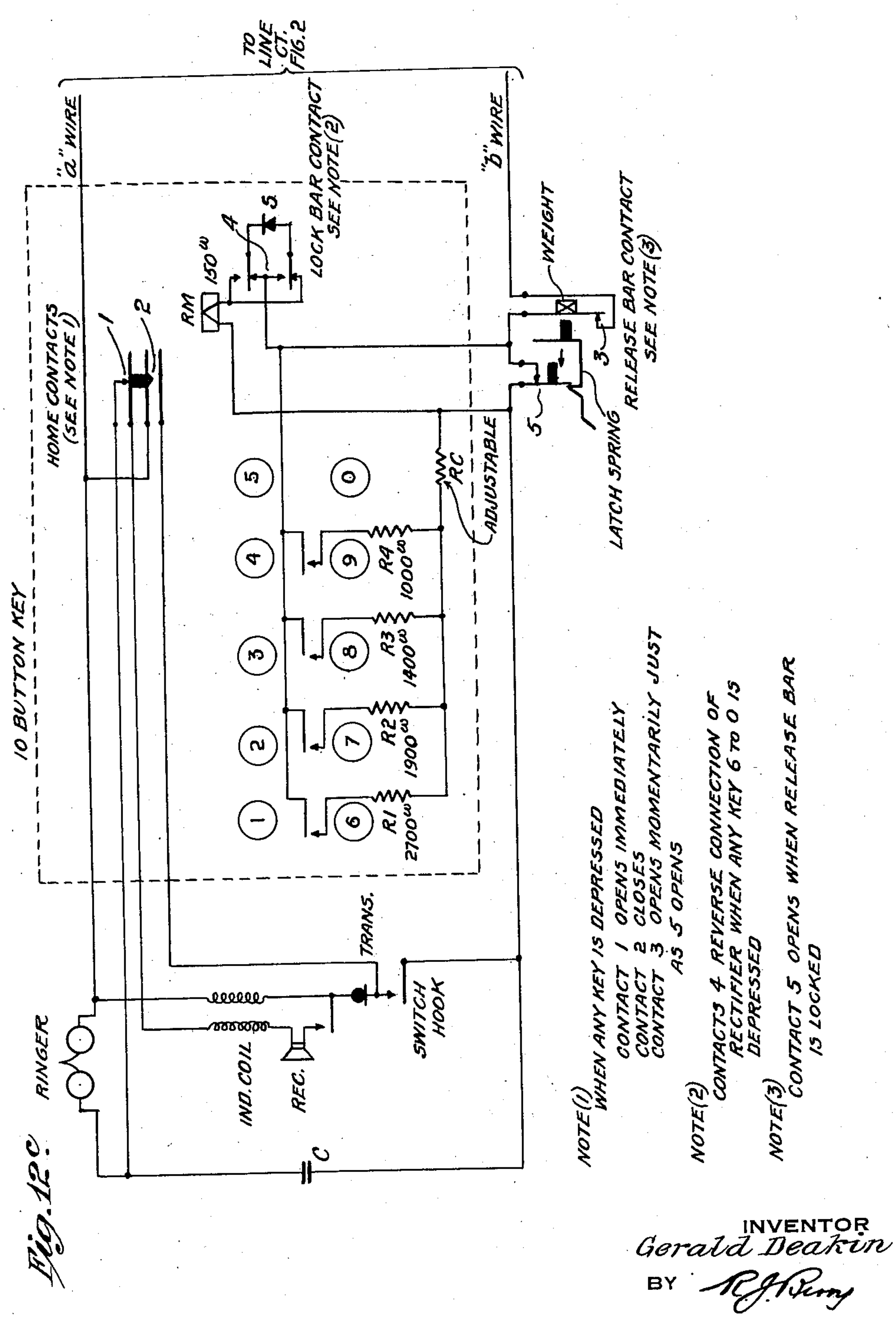
Figure 13:
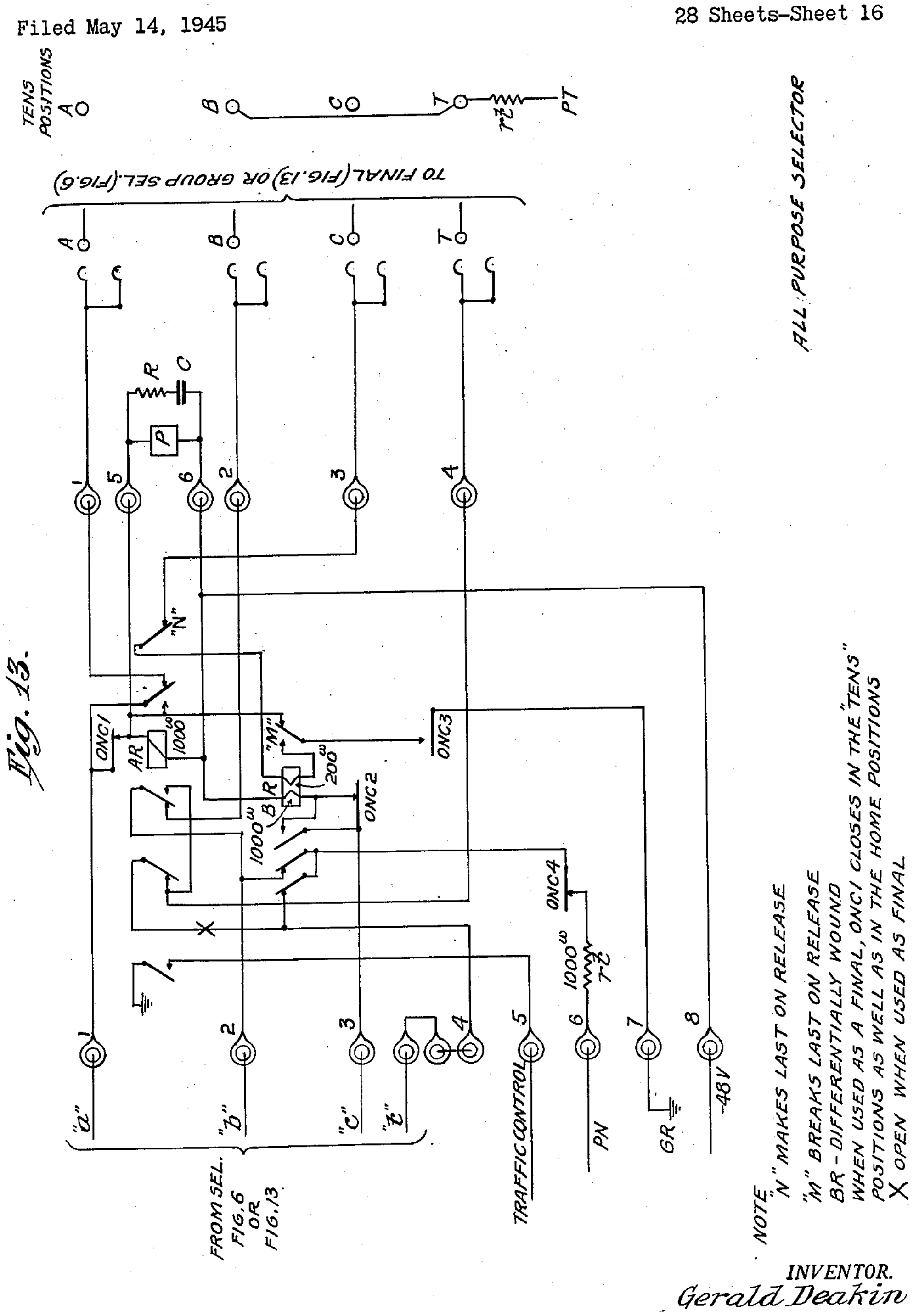
Figure 14:
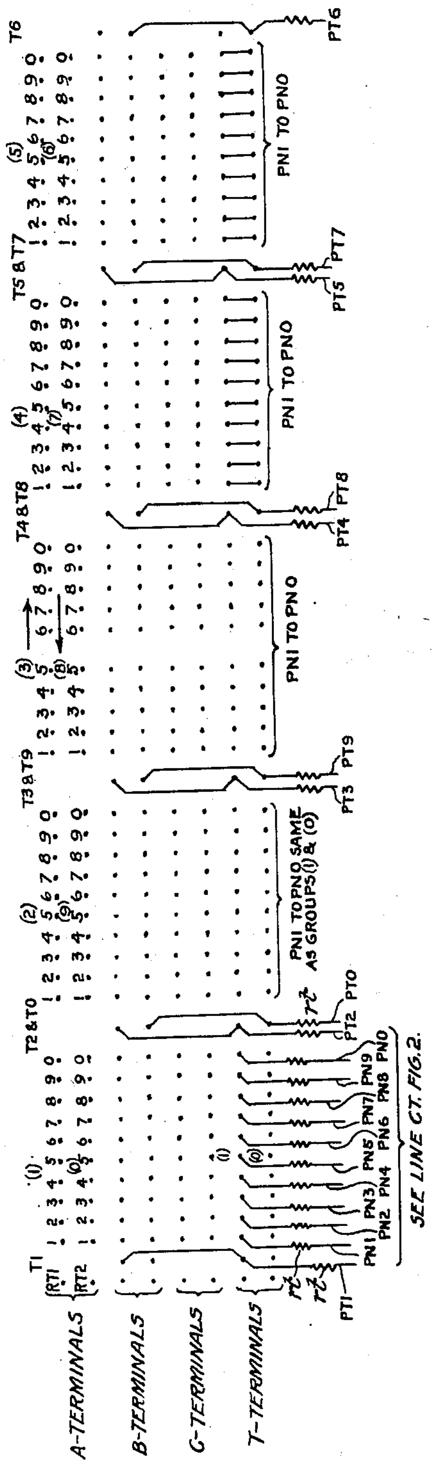
Figure 15:
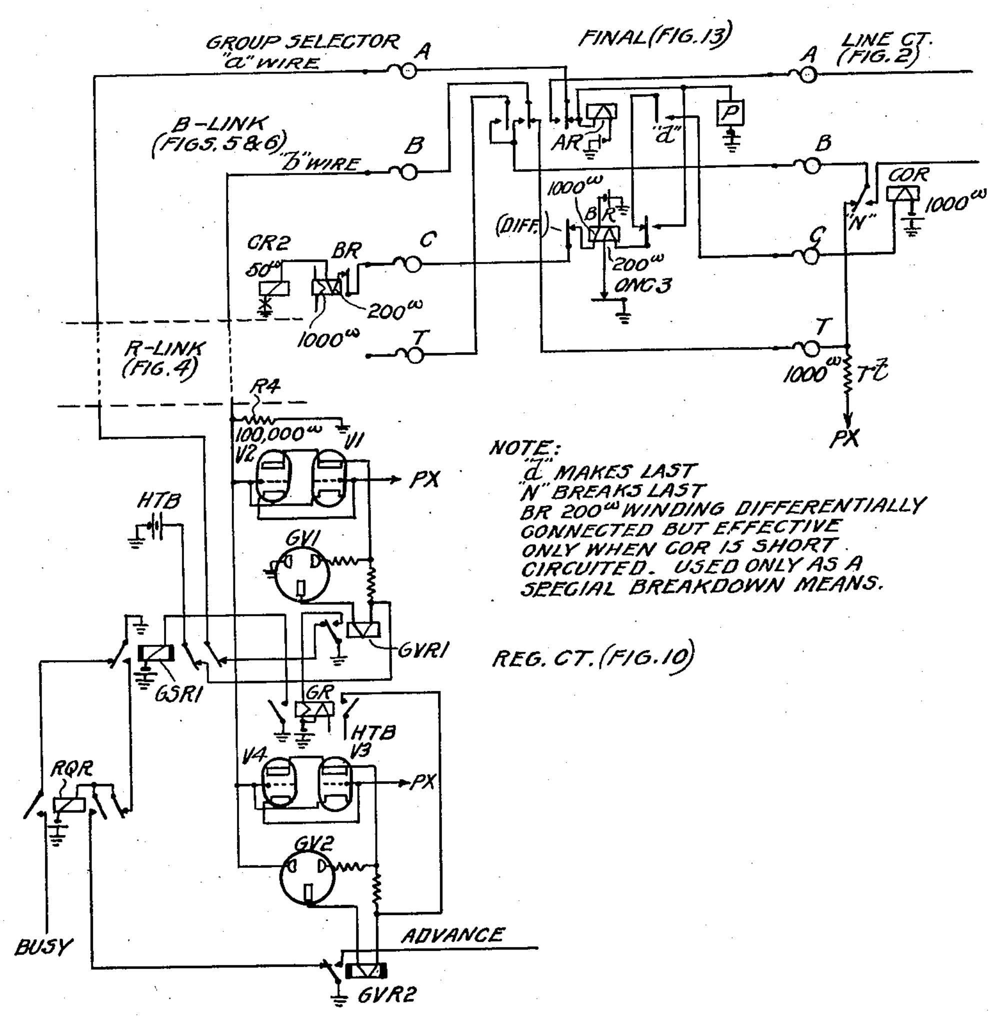
Figure 17:
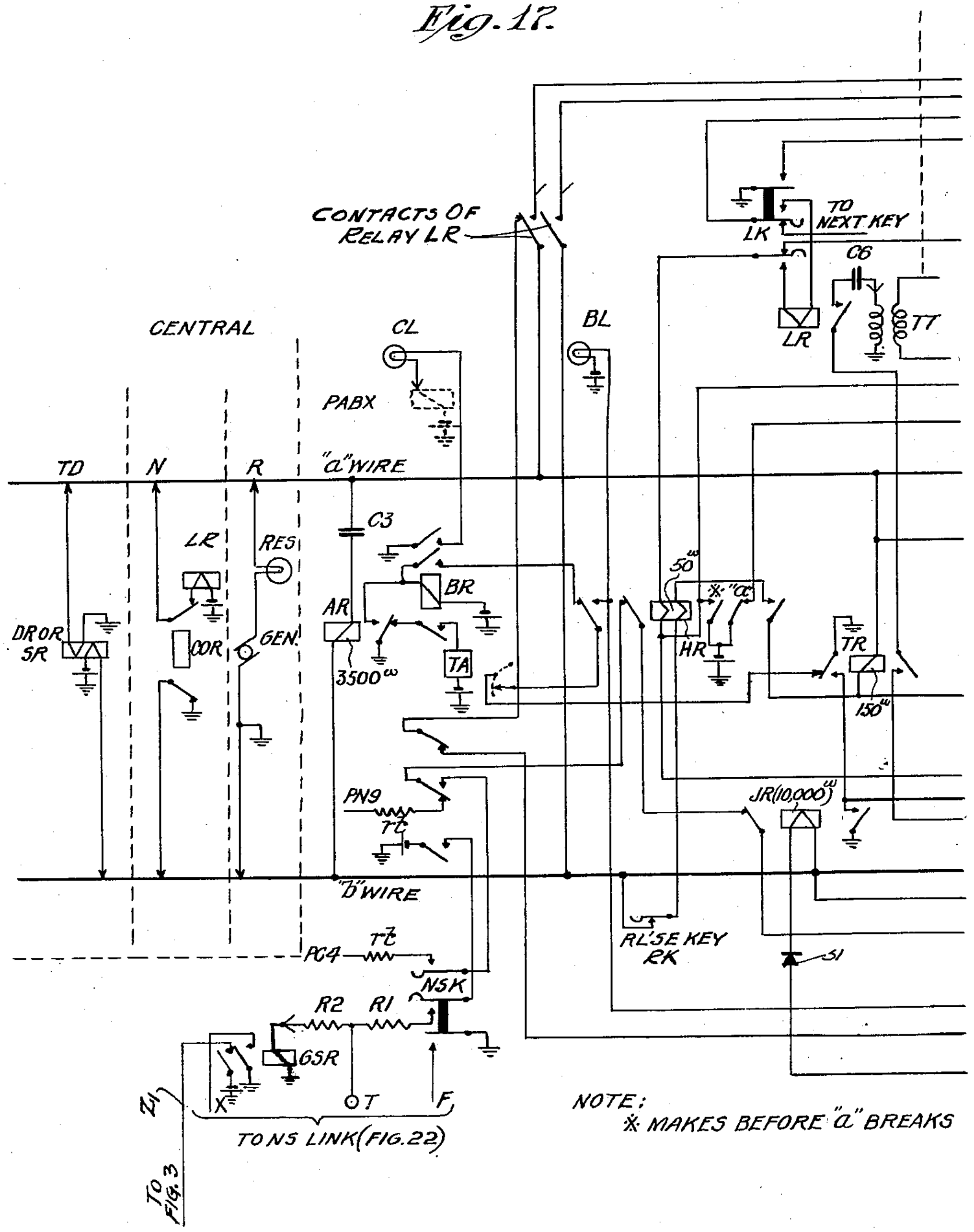
Figure 17A:
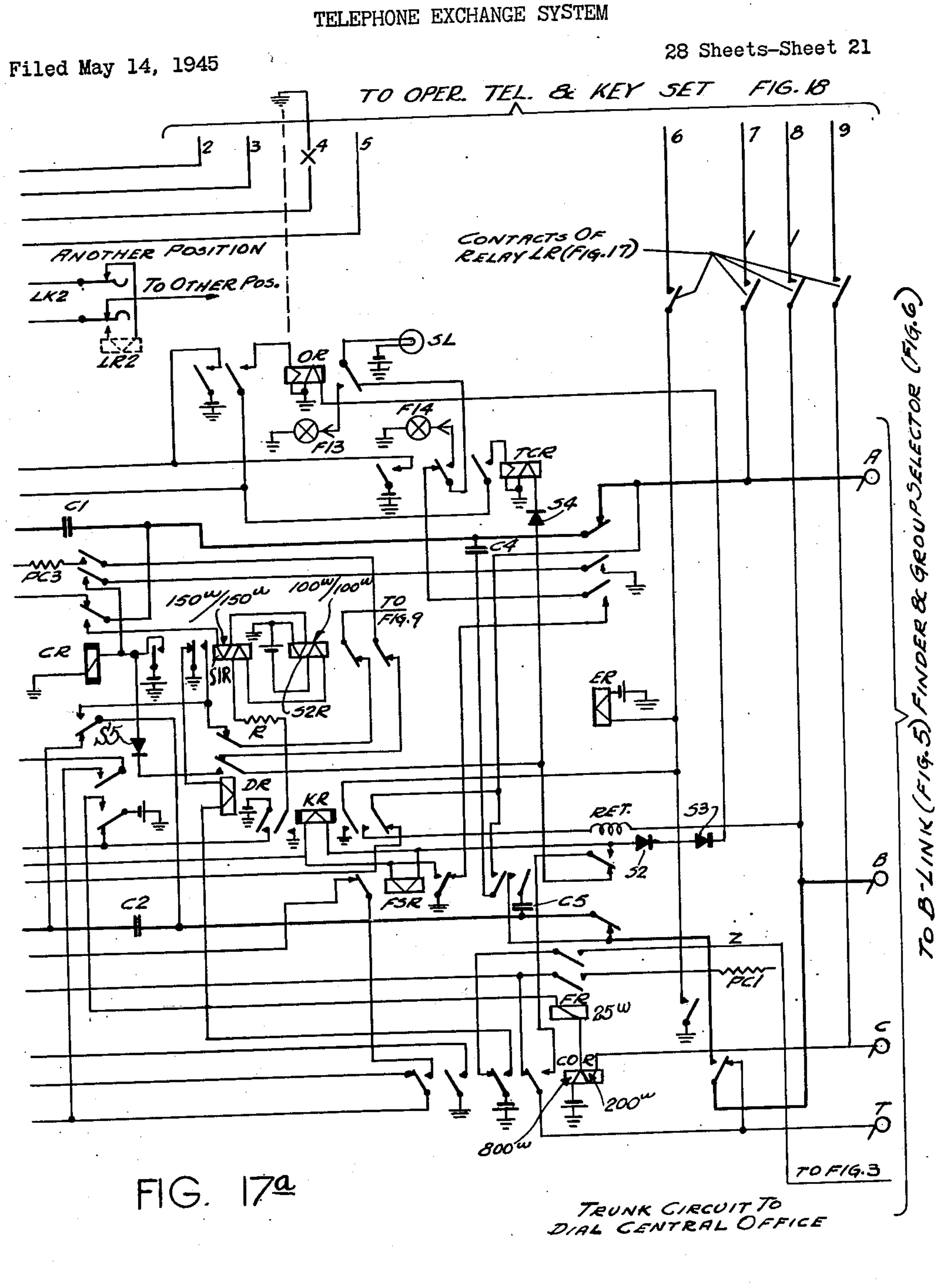
Figure 18:
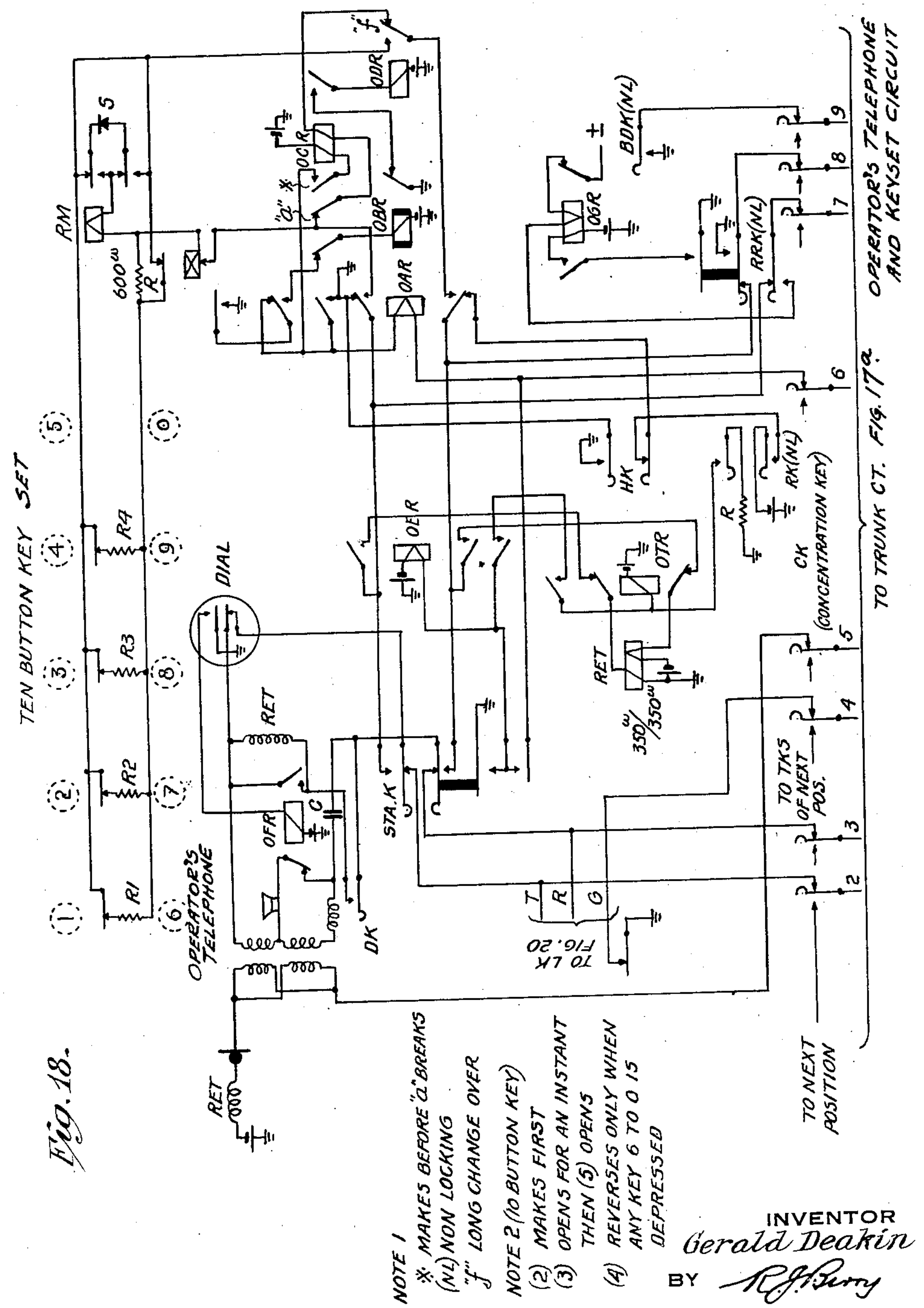
Figure 19:
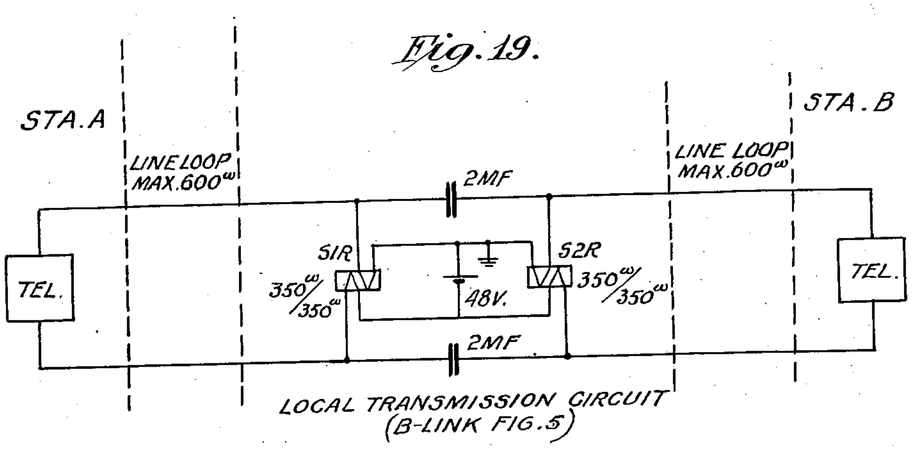
Figure 19A:
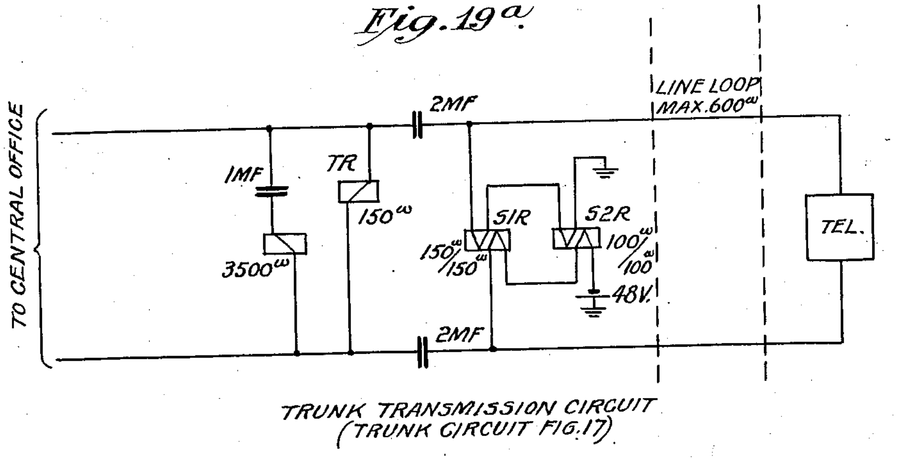
Figure 20:
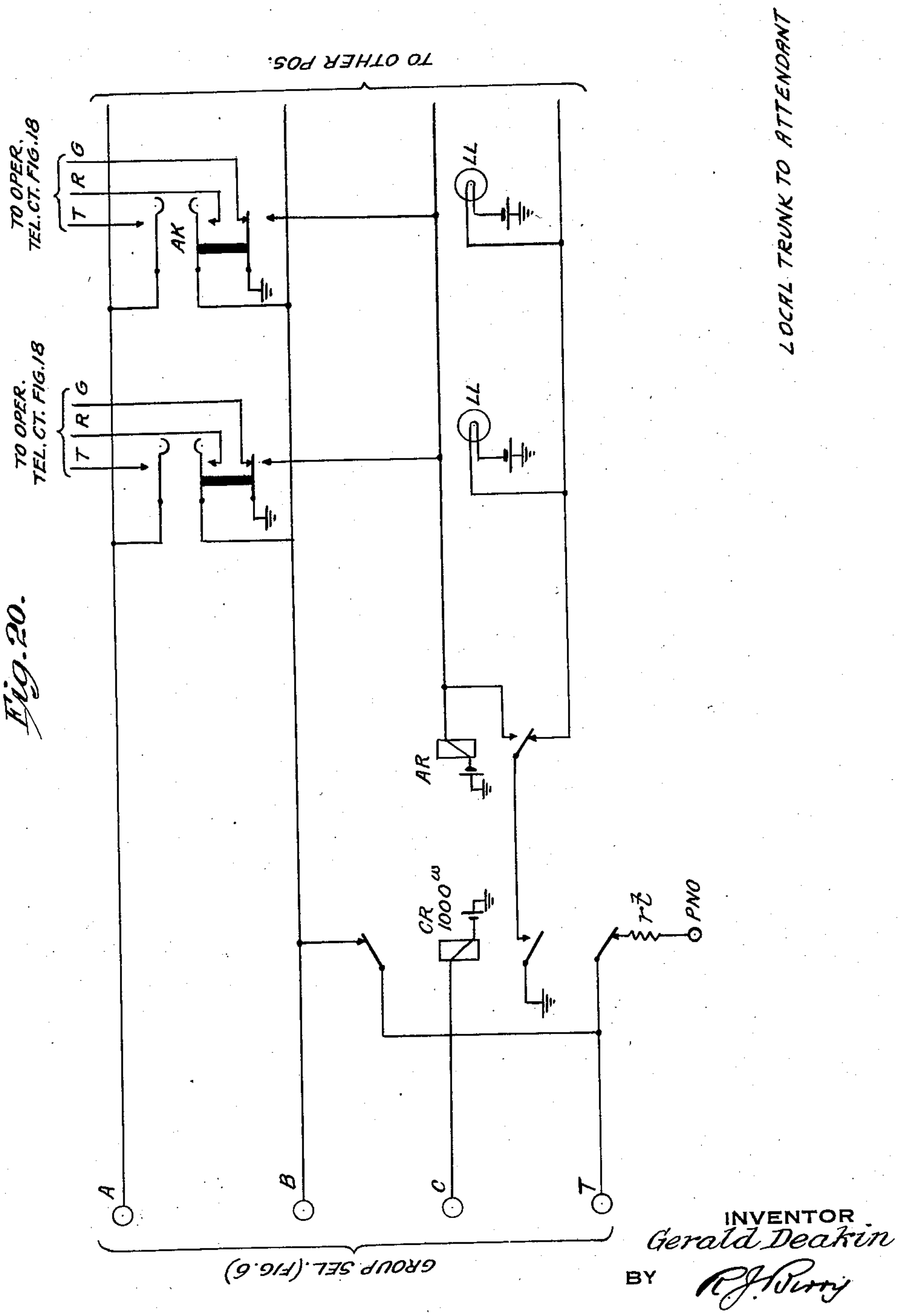
Figure 22:
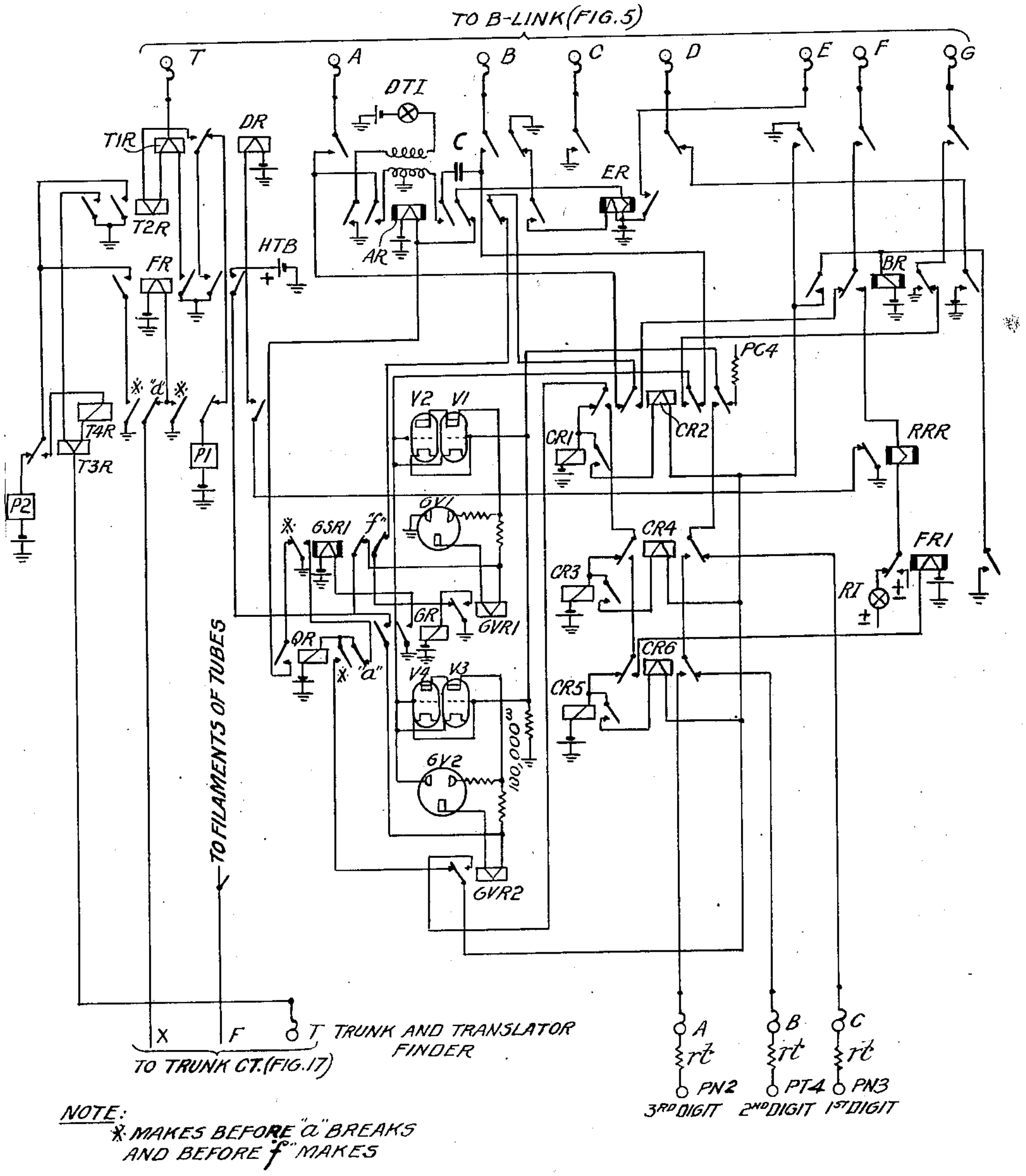
Figure 23:
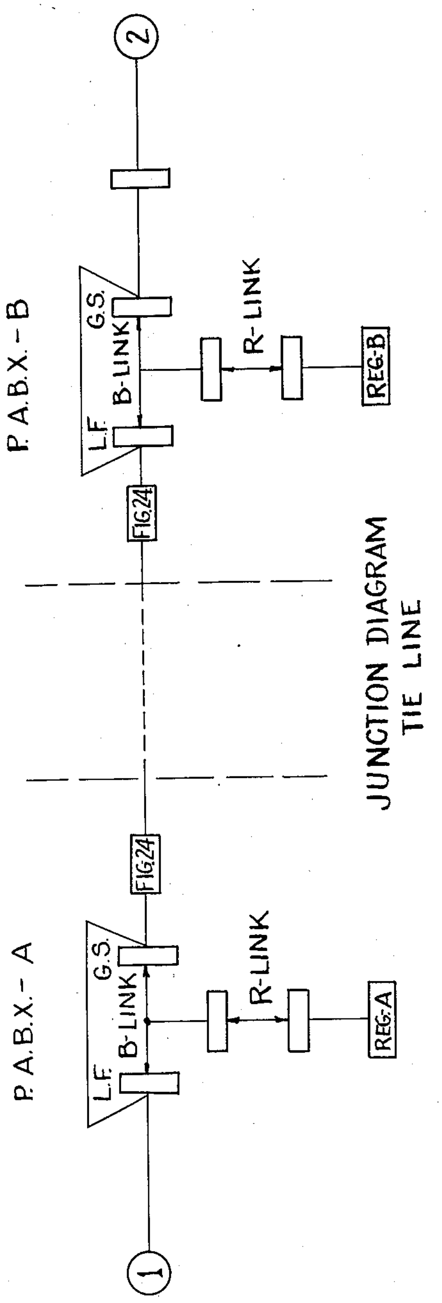

Figs. 10, 10*a* and 10*b*, when placed side by side, represent the register;

Figs. 11–11*c* are simplified diagrams illustrating the control of the register by a calling substation;

Figs. 12, 12*a* and 12*b* are simplified diagrams explanatory of the control of the register by a substation;

Fig. 12*c* is a diagram of a PABX substation circuit;

Fig. 13 is a diagram of an all-purpose selector;

Fig. 14 illustrates the terminal bank of a final selector;

Fig. 15 is a simplified diagram illustrating the principle of double test;

Figs. 16 and 16*a* are tables to indicate the uses to which various potentials have been assigned;

Figs. 17 and 17*a*, when placed side by side, illustrate diagrammatically a city trunk and as much of the city exchange equipment as is necessary for an understanding of the invention;

Fig. 18 shows a PABX operator's telephone and key set circuits;

Fig. 19 is a simplified diagram to illustrate the local transmission circuit;

Fig. 19*a* is a simplified diagram illustrating the transmission circuit in a connection with a city trunk;

Fig. 20 is a diagram of a local trunk leading to a PABX attendant's position;

Figs. 21–21*c* are junction diagrams illustrating various stages of a transfer call;

Fig. 22 is a night switching link;

Fig. 23 is a junction diagram for tie lines; and

Figure 24:
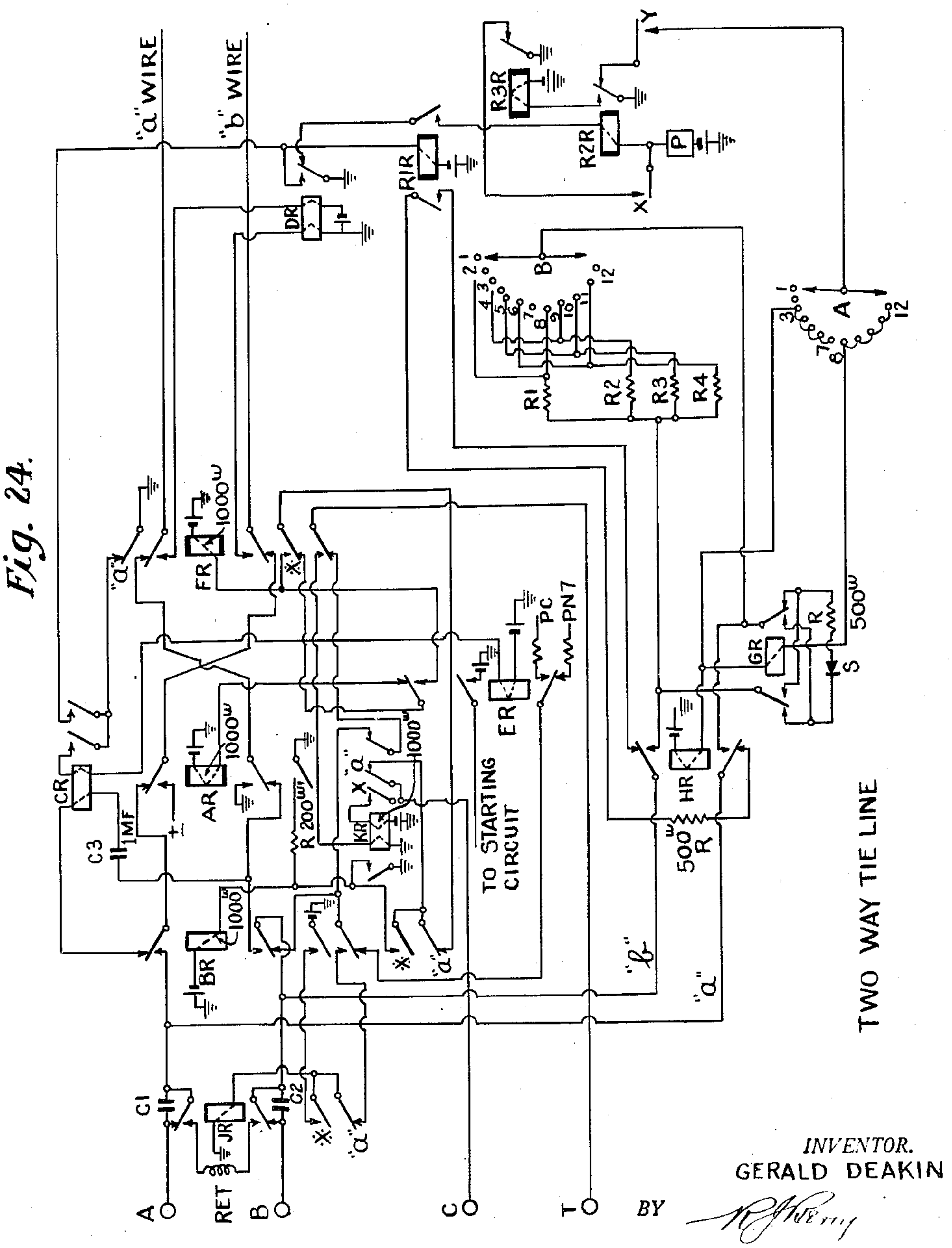

Fig. 24 is a two-way tie line.

GENERAL

Figure 1:
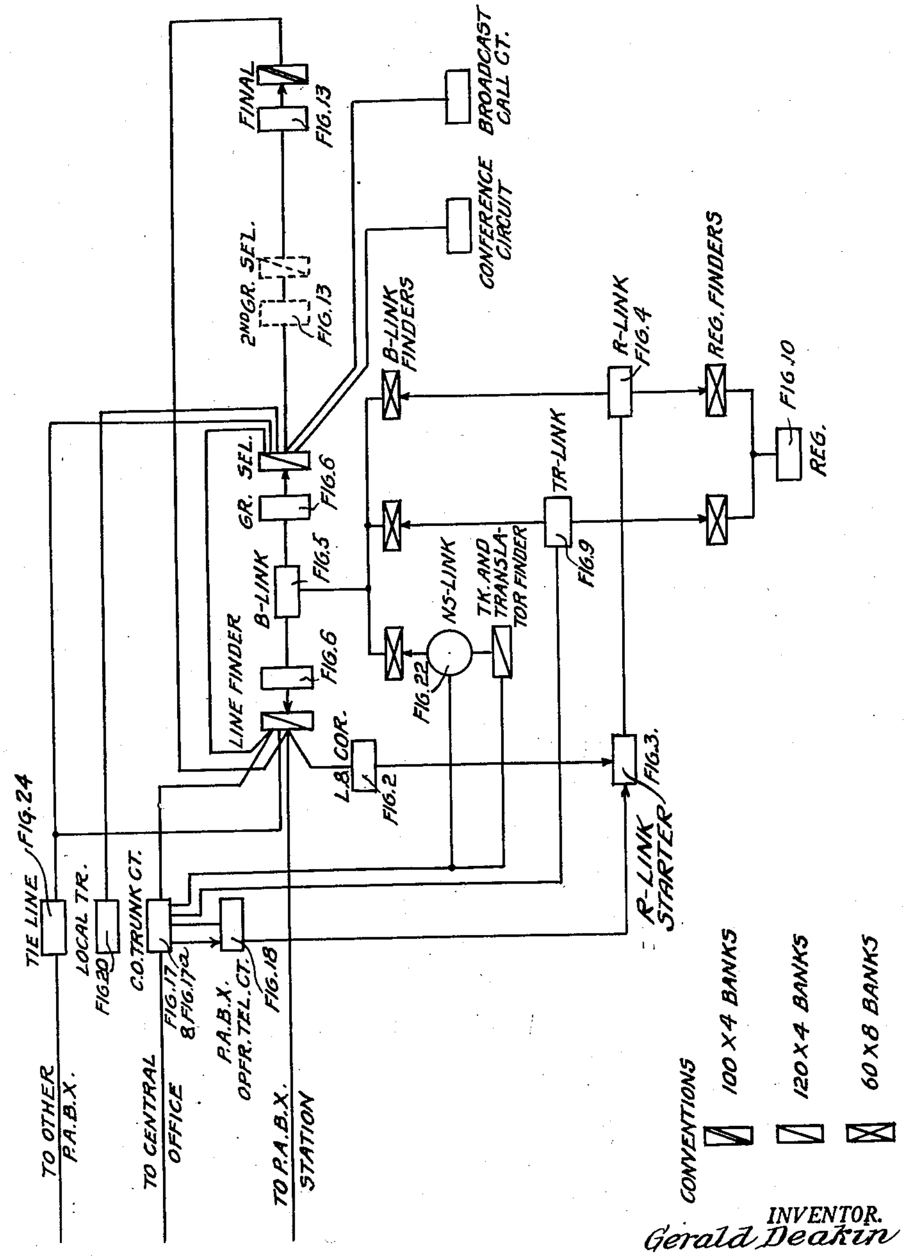
Fig. 1 is a junction diagram for a PABX.

As shown in the diagram of Fig. 1, a PABX station may be connected with another PABX station over a line finder, a B-link, a first group selector, and a final selector. If the PABX is big enough there may be an intermediate second group selector. As far as the mechanical details are concerned the finder and the selectors are alike and are controlled from a register which upon the initiation of a call is connected with the B-link over an R-link under the control of a starting circuit. The detailed circuits of each element of the connection are shown in the figures indicated on Fig. 1.

The equipment of the PABX substations and the method of the register control are diagrammatically illustrated in Figs. 12–12*c*. The equipment may be like the one disclosed in my copending application, Serial No. 521,160, filed February 5, 1944, now Patent No. 2,484,080, granted October 11, 1949, and the patents and applications to which reference is made therein.

*PABX station equipment*

Each PABX station (Figs. 12 and 12*c*) is provided with a subscriber's set which has ten key buttons instead of the usual dial. These ten keys are used by the station to make all calls. No other key is required for any purpose whatsoever. The stroke of a key is ½″. This short stroke is made possible since a key merely closes contacts and does not send out a series of pulses. The subscriber's set is connected to the PABX switchboard by two wires *a* and *b*. No ground connection is required at the station.

*Station keying—local call*

The selecting system is of the multi-potential type described in my copending applications above referred to. To aid in tracing the circuits whereby a substation controls the setting of the register, simplified diagrams, Figs. 11–11*c*, have been prepared. Similarly, Fig. 15 will be helpful in the understanding of the manner in which the register controls the setting of the selectors and Figs. 16 and 16*a* to show the potentials that are assigned for controlling various selecting operations.

To make a local call, the handset is removed and when the keying tone is head the three, four or five digits of the wanted station number, as the case may be, are keyed in rapid succession. The keys may be depressed at the rate of about three or four per second. On a three-digit call, the ringing or busy tone is heard about two seconds after the depression of the first key. During hours of heavy traffic when the greater part of the automatic equipment is in use, these waiting times may be increased. A second key may not be depressed until the first is released.

*Station keying—trunk call to dial office*

The PABX station keys a city call in the same manner as a local call. Digit 9 and the first three letters or digits of the city number are keyed in rapid succession when the keying tone is heard. The speed with which the remainder of the digits may be keyed depends upon the speed with which the digits are absorbed by the central office equipment. If the central office is of the type without director or register, the remaining digits may be keyed at a rate of one per second. If the central office is of the type having registers, then keying may be at the speed of about two digits per second. If the central office is of the Universal or multi-potential type arranged for rectifier dialing or key sending, the speed of keying may be increased to three or four per second. A digit key always remains depressed until the automatic equipment is ready to receive the next call. The subscriber may not press down a second key until the first is released. The speed of dialing is thus automatically determined for the subscriber who may key as fast as the keys are released.

The foregoing is based upon the assumption that the PABX register is equipped to store three digits only. An alternative is to arrange the registers to store simultaneously all the desired digits and permit a station to key the full number without delay. With such a register, no release magnet in the subscriber's key set would be required. When no release magnet is used, then the subscriber must hold the first key depressed until the dialing tone is heard when making calls for information, transfer or flash-in.

*Station keying—toll or extra charge calls*

The trunk circuit to the automatic city exchange may be so arranged that when a PABX station keys a toll or other extra charge number, the trunk supervisory lamp at the PABX attendant's position flashes in a distinctive manner, thus indicating to the attendant the attempted extra charge call. The attendant may listen in, supervise or prevent such calls according to local regulations.

*Station keying—informaton calls*

Any station connected to a trunk when a trunk call is coming in or going out may call any other station for information purposes and in so doing automatically hold and split the trunk. To do this, the station keys first the digit 1 and then the three or more digits of the wanted station. When the information has been obtained, unheard by the trunk party, the station again keys the digit 1 which restores the trunk connection to normal and releases the called station.

*Station keying—transfer call*

Any station may transfer a trunk call, whether incoming or outgoing, to any other station by first calling the second station as on an information call and then by depressing the key used for out trunk calls, key 9, if and when the called station agrees to take the trunk call. When key 9 is depressed, the first station is disconnected and the trunk is connected through to the second station just as though it had received the trunk call in the first place. The second station may transfer the call to a third party if desired, and so on.

*Station keying—PABX operator flashed in*

Any station on a trunk connection, whether in or out, may automatically flash in the PABX operator by keying first the digit 1 and when the key is released, then the digit 0. The supervisory lamp of the trunk before the PABX operator flashes continuously until the PABX operator answers. The PABX operator may transfer the call to another station and release the first. It is only when the PABX operator is flashed in that she can listen in on a busy connection with the only exception that she cannot listen in when offering an important trunk or toll call.

*Station keying—conference call*

A conference call may be originated from any station but only stations wired to a conference circuit may be called into conference. The conference circuit is given a two-digit number, for instance, 81. When this number is keyed, the conference circuit is picked up and the transmission bridge automatically removed from the normal switching circuit, thus placing the calling station in direct control of the conference circuit. The circuit may be arranged in any of the many well known ways.

*Station keying—broadcast call circuit*

A broadcast call may originate from any station but only stations wired to a broadcast call circuit may be called. The broadcast call circuit is also given a two-digit number, for instance, 82. When this number is keyed, the broadcast circuit is picked up and the transmission bridge automatically removed from the normal switching circuit, thus placing the station in direct control of the broadcast circuit. The circuit may be arranged in any well known ways.

*Station keying—call to PABX operator*

Any station may call the PABX operator by keying the digit 0. The trunks are key and lamp ended so that local calls may not be extended to the city.

*Station keying—attempted city calls from restricted stations*

Any line, by changing the calling potential, may be restricted to local and tie line service. When such stations key the digit 9 on an attempted trunk call, the call is automatically diverted to a zero trunk and therethrough to the PABX operator.

*Station keying—tie line calls*

A station of one PABX may be connected to a second PABX of the same or other type over a two-way tie line and may call any station in the second PABX by keying first the tie line number which may be a single digit or a two-digit number, and then the wanted distant station number. In case the PABX is arranged for pulsing into a dial central office, as will usually be the case, dial type pulses are also used to transmit numbers over the tie line. They are converted from key pulses to dial pulses and then back to key pulses at the distant PABX.

*Numbering scheme*

The numbers of the PABX stations contain a number of digits determined by the size of the exchange. As previously explained, special services may be given single-digit numbers or two-digit numbers.

*Stations grouped under a common number*

Adjacent stations in the same group of 100 may be operated under the same number by making the potential of the "*t*" wires of all lines forming the group the same.

*Insulation and loop resistance of PABX station lines*

The rapid key sending circuit is designed to function normally over lines having a total loop resistance not exceeding 600 ohms and an insulation resistance to ground and between wires of not less than 20,000 ohms. These figures will more than take care of the great mapority of the lines. In case of noticeable earth potentials a higher insulation resistance is required.

*City trunks*

The city or central office is connected with the PABX over two-way, full metallic trunks. The trunks terminate at the central office in the usual line and cut-off relays, but in the present case the connection of the line relay and ground is reversed with respect to the "*a*" and "*b*" wires (see N, Fig. 17*a*).

At the PABX the trunks terminate on one or more attendant's positions. Each trunk has a calling lamp CL, a supervisory lamp SL, and a busy lamp BL. Each trunk has three keys: a listening key LK, a release key RLSE.K, and a night switching key NSK. Trunks may be multipled on as many positions as desired but only one operator may be connected to a trunk at a time and no operator can interconnect two trunks by throwing two listening keys simultaneously.

*PABX operator's equipment*

Each PABX operator or attendant is provided with the usual telephone set, a ten-button key set for establishing local calls and a dial for making direct city calls. Each position is provided with the following common keys which may be connected to a trunk only when the corresponding listening key is thrown:

BDK—breakdown key, used by the operator to release an established connection.

DK—dialing key, used to connect dial to the city end of the trunk.

HK—holding key, used by the PABX operator when she desires to offer an urgent toll call to prepare the circuits to hold the final on a busy line.

STA.K—station key, which disconnects the operator's telephone set from the city end of the trunk, thus leaving it connected to the station end only.

RK—R-link release key, which is momentarily thrown by the PABX operator to release the busy tone apparatus and in place thereof to connect the called busy connection to the PABX operator's telephone circuit.

RRK—re-ring key, used by the PABX operator to re-ring the wanted station to a busy connection when both parties hang up after the wanted party has agreed to take the waiting toll call.

In addition to these common operating keys, each position is provided with a BCOR, buzzer cut-off key, and a CON.K, concentration key, which transfers the control of trunks from one position to the operator's telephone circuit of the next position, thus permitting one position to handle trunks on one or more positions during slack hours.

*Normal trunk call from city*

The handling of a normal call is very simple and requires little effort on the part of the operator. When a calling lamp lights, the PABX operator throws the corresponding listening key and as soon as she learns the number of the wanted station she depresses the corresponding three digits on her key set, after which the listening key is restored and another call handled. The operator has full supervision. The supervisory lamp flashes one way to indicate that the connected station is being rung and a different way when the called station is busy. When the called station answers, the supervisory lamp goes out, and from now on the operator may not listen in on the connection by merely throwing the listening key. When the calling station hangs up on a successful call, a no-answer call or a busy call, the connection is automatically released. The only time the PABX operator need use the trunk release key is to release the trunk before a connection is established and this does not happen on normal calls.

*PABX operator may offer important toll calls*

By means of her common keys, the PABX operator may listen in on a busy connection. When she does this, a warning tone is given to the parties to the connection. The PABX operator may not break down the busy call but she may extend the waiting toll call to the wanted station when the other party engaged in the busy call hangs up voluntarily. She cannot connect the waiting toll call to a busy line.

*PABX operator may establish city connection*

When a trunk is busy on an in or out call, the busy lamp at the PABX operator's position burns. The throwing of the trunk listening key while the busy lamp is burning has no effect on the established call and, as previously indicated, the operator may not listen in. However, when the operator throws the listening key of an idle trunk, that is, a trunk whose busy lamp is not burning, the trunk is automatically connected to the operator's telephone set and made instantly busy at the PABX so that it may not be picked up by a station making an out call. The operator may dial the city number over a trunk so picked up by throwing the common dialing key and then dialing the wanted number in the usual way, after which the common dialing key may be restored.

When the wanted station answers or before, the connection may be extended to any PABX station by the PABX operator. To do this she merely keys the proper three-digit number. The operator may listen in until the called city station answers or she may restore the listening key and allow the call to proceed just as though it were a normal call.

*PABX station makes city call*

Any unrestricted station may establish a city call by keying the digit 9. An idle trunk is selected, whereupon the busy lamp at the PABX attendant's switchboard lights. Should the calling station key an extra charge number, such as is assigned to long distance or short haul toll calls, the supervisory lamp will flash in a distinctive fashion. The PABX operator may listen in and supervise such calls.

*Night switching call*

Each trunk is connected to the bank of a translation finder associated with the night switching link. By cross-connecting the proper terminals of this bank to the proper potentials, when picked up at the central office while the night switching key is thrown the trunk may be automatically switched to any predetermined station. Certain PABX station numbers are listed as night numbers in the telephone directory. Should any of these night numbers be dialed when the night switching key is not thrown, the calling subscriber will receive a busy tone.

This facility may, of course, be used during day as well as night hours, thus permitting outside parties to call certain PABX stations direct without going through the PABX operator. All stations assigned for night service may be called at any time in the regular way through the PABX operator and their ability to make out-calls and special calls is in no way limited.

*Switching plan*

Figure 6:
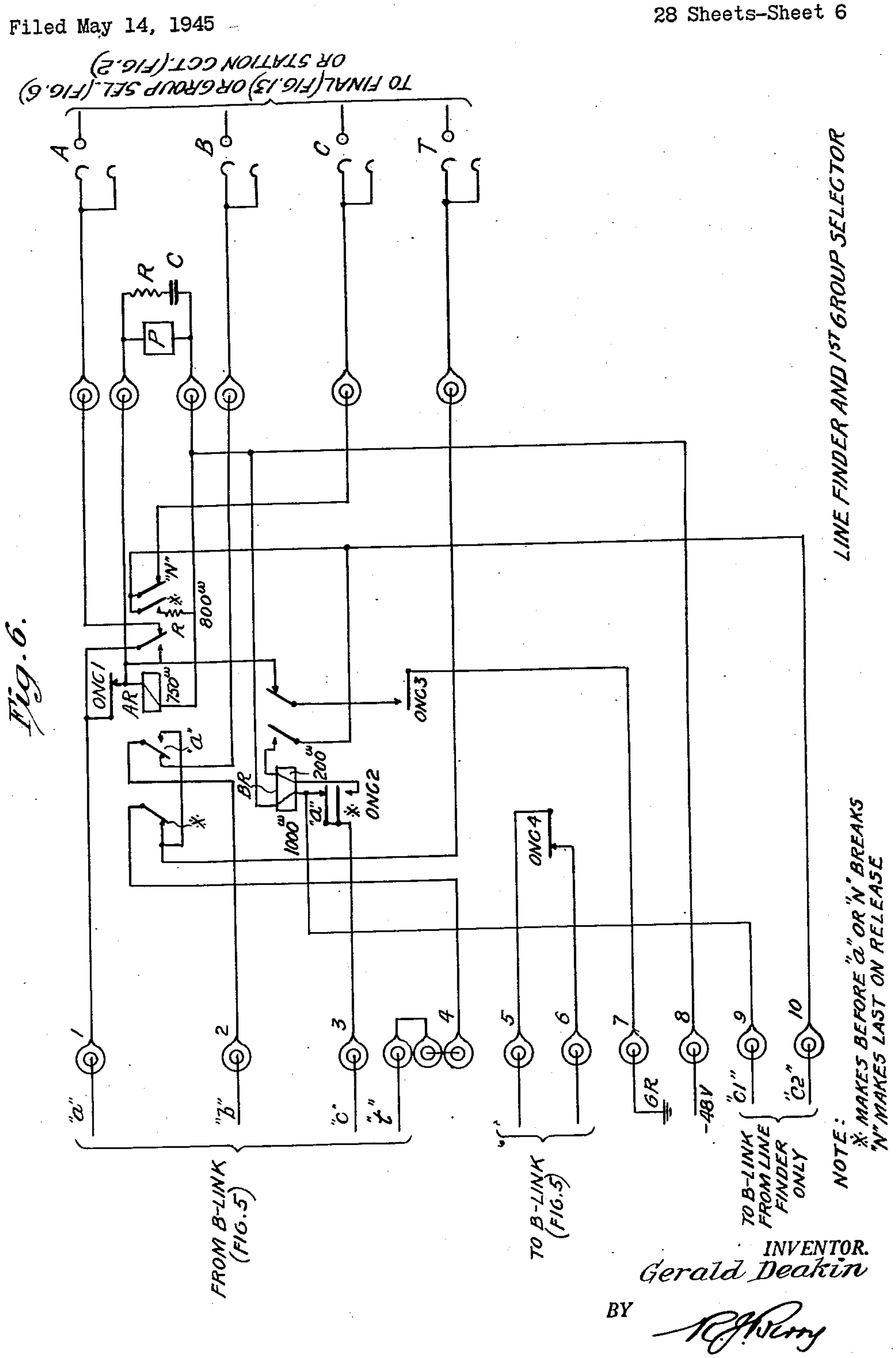
Fig. 6 is a diagram of a switch which may be used either as a line finder or as a first group selector.
Figure 7:
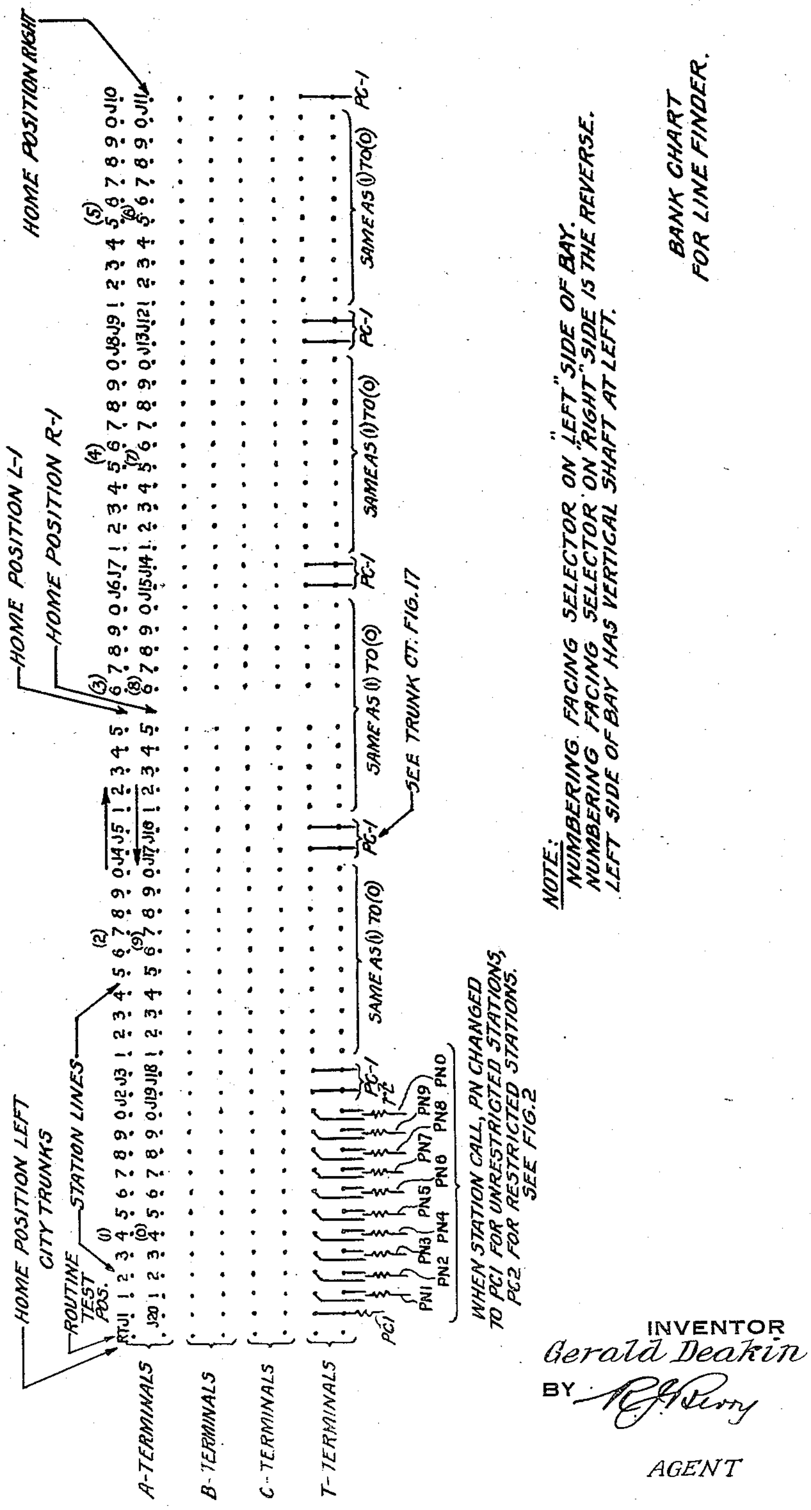
Fig. 7 illustrates the terminal bank of a line finder.

The construction of the line finder and selectors may be of any suitable type, e. g. the one disclosed in my Patents No. 2,336,471 and No. 2,330,812, or any other suitable type. The circuits of these switches are shown in Figs. 6 and 13 and the arrangement of their banks is illustrated in Fig. 7 for the line finder Fig. 8 for the group selectors and Fig. 14 for the final selector. These are typical arrangements suitable for the system under consideration but they may obviously be altered in many respects and should be modified to meet specific operating requirements.

The general switching plan follows conventional small central office plans and is capable of being easily expanded from 100 lines to 8000 or 9000 lines and interconnected with one or more central offices by two-way trunks and with other PABX's by two-way tie lines.

Figure 5:
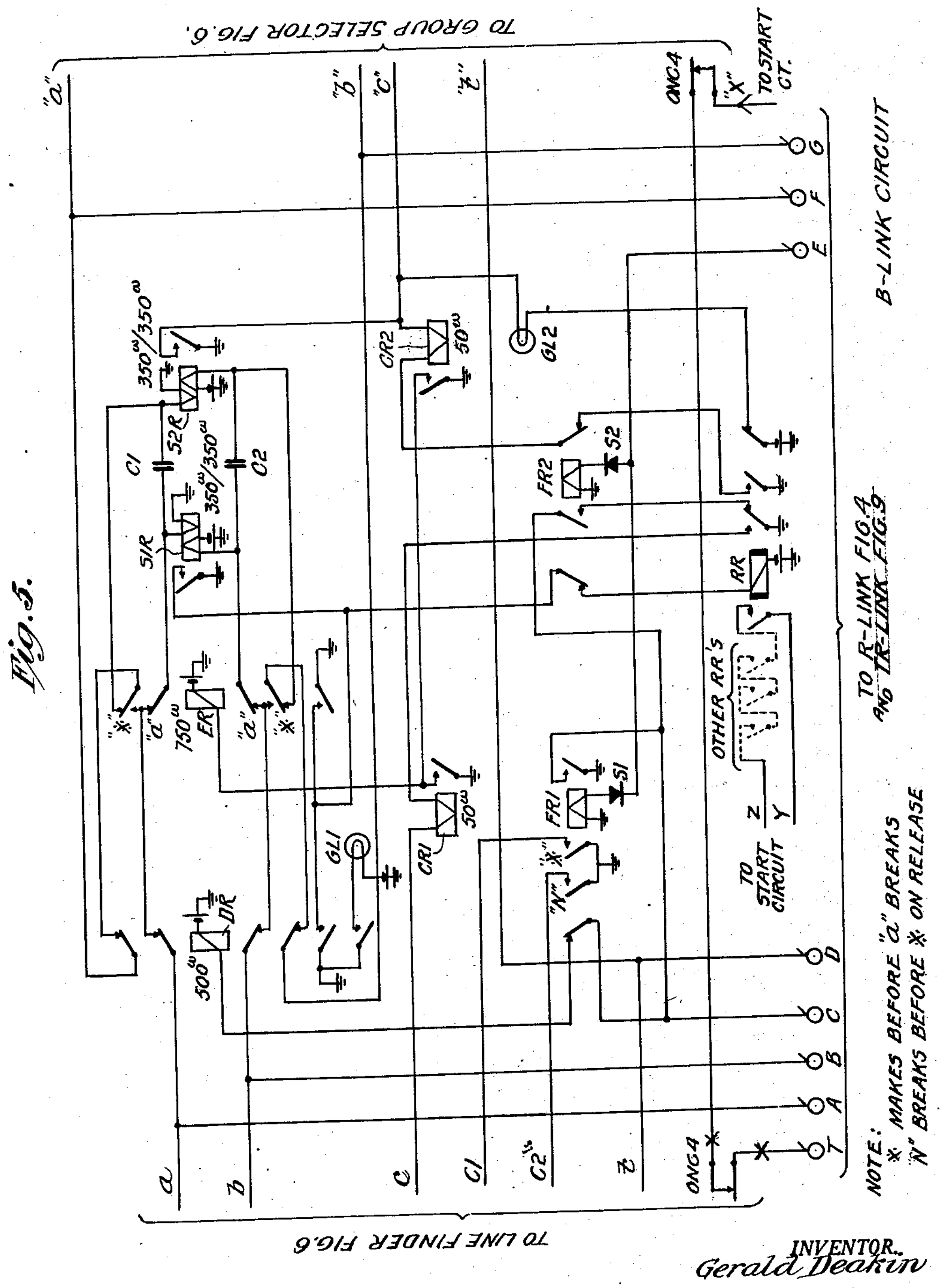
Fig. 5 is a diagram of a B-link circuit.

All substation lines, trunk lines and tie lines terminate in the banks of finders (Fig. 6) which terminate one of the ends of B-links, Fig. 5. The other end of each B-link terminates in a group selector. In a PABX having a capacity up to 600 or 800 lines, second group selectors are not required for local service. The final selectors, Fig. 13, are connected directly to the group selector banks and the station lines are connected to the final banks.

On local, trunk and tie line connections, the register (Figs. 10–10*b*) is connected to a B-link by an R-link (Fig. 4) which contains the ringing, busy and other equipment not required during conversation. When a call is originated, an R-link chooses a B-link and then a register, after which the register controls the line finder of the selected B-link to pick up the calling station, trunk or tie line. The register completes the selection of the wanted station, trunk or tie line under the control of the calling station or PABX operator's key set. On a local connection the register is dropped off as soon as selection is complete. The holding time is very short. The R-link is dropped off when the called station answers or in case of a busy connection, when the calling station hangs up. On an outgoing trunk or tie line call, the register and R-link drop off as soon as selection is complete.

Any trunk receiving a call from the city when the night switching key is thrown automatically picks up a night switching link (Fig. 22) which extends the call to a station predetermined by the potentials connected to the bank of a trunk and the translation finder. The register is not used in these calls and the calling city subscriber's meter is operated only when the called station answers. Stations selected for night service are not restricted in any way. They may make and receive all other calls in the usual way.

Tie lines terminate in the same way at the two PABX's which they interconnect. They are two-way and permit station to station calling. The calling station keys the tie line number, e. g. the single digit 7, and after that the wanted station number of the distant PABX. When conditions require, the tie lines may have two-digit numbers and may terminate in special service second group selectors. The regular PABX register is used for completing the connection at each end. The register may be readily adapted to permit central office connections to be originated in one PABX and completed over a tie line through another PABX.

*Line finder bank (Fig. 7)*

The banks of the line finders have a capacity for a total of 120 lines and trunks. The normal arrangement is 100 lines and a maximum of twenty trunks per group of B-links. The twenty B-links assigned to each group of 100 lines are divided into four sub-groups. The home contacts of the line finder are set so that five of these links appear before each group of 25 lines and five city trunks.

The circuits are so arranged that a B-link immediately preceding the calling station or trunk is selected if one is free in that sub-group. If all the B-links in the sub-group are busy, then the B-link in the next preceding sub-group is selected, and so on. The object is to reduce the average length of travel and consequently the hunting time.

*Group selector bank (Fig. 8)*

Figure 8:
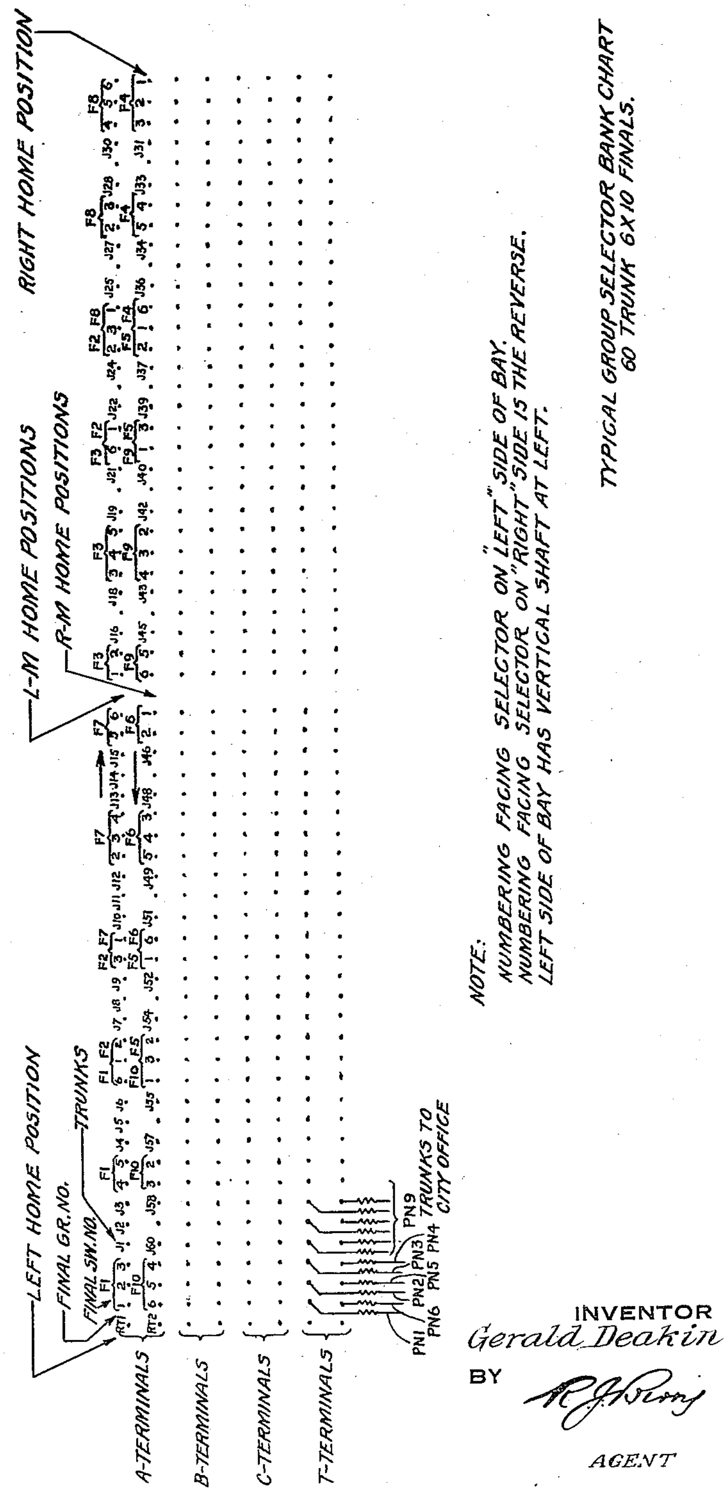
Fig. 8 illustrates the terminal bank of a group selector.

The distribution of finals and city trunks in the banks of the group selectors in which the B-links terminate may be arranged in any convenient manner. A typical arrangement is shown in Fig. 8 for six groups of twenty B-links each. To give full accessibility to all city trunks with capacity for growth, all should appear in the banks of all the group selectors. There are six groups of sixteen finals. The total capacity of the group selector bank being 120, there will be space for only sixty finals, i. e. six groups of ten finals each.

The group selector banks also have four home positions. The twenty B-links in each group are divided into four sub-groups of five B-links with one sub-group assigned to each of the four home positions. Normally the traffic is more or less equally divided among the four quarters of the group selector banks with the common finals appearing at the end of each quarter.

Fig. 8*b* represents the bank arrangement for the first three groups of B-links. The individual finals in the first quarter are 1 and 2, in the second quarter 3 and 2, in the third quarter 4 and 5, and in the fourth quarter 6 and 5. The common finals are 7, 8, 9 and 10. In the second group of three B-links, the common finals would be the same and would be located in the same relative position at the end of each quarter, but the individual finals would be 11 to 16 inclusive, distributed in the same manner as finals 1 to 6 are in Fig. 8.

Assuming that each quarter receives the same number of originating calls, it will be seen that the traffic will be well distributed over the unsplit junction group and the various groups of finals. The common finals 7, 8, 9 and 10 are placed at the end of each quarter so that they may not be picked up while there are free finals in the corresponding quarter. Each quarter has a first choice: Final 1 for the first quarter, final 3 for the second quarter, final 4 for the third quarter and final 6 for the fourth quarter. The second choice of the first and second quarters is final 2. The second choice of the third and fourth quarters is final 5.

*Final selector bank (Fig. 14)*

The 100 lines in the banks of each final selector are divided into ten groups of ten each, as shown in Fig. 14. Preceding each group of ten lines is a "tens" position. The ten lines following each "tens" position are normally consecutively and permanently connected to potentials PN1 to PN10. The ten "tens" position are similarly consecutively and permanently connected to potentials PT1 to PT0.

When it is desired to operate a group of lines under one number, the circutis are so arranged that the PN potential, except from last line, is disconnected when the line is picked up. The group of lines operating under one number may be in the same normal group of ten lines or in different groups of ten lines, provided that the same PN number is not used for any other purpose until a "tens" position is passed. The lines in a group need not be consecutive. In fact, one may use the same line in each normal group of ten lines to form a group of ten lines having the same number. The first nine of such lines would have its PN potential disconnected when picked up, and the tenth line would have the PN potential permanently connected so as to act as the busy stop of the group and prevent further hunting.

*Transmission circuit (Figs. 19, 19a)*

Transmission current for station to station connections is supplied from the B-links (Fig. 19). As the majority of PABX lines are short, the resistance of the bridged high impedance relays may be increased in most cases from the usual 250 ohms to 350 ohms per leg. It is desirable to do this when permissible in order to reduce current consumption.

Transmission current for toll and city calls is supplied from the trunk circuit (Fig. 19a). The normal total resistance of the bridged current supply relays is 250 ohms per leg but this resistance may be decreased when desirable. The holding central office bridge is of high impedance, also the high resistance bridged ringing relay which is permanently connected so that a toll or city operator may ring in the PABX operator at any stage of a connection; that is, before, after or during conversation.

*Information, transfer and flash-in calls*

As previously stated, any station connected to a trunk, whether on an incoming or an outgoing call, may call any other PABX station for information purposes, may transfer the trunk call to any other station and may flash in the operator automatically. In Fig. 21 station A is shown connected to a trunk on an incoming call. When station A desires to make any of the above special calls, key 1 is first depressed; whereupon the trunk causes a transfer (TR) link to select a second regular B-link and then a register, after which the register causes the second B-link to select the trunk, thus placing two regular B-links, No. 1 and No. 2, in multiple as shown in Fig. 21*a*. When this multiple connection is made, the trunk is cut but held toward the central office, and key 1 is released. Station A may now key 0 to flash in the PABX operator, whereupon B-link No. 2, TR-link and the register release. However, when station A wishes to talk to station B, he keys the number of station B in the usual way, whereupon the connection is extended to station B as shown in Fig. 21*b*.

The register releases but the TR-link remains connected. Transmission current for the calling and called subscribers is supplied by the TR-link. The transmission bridge in both B-links is removed.

Should the call be an information call, the original connection (Fig. 21) is restored when digit 1 is keyed.

Should station A wish to transfer the trunk to station B, he does so by keying the digit 9 instead of the digit 1. This automatically releases the transfer link and B-link No. 1, resulting in the connection shown in Fig. 21*c*. Station B now has the same control over the trunk as though it had received the original call. It may flash in the operator, make information calls or transfer the call to still a third station.

In case station A originated the trunk call instead of received it, the method of operation would be the same.

*Conference and broadcast calls*

The conference and broadcast call circuits are connected to special service second group selectors to save first digits (Fig. 1). The conference circuit is given the number 81 and the broadcast call circuits the number 82, which numbers any station may dial to pick up these circuits. The special service second group selectors permit the bridge to be removed from the B-links.

DETAILED DESCRIPTION

*Local call*

Figure 2:
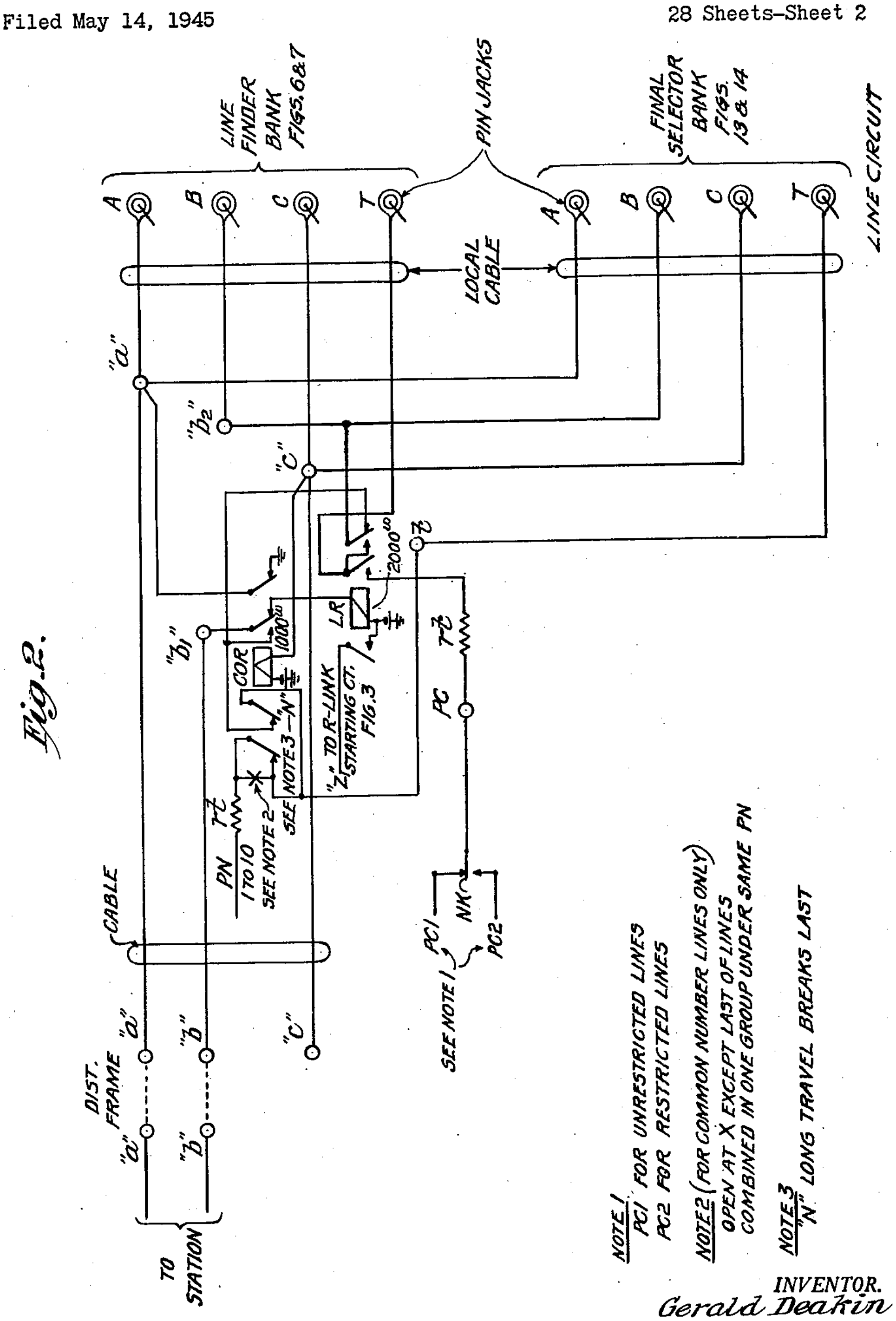
Fig. 2 is a diagram of the line circuit of a PABX station.
Figure 3:
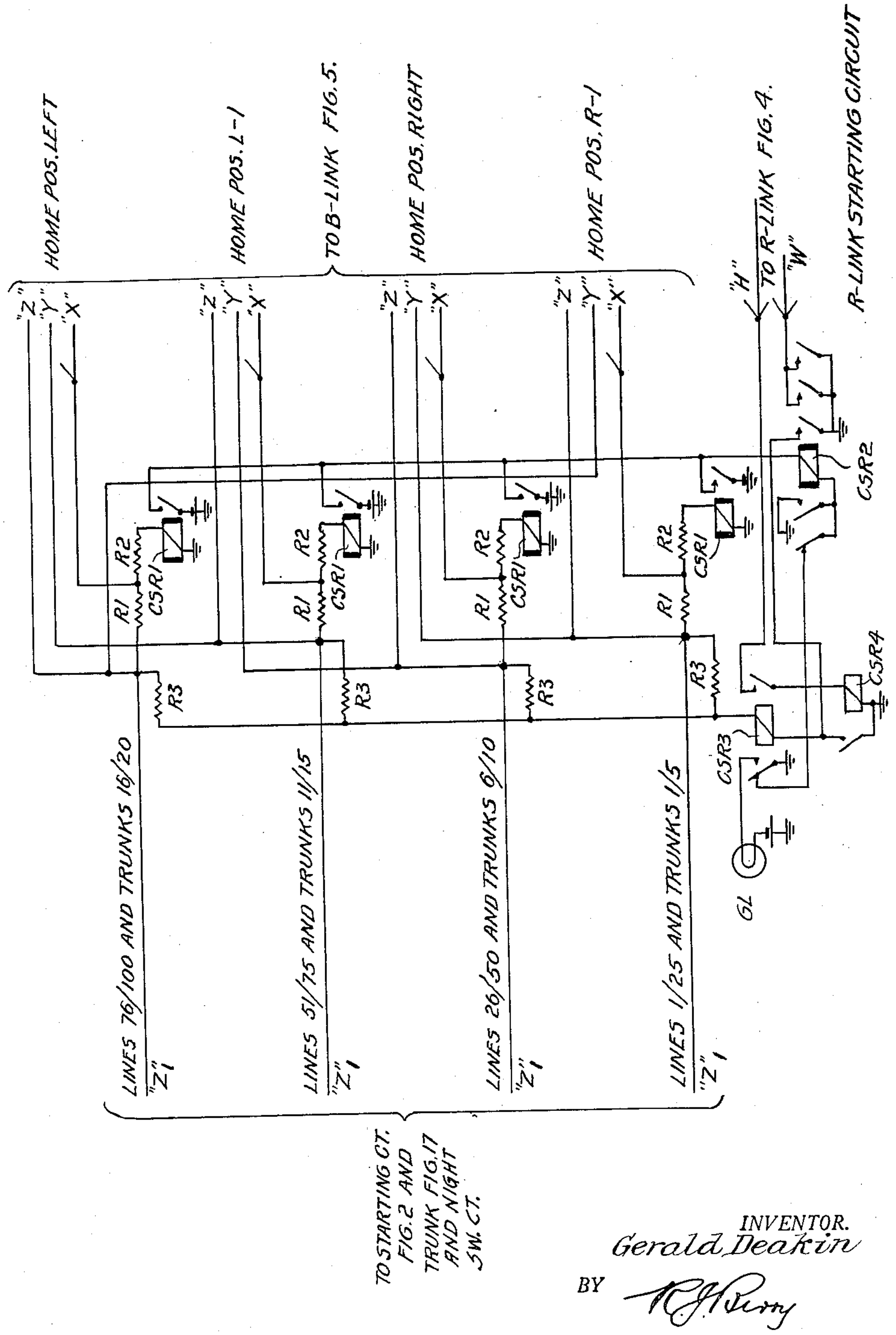
Fig. 3 is a diagram of the R-link starting circuit.

When a calling subscriber removes his handset and energizes line relay LR (Fig. 2) over the conventional line loop, the calling potential PC1 or PC2, as the case may be, will be applied to the T-terminals in the line finder banks. At the same time, LR places battery on the Z1-lead to the R-link starting circuit (Fig. 3).

The line finders, which form part of the B-links (Fig. 5) serving each group of 100 lines, are equally divided into four subgroups. The wipers of the finders in each group are stationed at a different one of four home positions. Each such group serves a different group of twenty-five lines as a first choice. Each sub-group of finders has its individual test lead "X" leading to the associated branch of the starting circuit (Fig. 3). Thus when a line in the sub-group including lines 1 to 25 calls, battery is placed on the corresponding Z1 and X leads by relay LR. Should all B-links in the calling sub-group be busy, the Z-lead of the starting circuit is extended through a series of relay contacts (relay RR, Fig. 5) to the Y-lead which is connected to the starting circuit Z-lead of the sub-group immediately preceding. If all B-links in this second sub-group are busy, the Z-lead is extended to a third group and if the third group is busy, then to a fourth group. In this manner, the nearest available line finder is always selected for hunting, the object being to reduce the hunting time to a minimum.

*R-link selects B-link*

Figure 4:
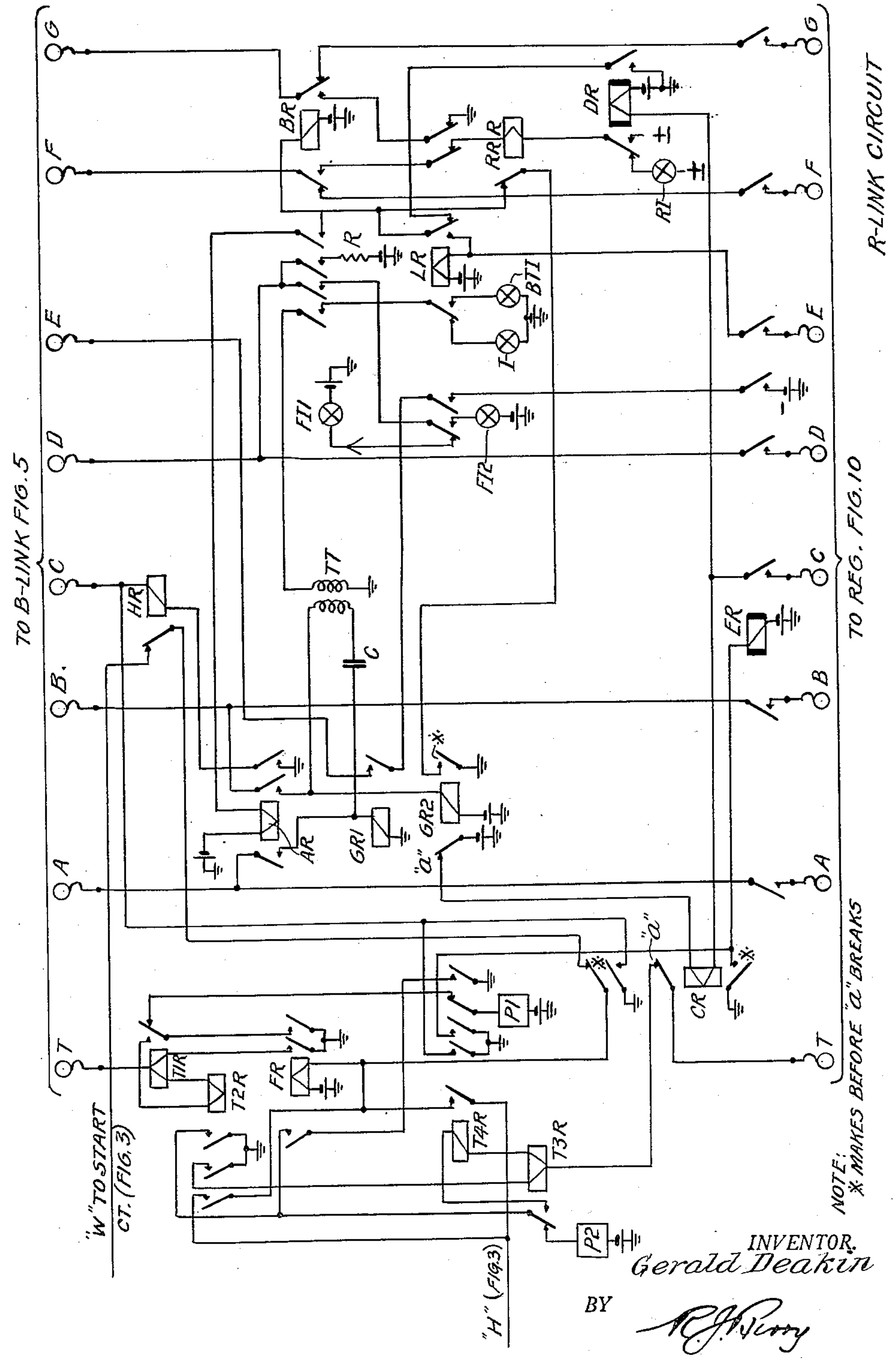
Fig. 4 is an R-link circuit.

The battery placed on the Z-lead by LR (Fig. 2) is extended to all free T-terminals (Fig. 5) of the associated sub-group of B-links. The circuit may be traced from the front contact of the LR relay (Fig. 2), conductor Z1, resistor R1 (Fig. 3), lead X, in multiple, through off-normal contacts ONC4 (Fig. 5) of the idle group selectors and ONC4 of the corresponding idle line finders of a group of B-links, to the T-terminals of this group of B-links which appear in the B-link finders (Fig. 4). At the same time, a circuit is closed from battery, front LR (Fig. 2), resistors R1 and R2 (Fig. 3), low resistance relay CSR1 which is common to the group including the calling line, to ground. CSR1 energizes CSR2, circuit from battery, front CSR1, winding CSR2, back CSR2, back CSR3, to ground. CSR2 locks up to ground and connects a common low resistance relay CSR3 in parallel with the resistances R3 of each group of lines and thence to the Z-leads, each of which, as above stated, is multipled with the Y-lead of another group.

The common starting relay CSR2 connects ground also in multiple to the start leads W of all the R-links (Fig. 4).

Relays FR (Fig. 4) of all idle R-links now become energized over the circuit from ground, front CSR2 (Fig. 3), lead W, back HR (Fig. 4), back CR, winding FR to battery. FR energizes the clutch of its associated B-link finder magnet P1, circuit from ground, front FR, back T1R, back T4R, winding of magnet P1 to battery. All the B-link finders hunt for a B-link (Fig. 5) of the group in which potential has been placed on the T-terminals. The first one of these finders to reach an available B-link closes a circuit from battery, front LR (Fig. 2), Z1, resistor R1 (Fig. 3), X-lead, ONC4 (Fig. 5) of the group selector, ONC4 of the line finder, terminal T and wiper of the B-link finder (Fig. 4), high resistance winding T1R, front FR to ground. T1R operates and de-energizes P1, whereupon the B-link finder comes to rest with its wipers on the terminals of the selected B-link. Over a front contact, T1R shunts its high resistance winding by its low resistance winding in series with low resistance winding of relay T2R. This makes the selected B-link busy to all other B-links because resistor R1 (Fig. 3) is common to the sub-group to which this link belongs. The shunting effect of the above-mentioned low resistance circuit causes CSR1 of this group (Fig. 3) to fall away, whereupon CSR2 becomes de-energized and the other hunting B-link finders stop.

The common starting relays CSR1 and CSR2 are somewhat slow releasing and maintain ground on the starting conductor W long enough to insure the closing of a holding circuit for relay FR (Fig. 4) over T2R front, conductor H (Fig. 3), CSR3 front, and winding of CSR4 to ground. At a later stage this holding circuit will be closed over the front contact of T4R (Fig. 4) maintaining FR locked up upon the de-energization of T1R and T2R which happens when the line finder of the connected B-link is operated and opens its normal contacts ONC4.

The line relay LR (Fig. 2) remains energized until the line finder of the selected B-link seizes the line circuit and, during this time, LR maintains CSR3 (Fig. 3) energized to keep the above-described holding circuit closed. The holding lead H is multipled to all the R-links. There is one relay CSR1 (Fig. 3) for each group of twenty-five lines, permitting the initiation of only one call in this sub-group at a time.

Once the relay CSR2 becomes de-energized upon the seizure of a B-link by an R-link, it cannot re-energize while relay CSR3 is energized because the latter removes ground from its winding. The de-energization of CSR3 can take place only upon the seizure of the calling line by a line finder. Owing to this blocking out of CSR2 while the line finder is hunting for the calling line, the momentary useless energization of all idle R-links is prevented. Such useless operation would occur whenever the line finder moves out of its home position and opens in its home contact ONC4 (Fig. 5) a shunt of CSR1 (Fig. 3). Since line relay LR (Fig. 2) is still energized, CSR1 would operate again and re-energize CSR2 to start up the idle R-links.

*R-link selects register*

T2R (Fig. 4) operates and places ground on the high resistance winding of T3R and over another front contact energizes clutch P2 of the register finder in which the selected R-link terminates. The register finder hunts for an idle register and when one is found, a circuit is established from ground, front T2R, high resistance winding of T3R, back CR, brush T and terminal of the register finder, winding RBR (Fig. 10), back RGR to battery. RBR and T3R operate. T3R opens the circuit of P2 and the register finder comes to rest. T3R shunts its high resistance winding by its low resistance winding in series with T4R, thus making the register busy to other R-links.

T4R places ground on the holding circuit of T3R and T4R over a front contact of FR. T4R opens the circuit of clutch P1 so that it is not re-energized when T1R makes its back contact which it does when the line finder contact ONC4 (Fig. 5) opens. T4R energizes ER of the R-link and also DR (Fig. 5) of the B-link, the latter over brush C and the back contact of FR1 (Fig. 5). DR lights guard lamp GL1 and removes the transmission bridge from the "*a*" and "*b*" wires, thus affording a clean pair of wires through from the subscriber's station to the register. DR also energizes the B-link release relay RR.

RR energizes relays BR (Fig. 6) of both the line finder and the first group selector of the selected B-link. The circuit for the line finder relay BR extends from ground, front RR (Fig. 5), winding of low resistance relay CR1 conductor *c*, (Fig. 6), binding post 3 of the line finder, upper contact "*a*," ONC2, high resistance winding of BR, binding post 8, to battery. For the first group selector relay BR, which is practically identical with the line finder and is therefore not separately illustrated, the circuit extends from ground over RR front (Fig. 5), FR2 back, low resistance relay CR2, conductor *c* (Fig. 6), binding post 3, and then in the same manner as traced for the line finder. CR1 and CR2 (Fig. 5) do not operate in series with the high resistances of the BR windings.

In the register, RBR operates HTBR which places high tension battery on GV1 and GVR1 and ground on the armature of GVR2. The register busy lamp BL lights.

*B-link selects calling line*

A circuit is established from ground, back contacts of relays (Fig. 10), ER, GVR3, RGR, RQR, GVR1, GSR1 and RFR, brush A of the register finder (Fig. 4), front ER, brush A of B-link finder, "a" wire of B-link (Fig. 5), terminal 1 and ONC1 (Fig. 6) of the line finder, windings of AR and P in parallel, terminal 8, to battery AR and P operate. AR disconnects the A, B, C and T brushes of the line finder from their normal circuits.

The line finder hunts for the calling line and as soon as it leaves its home position, ONC4 opens and ONC2 closes its lower contact before opening its upper contact *a*, thereby connecting the low resistance winding of BR to battery over front BR, front AR, resistor R and terminal 8. This happens before the circuit of the high resistance winding of BR is opened.

When the calling line is reached, a circuit is established from source of potential PC1 or PC2 depending whether the calling line is restricted or unrestricted, resistor *rt* (Fig. 2), front LR, binding post T, terminal and brush T of the line finder (Fig. 6), front AR, "b" wire of the B-link (Fig. 5), brush B of B-link finder (Fig. 4), front ER, brush B of the register finder, back RFR (Fig. 10), grids of triodes V2 and V4, and in parallel over a back contact of RGR to the grid of triode V6. The grids of triodes V1 and V3 are normally connected to potential PC1 over back contacts of RFR and RWR. The grid of triode V5 is normally connected to potential PC2 over a back contact of RGR Gas tubes GV1 or GV3 fire in the well known manner depending upon which of the two potentials PC1 or PC2 is on the "b" wire of the calling line. Gas tube GV2 cannot fire since its HTB circuit is open in a front contact of GR.

If the calling line is an unrestricted line (potential PC1), then GV1 fires and operates GVR1 which opens the circuit of the clutch magnet P and AR of the line finder (Fig. 6), stopping it on the terminals of calling line. GVR1 (Fig. 10) conects to ground at ER back, relay GR which energizes GSR1, whereupon RQR energizes over RWR back. RQR locks up over back GVR2, front RBR to ground. GR places high tension battery on GVR2 and GV2. GSR1 opens the high tension battery circuit of GVR1 and GV1. GVR1 opens the circuit of GR, but as GSR1 is slightly slow releasing, it does not make its back contact before AR (Fig. 6) and P of the line finder release and close the brush circuits.

Should the calling line be a restricted line (potential PC2), GV3 would fire instead of GV1. GV3 energizes GVR3 which releases AR (Fig. 6) and P of the line finder. RSR (Fig. 10*b*) and GR (Fig. 10) are energized in parallel over back contacts of RAR and ER and front contact of GVR3. GR energizes GSR1 which actuates RQR. From there on, the operation of the circuit is the same as though an unrestricted line were calling. RSR (Fig. 10*b*) shifts the connection from potential PN9 to potential PN0 whereby, when a restricted station attempts to make a city call by keying the digit 9, it will be automatically routed to the PABX operator just as though the digit zero had been keyed. RSR locks up over a front contact of R1R (Fig. 10).

These operations constitute the first test of the calling line by the line finder.

*Double testing*

In order to provide a means for allowing the line finder or a selector to come to rest on the terminals of a line without disturbing it but to prevent unwanted double connections or connections with a wrong line or trunk, the circuits provide for two tests—the first as above-described over the T-terminal which stops the hunting operation of the switch and the second over the B-terminal when the switch stops. The purpose of the second test is to check whether the trunk or line upon which the switch has stopped is the proper one.

When GR (Fig. 10) applies HTB to GV2, a second test circuit is closed from the grid of V4, RFR back, B-link and then through the path previously traced to the "b" wire of the line finder (Fig. 6), AR back, B wiper, LR front (Fig. 2), *rt*, to PC.

Since the line finder and all selector switches are alike, this double test will be explained in greater detail by reference to Fig. 15 in which a final selector is shown in the hunting position, the normal position of the final being shown in Fig. 13. Enough of the group selector and register is shown in Fig. 15 to avoid reference to the specific circuit drawings.

The BR and AR relays and the clutch magnet P of the final are energized. The register is set for potential PX, which potential is on the grids of V1 and V3. Thus, when the test brush of the final reaches the T-terminal identified by potential PX, GV1 fires and energizes GVR1 which opens its back contact (in one or two milliseconds), releases AR and P and energizes GR which, in turn, energizes GSR1. The final comes to rest. GV2 does not fire with GV1 because it is without high tension battery when the first test is made.

When AR releases, it disconnects the T-brush from the "b" wire leading to the register, and in place thereof connects the B-brush to the "b" wire. Then it connects the C-brush to ground through the low resistance winding of relay BR. Simultaneously, GR in the register energizes GSR1 and places high tension battery on GV2. By this time AR in the final has disconnected the T-brush and connected to the B-brush with the *b* wire. GSR1 energizes quick operating relay RQR which locks up over a back contact of GVR2. All this takes place before COR of the called line breaks its back contact N allowing the momentary closure of a second test circuit from PX, resistance *rt*, back contact N of COR, brush B of the final, back AR, brush B of group selector to the grids of V2 and V4. High tension battery is now connected to GV2, and the latter fires energizing GVR2, which releases RQR and advances the register to the next position.

RQR opens its front contacts before GSR1, which is slow releasing, makes its back contacts. As the main gap of GV2 is closed through the *rt* resistor of the called line, the potential is raised to a busy value in 100 to 200 microseconds. This busy potential remains on the "b" wire until COR breaks its back contacts.

GV2 is de-ionized when GVR1 breaks its front contact which occurs after GSR1 breaks its back contacts.

This double testing and almost instantaneous busying on the second test eliminates all practical possibility of a double connection with a free line or a connection with a wrong line or trunk.

The double test feature of the group selectors and line finders functions in the same manner as above-described.

Should the called line be busy, its COR will be energized. When, therefore, the second test is made, potential PX will be disconnected from the "b" wire and GV2 will not fire. When GSR1 makes its back contact, it causes the register to go to the busy position, in which the final selector is released without disturbing the busy connection. This will be described in greater detail below.

*Second test at line finder*

The line relay LR (Fig. 2) applies the calling potential PC1 or PC2, as the case may be, to the B-terminal of the line finder over its front contacts. When AR of the line finder (Fig. 6) releases after the first test, it establishes the second test circuit over the *b* wire as above traced.

In the register GV2 (Fig. 10) fires and energizes GVR2, GVR2 energizes RER, circuit from ground, front RBR, front GVR2, another front contact of RBR, winding RER to battery. RER energizes GSR3 and register release relay R1R. R1R energizes RAR, RGR and RFR in parallel. RAR releases GR, and RGR releases RBR. GR releases RER but RER remains on its front contact long enough to hold R1R and GSR3 energized until the register is placed fully under the control of the calling station, as described below.

When R1R operates, it closes a circuit from ground, front R1R, resistor R, back RPR, terminal and brush C (Fig. 4) of the R-link, front ER, winding CR, back GR2 to battery. CR operates and opens the "*t*" wire to the register, whereupon T3R and T4R release. FR also releases.

All this happens shortly after the cut-off relay COR (Fig. 2) becomes energized over wiper C of the line finder (Fig. 6), AR back, BR front and winding, ONC2, wire *c*, CR1, front RR, to ground. COR (Fig. 2) releases the line relay LR which removes battery from the starting lead Z.

CR (Fig. 4) maintains ER energized and continues to ground the C-brush of the B-link finder. This holds DR (Fig. 5) energized when T4R (Fig. 4) falls away.

When RER (Fig. 10) operates GSR3, a circuit is established from ground, resistor R, back RWR, back RTR, resistor R, front GSR3, back CR, front RAR and then over the path previously traced to the "*a*" wire, through the station's telephone set, back over the "*b*" wire, front RAR, back CR, front GSR3, winding AR1 to battery AR1 operates and energizes BR and AR. BR locks up over back contacts of RPR and RVR, and AR connects through its front contacts AR1 in line circuit through resistor R to the "*b*" wire and ground from the front contact of AR1 through another resistor R to the "*a*" wire. AR holds the release relay R1R energized when RER falls away.

The connection of AR1 to the line circuit and the other important elements of the fundamental keying circuit are more clearly illustrated in Fig. 11. The various relays are shown in their operated or non-operated condition at the moment when GSR3 closes its front contacts. A number of resistors are included in the energizing circuits of AR1 so as not to produce an objectionable click in the operator's telephone circuit.

The normal and waiting condition of the fundamental keying circuit after AR1 and AR have operated is shown in Fig. 11*a*. The register always returns to this condition after keying a digit.

When RFR (Fig. 10) is energized by R1R, it transfers the fundamental tube selection circuit from the A and B terminals of the R-link to the F and G terminals which are connected over the R-link with the *a* and *b* wires of the B-link on the group selector side. BR grounds the primary winding of the tone transformer TT over a back contact of DTR and keying tone interrupter DTI.

The secondary winding of TT is bridged across the "*a*" and "*b*" wires through condenser C. The calling station hears the keying tone and may now key the number of the wanted station.

*Key group selection*

The ten numerical keys (Figs. 12 and 12*c*) at each station are divided into two groups: keys 1 to 5 and keys 6 to 0. When any key is depressed, the register automatically identifies the group. In this way, the number of numerical selections is reduced from ten to five.

When any key is depressed, the line circuit is momentarily opened at the key set in home contact 1 (Fig. 12*c*). This momentary opening of the line circuit releases AR1 (Figs. 10 and 11*b*). AR1 releases AR which breaks its front contacts quickly. When AR makes its back contacts, it connects the low resistance winding of NR (Fig. 10) to the "*a*" wire, circuit from battery, back GSR3 (Fig. 10), back contact and low resistance winding of NR, back DR, back AR, back CR, front RAR to the "*a*" wire. The return circuit over the "*b*" wire is through front RAR, back CR, back AR, back GSR3, back ER to ground.

When a key 1 to 5 is depressed, the connection of the rectifier S in the subscriber's set circuit (Figs. 12 and 12*c*) is always such as to prevent the flow of current through release magnet RM and consequently through NR (Fig. 10). Each of the key resistors R1 to R4 (Figs. 12–12*c*) is high enough to prevent the energization of NR. The maximum loop circuit resistance with the key release magnet RM in circuit is 1600 ohms. The minimum loop circuit resistance with a key resistor in circuit is 750 ohms.

Should a key 6 to 0 be depressed, the connection of the rectifier S (Fig. 12*c*) is reversed. As the resistances of RM and NR are both relatively low, sufficient current flows to energize NR, which breaks its back contact quickly and introduces into the line circuit its high resistance winding of 2000 ohms. The release magnet RM at the substation does not operate. When NR operates, it energizes CR (Fig. 10) which locks up over a back contact of AR and a front contact of R1R. CR reverses the connection to the line wires *a* and *b* so that key selection always takes place when the keying control circuit is as shown in Fig. 12 no matter which key is depressed.

It is this reversal of rectifier connections at the subscriber's station which distinguishes between the two groups of keys. It will be seen from Fig. 12 that pairs of keys, each belonging to a different group, such as 1 and 6, 3 and 8, etc., make use of the same resistors and therefore develop the same potentials in the keying control circuit.

The bridge diagram of Fig. 12*a* explains more clearly the simple principle upon which the keying circuit operates. As long as the bridge is set to give the cathode of V5 or V6 in the register a noticeably negative potential with respect to its grid, enough current flows in the corresponding anode circuit to reduce the potential at the control grid of the gas valve GV to a point below breakdown value. When the potentials of both cathodes, and consequently both grids of V5 and V6 become the same or come within less than 1 to 1.5 volts of each other, then no appreciable current flows in the anode circuit, the potential of the control grid of GV rises to breakdown value and the gas valve fires.

*Subscriber keys wanted number (635)*

We shall assume that the PABX numbers have three digits, and that the calling station keys No. 635 when he hears the keying tone.

*Subscriber keys first digit (6)*

When digit key 6 is depressed, it momentarily opens the line circuit and releases AR1 which releases AR (Figs. 10 and 11*b*). As the connection of the rectifier S at the substation is reversed, NR (Fig. 10) operates and energizes CR which locks up over a back contact of AR and a front contact of R1R. CR reverses the line connections so that the keying circuit will be as shown in Figs. 11*b* and 12. AR may make its back contacts before or at the time the line circuit is reclosed at the calling station.

Slightly slow releasing relay FR (Fig. 10), which was operated over AR and BR front, GVR3 and ER back, prevented premature operation of DR upon the de-energization of AR. When FR makes its back contact, DR is energized, circuit from ground, back ER, back GVR3, front BR, back AR, back FR, winding DR to battery. DR disconnects NR and closes its *"d"* contact before its *"c"* contact. The grid of V6 is connected to front contact *"d"* over a front contact of RGR. The keying circuit (Fig. 11*b*) to which grid V6 is now connected may be traced from battery, front R1R (Fig. 10), resistor RN, front contact *"d"* of DR, back AR, front CR, front RAR, *"b"* wire, then over the R- and B-links to the subscriber's station (Fig. 12*c*), contact 5, contact of key 6, resistors R1 and RC, switch hook, contact 2, *"a"* wire, front RAR, (Fig. 10) front CR, back AR, back GSR3, back ER to ground. No current passes through rectifier S in the subscriber's set. The closure of the bridge circuit (Figs. 12–12*b*) by key 6 places potential P1 (30 volts) on the grid of V6. The same potential is normally on the grid of V5 over a back contact of HR1 (Fig. 10*a*), and a front contact of RGR (Fig. 10).

GV3 fires and energizes GVR3 (Fig. 10), which removes ground from contact *c* of DR, thus opening the circuit of CR1 (Fig. 10*a*) before it has time to operate and lock up with HR1.

When GVR3 operates the following things happen: (*a*) The release magnet RM (Figs. 12*c* and 11*c*) in the subscribers' set is energized and key 6 is freed. (*b*) Counting relays CR5 and CR6 (Fig. 10*a*) operate. (*c*) TR1 and XR1 and XR2 (Fig. 10*b*) operate and record the keyed digit 6. (*d*) AR1 and AR (Fig. 10) are re-energized and AR1 is reconnected to the line (Fig. 11*a*) awaiting the keying of the second digit. These operations will now be described in detail.

GVR3 (Fig. 10) energizes GSR3, DTR, CR6, (Fig. 10*a*) RTR (Fig. 10) and TR1 (Fig. 10*b*) by connecting them in parallel to ground at ER back (Fig. 10) over RAR front and RER and RBR back. DTR, RTR and CR6 lock up to ground at R1R front. DTR disconnects the keying tone and RTR transfers the key release circuit from ground to positive battery.

None of the counting relays CR1 to CR4 (Fig. 10*a*) being energized, XR1 and XR2 (Fig. 10*b*) of the first group of digit storing relays operate when TR1 makes its front contacts, the circuit of XR1 extending from ground, back CR1, front TR1, winding XR1, to battery, and the circuit of XR2, from ground, front CR (Fig. 10), back CR1, (Fig. 10*a*) front TR1, (Fig. 10*b*) winding XR2 to battery.

When GVR3 releases, it removes ground from TR1 and a short circuit from CR5 which operates and locks up in series with CR6, circuit from battery, winding and front CR6 winding CR5, back XHR3 (Fig. 10*b*) front R1R (Fig. 10) to ground. The second ground connection for the above-mentioned short circuit may be traced from the winding of CR5, CR6 front, CR5 back, RBR and RER back (Fig. 10), RAR and GVR3 front, and ER back. XR1 and XR2 lock up in series with XHR1 (Fig. 10*b*) to ground at R1R (Fig. 10).

GSR3 recloses the keying or register control circuit, but this time from positive battery, front RTR (see Fig. 11*c*), front GSR3, front CR, front RAR, *"b"* wire, contacts 3 and 4 (Fig. 12*c*), rectifier S, winding of release magnet RM, switch hook, contact 2, *"a"* wire, front RAR, front CR, front GSR3, winding AR1 to battery. The direction of current is now such that it flows through rectifier S and release magnet RM. Both AR1 and RM have relatively low resistances, and the boosted current flow through both is sufficient to energize RM. When RM operates, it frees the depressed key (6) and restores the station circuit to normal (Fig. 11*a*). During the change to normal, the line circuit is not opened, AR1 remains energized and in turn operates AR. When AR makes its front contact, it shunts the line circuit by a resistor to ground, the object being to prevent momentary current flow through the telephone set.

GSR3 energizes RDR (Fig. 10*a*). The purpose of RDR is two-fold: first, to release any counting and holding relay which may have been locked up—in this case, none—and second, to open the high tension battery circuit, thus de-energizing GV3 and releasing GVR3. All this affords ample time for the proper energization of the release magnet RM at the subscriber's station and for the locking up of the digit-storing relays. When GVR3 breaks its front contact, GSR3 and RDR release and restore the register circuit to normal.

*Group selector selects final*

When XHR1 (Fig. 10*b*) operates, a circuit is established from ground, front XHR1, terminal 1, brush B of out digit switch P0, front RGR (Fig. 10), back contacts of RQR, GVR1, GSR1, front RFR, back RMR, brush F or register finder, front ER (Fig. 4), back BR, brush F of B-link finder, *"a"* wire of B-link (Fig. 5), ONC1 of the group selector, windings of AR (Fig. 6) and P to battery at binding post 8. AR and P operate and the group selector hunts for a free final having potential PN6 on the T-terminal. When the selector moves out of its home position, BR locks up over its low resistance winding, front AR, resistor to battery.

When a free final is reached, potential PN6 is placed on the grid of V2 (Fig. 10), circuit from PN6 (Fig. 13), binding post 6, resistance *rt*, ONC4, back BR, T-brush of group selector (Fig. 6), front AR, *"b"* wire of B-link (Fig. 5), G-brush (Fig. 4), back BR, front ER, brush G, back RMR (Fig. 10), front RFR to the grids of V2 and V4. The grids of V1 and V3 are connected to potential PN6 over front RFR, brush C of P0 (Fig. 10*b*), terminal 1, front XR1, front XR2, back XR3 to PN6.

As the grids of V1 and V2 are now at the same potential, GV1 fires and operates GVR1 which opens the *"a"* wire circuit, instantly releasing P and AR of the group selector (Fig. 6). The selector comes to rest on the terminals of the chosen final.

*Second test at group selector*

The second test is made in the usual way before BR (Fig. 13) of the final operates and if successful, as we shall assume it to be, GVR2 (Fig. 10) operates and energizes RCR (Fig. 10*a*), circuit from ground, front R1R (Fig. 10), back RBR, back RHR (Fig. 10*a*), front GVR2 (Fig. 10), back RBR, back RMR, winding RCR (Fig. 10*a*) to battery. RCR energizes the out-control switch magnet P0.

*First group of digit storing relays released*

When RCR (Fig. 10*a*) makes its front contact, it places battery on the windings of XHR1, XR1 and XR2 (Fig. 10*b*) over DRR back, brush A of P0 in position 1, and short-circuits them. This group of relays releases and is now ready to store another digit but since the three groups of digit storing relays are allotted in order by counting relays CR5 to CR8, each group will be used only once when three-digit calls are keyed.

When GSR1 (Fig. 10) breaks its back contacts, it de-ionizes GV1 and releases GVR1. GVR1 releases GR. GR releases GSR1 and GVR2 and de-ionizes GV2. When GVR2 breaks its front contact, RCR (Fig. 10*a*) falls away, de-energizes magnet P0 which advances the out-control switch P0 to the next position. The switch arrives in this position before GSR1 (Fig. 10), which is slow releasing, again makes its back contact and recloses the "*a*" wire circuit through to the B-brush of P0 and the high tension battery circuit to GV1.

BR (Fig. 6) of the group selector is held during hunting over a circuit from ground at the B-link, front RR (Fig. 5), back FR2, winding of low resistance relay CR2, conductor *c*, post 3, lower contact of ONC2 (Fig. 6), low resistance winding and front BR, front AR, resistor R, post 8 to battery. When AR releases, it closes the C-brush circuit to the final before opening the circuit of BR through resistor R. Thus, the circuit of BR is extended over brush C, post 3 (Fig. 13), ONC2 of the final, high resistance winding of BR, post 8, to battery. Since the resistance of BR of the final is relatively high, CR2 (Fig. 5) of the B-link does not operate.

*Subscriber keys second digit (3)*

When key 3 is depressed, the rectifier in the subscriber's set does not reverse. NR (Fig. 10) and CR do not operate. Key 3, as will be seen from Fig. 12, places potential P3 (23.5 v.) on the grid of V6. Since the grid of V5 is normally connected to potential P1, GV3 does not fire the instant the bridge circuit is closed. Instead, counting relay CR1 (Fig. 10*a*) operates from ground, back ER (Fig. 10), back GVR3, front BR, back AR, back FR, front "*c*" of DR, back HR1 (Fig. 10*a*) back and winding of CR1, back RDR to battery. CR1 operates and removes the short-circuit from HR1 which operates and locks up both relays to ground over a front contact of R1R (Fig. 10). This transfers the leads from the grid of V5 and DR to the next pair of counting and holding relays. Instead of potential P1, potential P2 (26 v.) is now applied.

CR2 and HR2 (Fig. 10a) now operate and lock up in the same manner as CR1 and HR1. When HR2 transfers the grid of V5 from potential P2 to potential P3 (23.5 v.) GV3 fires and energizes GVR3 which operates and opens the circuit of CR3 and HR3 before these relays have time to operate and lock up.

GVR3 (Fig. 10) operates GSR3 and energizes counting relay CR8 (Fig. 10*a*) and transfer relay TR2 (Fig. 10b). Digit storing relay XR3 of the second group operates and when GSR3 releases TR2, XR3 locks up in series with XHR2. CR7 locks up in series with CR8. The following table explains the operation of the counting (CR) and storing relays (XR) depending on the digit keyed.

| Digit Keyed | Relays Energized | |
|---|---|---|
| | CR | XR |
| 1 | None | 1 |
| 2 | 1 | 2 |
| 3 | 2 | 3 |
| 4 | 3 | 4 |
| 5 | 4 | 1,3 |
| 6 | None | 1,2 |
| 7 | 1 | 2,3 |
| 8 | 2 | 3,4 |
| 9 | 3 | 1,4 |
| 0 | 4 | 1,2,3 |

GSR3 (Fig. 10) re-energizes AR1, and AR1 in turn operates AR. GRS3 operates RDR which de-ionizes GV3, whereupon GVR3 and the counting and holding relays CR1, CR2 and HR1, HR2 release.

The register is now ready to receive the third digit.

*Final selects "tens"*

The arrangement of the lines in the final banks is shown in Fig. 14. The 100 lines have each four terminals A, B, C and T, and are divided into ten groups of ten each. The groups are numbered 1 to 0. Preceding each group of ten lines is a set of terminals representing a "tens" position. The T-terminals of the ten "tens" positions are connected to potentials PT1 to PT0, respectively. The ten lines in each group following a "tens" position have their T-terminals connected to potentials PN1 to PN0, respectively. The PT potentials and the PN potentials are of different polarity (see table, Fig. 16). The off-normal contacts of the final in Fig. 13 are shown in their normal position, i. e. when the switch is in its home position. When the final stops at any "tens" position, contact ONC1 recloses, but the other three contacts remain in their operated condition.

When XHR2 (Fig. 10*b*) makes its front contact, it places a ground on terminal 2 of the B-bank of the out-control switch P0, AR (Fig. 13) and P of the final selector are energized and the final selector hunts for the "tens" position having the potential PT3. This "tens" position normally precedes the third group of "tens" (Fig. 14). When the final reaches the third "tens" position, potential PT3 is placed on the grids of V2 and V4 (Fig. 10). The grids of V1 and V3 are connected to the same PT3 potential over front RFR, brush C (Fig. 10*b*), terminal 2, back XR1 of the second group, back XR2, front XR3, back XR4, back RNR to PT3. GV1 (Fig. 10) fires and operates GVR1 which opens the "*a*" wire circuit of AR and P (Fig. 13). The final comes to rest on the selected "tens" terminals. In the register GVR1 (Fig. 10) operates GR which operates GSR1.

*Second test in "tens" position*

When the final stops in the "tens" position, the second test is made over the "*b*" wire in the usual way. The B-terminals in the "tens" position are strapped to the T-terminals (Fig. 14). GV2 (Fig. 10) fires and energizes GVR2 which releases RQR and energizes RCR (Fig. 10a), sending the out-control switch P0 from position 2 to position 3.

The second set of digit storing relays release.

*Subscriber keys third digit (5)*

When key 5 is depressed, the line loop is opened and the potential on the grid of V6 (Fig. 12) remains 48 volts, circuit from battery, front R1R, (Fig. 10) 2000 ohms resistor RN, front RGR to the grid of V6. GV3 does not fire when RDR (Fig. 10a) operates. Instead, the counting and holding relays run through, and when HR4 closes its front contact, it operates GSR3 (Fig. 10) just as though GVR3 had operated, circuit from ground, back ER, back GVR3, front BR, back AR, back FR, front DR, front HR1, 2, 3 and 4, (Fig. 10a), winding GSR3 (Fig. 10) to battery. As all the counting and holding relays are energized, relays XR1 and XR3 (see table, supra) of the third group operate and lock up in series with XHR3 and place potential PN5 on terminal 3 of bank C. AR1 and AR operate for the third time and the counting and holding relays release, all as previously described.

*Final selects units*

Off-normal contact ONC1 (Fig. 13) closes when the final stops in a "tens" position. ONC2 and ONC4 remain open and ONC3 remains closed. Thus when XHR3 (Fig. 10b) grounds the "a" wire over terminal 3 of bank B of P0 for the third time, AR (Fig. 13) and P operate and the final hunts a second time, this time for the terminal in the group following the "tens" having the potential PN5. When this terminal is reached, GV1 (Fig. 10) fires and operates GVR1. The final comes to rest on the terminals of the wanted line, whether it be free or busy.

*Second test of station line*

The final tests the called line a second time as above-described. The test is successful only if the line is free.

*Called line free*

If the called line is free, its cut-off relay COR (Fig. 2) becomes energized when the C-brush of the final (Fig. 13) closes a circuit from ground, post 7, ONC3, front and low resistance winding of BR, back AR, final brush and terminal C, winding of cut-off relay COR (Fig. 2) to battery. COR disconnects the line relay LR from the line and the B-terminal from the T-terminal.

When P0 (Fig. 10b) goes to position 4, RPR (Fig. 10) is energized, circuit from ground, brush E of P0 (Fig. 10b), back RHR, (Fig. 10a) brush D, (Fig. 10b) winding RPR (Fig. 10) to battery. RPR opens the holding circuit of the slow releasing relay R1R, grounds the C-terminal of the register finder over RVR back, and releases BR.

The direct ground on the C-terminal energizes DR (Fig. 4) of the R-link. This relay was not energized when R1R (Fig. 10) grounded the C-terminal over resistance R, but will now energize BR (Fig. 4) over DR front and LR back, and BR in turn energizes AR of the R-link. BR disconnects the F and G brushes of the B-link finder from the register and in place thereof connects G to ground and F to a source of ringing current over a back contact of LR, winding of RRR and front DR. The bell of the chosen station is thus given an immediate initial ring. When DR falls away, as explained later, ringing current is connected over the usual ringing interrupter RI.

AR (Fig. 4) bridges the windings of GR1 and GR2 across the "a" and "b" wires of the calling line before R1R (Fig. 10) releases the register and disconnects AR1 from the line, thus preventing an objectionable click in the telephone set. GR2 (Fig. 4) locks up AR and BR over a back contact of RRR, and opens the circuit of CR, which releases ER, whereupon the R-link is disconnected from the register. AR maintains the ground on the C-brush of the B-link finder, this time through HR. Thus DR (Fig. 5) of the B-link is not released. BR (Fig. 4) closes the primary winding of transformer TT over back LR and ringing tone interrupter I. The secondary winding of TT is bridged across the calling line through condenser C and front contacts of AR, and the calling subscriber hears the ringing tone.

*Register releases*

When R1R (Fig. 10) breaks its front contacts, it unlocks DTR, RAR, RGR, RFR and any other relay which may happen to be locked up. The previous release of BR by RPR prevents the energization of DR when AR releases. BR releases FR. RFR restores the out-control switch P0 (Fig. 10a) to normal over interrupter X.

*Called station answers*

When the called subscriber removes the handset and closes the line through his telephone set during or between the ringing periods, RRR (Fig. 4) operates in the well known manner and opens in its back contacts the circuit of BR and AR of the R-link. AR removes ground from the B-link finder brush C, which de-energizes DR (Fig. 5) of the B-link.

The calling and called lines are now placed in telephonic communication, the transmission current being supplied over supervisory relays S1R and S2R. S1R maintains energized the B-link release relay RR.

The R-link is now free for use in another connection.

*Called line busy*

Should the called line be busy, the final will come to rest on the terminals of the called line and AR (Fig. 13) will release, but potential PN5 will not be found on the B-terminal. Therefore, GV2 (Fig. 10) does not fire and GVR2 does not operate to release RQR. When GSR1 makes its back contacts, it energizes RVR, over a front contact of RQR. The out-control switch P0 (Fig. 10a) remains in position 3 since RCR is not energized. RVR (Fig. 10) releases R1R and BR and the register returns to normal as on a successful connection.

RVR grounds terminal E of the register finder which energizes LR (Fig. 4). BR energizes, whereupon AR energizes and bridges GR1 and GR2 across the "a" and "b" wires. GR1 is quick operating and closes a momentary circuit from negative battery, front ER, front LR, front GR1, E-brush of the B-link finder (Fig. 5), rectifier S2, winding FR2 to ground. FR2 operates and opens the "c" wire of the group selector which releases BR (Fig. 6) of the group selector and this in turn opens its locking circuit so that it is not re-energized when FR2 closes its back contact at the end of the pulse.

LR (Fig. 4) disconnects BRR and ground from the F and G brushes and transfers the primary winding of TT from the ringing tone interrupter I to the busy tone interrupter BTI. The calling subscriber hears the busy tone.

GR2 releases GR, whereupon ER disconnects the register as on a successful call.

*Group selector and final released*

When BR (Fig. 6) becomes de-energized, it energizes AR and P over a back contact and ONC3. AR opens the A, B and C brush circuits and the group selector returns to its home position, whereupon ONC3 opens and releases AR and P. BR is again energized but this has no consequences at this stage.

When AR of the group selector opens the C-brush, BR (Fig. 13) of the final releases, which energizes AR and P of the final. AR disconnects the A, B and C brushes from the called line and the final returns to its home position.

When AR (Fig. 13) of the final connects the A and B brushes to the busy line, the busy connection is not disturbed because the circuit of brush A is open at a back contact of RQR (Fig. 10) of the register and brush B is connected to the cathodes of V2 and V4 through resistances of the order of 500,000 ohms (not shown).

When brush B tests a busy line, it will find a negative potential of some value less than half the exchange voltage, assuming that the transmission bridge of the busy connection has legs of equal resistance. As the PN potentials are positive (Fig. 16) there is no possibility that the potential found on the B-terminal be of the same polarity as that for which the register is set. The wanted line may be tested between ringing periods but in this case the "*b*" wire will be grounded. The line may be tested also while it is open, or during keying, but since the B-terminal has either no potential or a negative one, the line will test busy and the high impedance of the cathode circuits of V2 and V4 will prevent interference with keying.

*Stations release*

When the calling station hangs up, S1R (Fig. 5) falls away and releases RR. RR removes ground from the "*c*" wire of the finder (Fig. 6) which releases and returns to its home position. The group selector (Fig. 6) and final (Fig. 13) however, do not release until the called station hangs up, since the "*c*" wire of the group selector is grounded during conversation over a front contact of S2R (Fig. 5). This prevents a false call to the register should the calling subscriber hang up before the called subscriber.

*Stations having same number*

A group of lines in a final bank may be given the same PN potential, and be thus selectable in response to the keying of the same number. As long as this number is not used for other purposes between the same "tens" positions, the lines need not be consecutive nor included with a normal "tens" group of ten terminals. Adjacent "tens" positions may be used to form a single group if as above stated, the same PN number is not assigned for more than one purpose in the enlarged group between two end "tens" positions. All lines of a group, except the last, have the short-circuit removed from the back contact of COR (Fig. 2) of the subscriber's line circuit. When COR is operated, the PN potential is removed from the T-terminal and the final will pass over all busy lines, except the last one on which it will find the PN potential permanently connected and will stop in the usual way.

*Premature releases*

Should the calling subscriber hang up before an R-link has selected a B-link, LR of the subscriber will open the starting circuit and FR (Fig. 4) of each hunting R-link will release and restore the associated circuits to normal.

Should the calling subscriber hang up after an R-link has selected a B-link but before a register is selected, LR (Fig. 2) will through the starting circuit (Fig. 3), release FR (Fig. 4) which, in turn, will release T1R and T2R. When T2R breaks its front contacts, the register finder is released.

Should the calling subscriber hangup before the register is connected with the calling line, LR (Fig. 2) will release FR (Fig. 4). FR will release T3R and T4R of the R-link and RBR (Fig. 10) of the register. T4R (Fig. 4) releases ER which restores the R-link to normal. DR (Fig. 5) is also released and restores the B-link to normal. When RBR (Fig. 10) makes its back contacts, the register is restored to normal.

Should the calling subscriber hang up after the calling line has been connected to the register but before the completion of selection, AR1 (Fig. 10) releases AR. AR1 is not re-energized when the counting and holding relays run through and energize GVR3 (Fig. 10), because the line circuit is open.

AR releases slow release relay R1R. When R1R breaks its front contact, the register is restored to normal.

*Guard and supervisory lamps—B-link*

When DR (Fig. 5) is energized, it lights the guard lamp GL1. This indicates that the B-link is connected to a register.

Should the calling subscriber fail to hang up after release by the called subscriber, a circuit is established from ground, front S2R, guard lamp GL2, back RR to battery.

*Busy and progress lamps—register*

The register is provided with a busy lamp BL (Fig. 10) which lights whenever the register is picked up and remains burning as long as the register is held. There are a number of progress lamps PL1, PL2, etc., nine of which are shown in Fig. 10*b*. They indicate the stage of selection reached.

There is a hunting lamp HL (Fig. 10*a*) which is lighted as long as hunting continues. It goes out between selections. When it is out, it indicates that selection is ahead of keying.

*Register busy key and routine test*

Each register is provided with a busy key BK (Fig. 10) which, when thrown, prevents the selection of the register. It does not interfere with selection if thrown after the register has been connected with the calling station.

A routine test circuit (not shown) picks up the register in the same manner as an R-link when the busy key is thrown and remains connected until the busy key is restored.

IN-TRUNK CALL TO PABX

*City subscriber selects trunk*

Any free trunk may be picked up at the city central office and ringing current applied to it in the usual way. The central is indicated at R (Fig. 17). Ringing relay AR at the PABX operates and energizes BR. BR lights the calling lamp CL, locks up over a back contact of HR, TA (timed alarm) contact and TR back, and removes potential PN9 from the T-terminal of line finders having access to this trunk, thus making the junction instantly busy to any hunting line finder or group selector at the PABX.

BR connects TA to the back contact of AR. The ringing cycle usually consists of about 1½ seconds ringing current and 2½ seconds direct current. As AR operates on A. C. only, it is on its back contact for 2½ seconds and on its front contact for 1½ seconds. While on its back contact, it operates TA but the moment its back contact is broken, TA restores to normal. Should the calling subscriber hang up before the call is answered, the ringing current will be cut off at the central office, AR will rest on its back contact and TA will continuously operate until in five seconds the locking circuit of BR opens. This restores the trunk to normal and prevents burning all night of the calling lamp in case of an unanswered night call.

*PABX operator answers*

A trunk may be multipled to any number of PABX operator's positions. Each position having access to the trunk has a duplicate of the calling, supervisory and busy lamps, listening key (LK) and release key (RLSE. K) and relay LR. The circuit is so designed that only one operator at a time may answer a call and no operator can connect trunks together by throwing two or more listening keys simultaneously. That listening key which has its series contact in the preferential position will operate the associated relay LR, and only through this relay may an operator be connected with a trunk.

To answer a trunk call when a calling lamp CL lights, the PABX operator throws the listening key LK which energizes HR and LR, circuit from battery, back CR (Fig. 17*a*), one winding of HR (Fig. 17) contact of LK, winding LR, contact of LK, in series through other LK's, conductor 4, common concentration key CK (Fig. 18) to ground.

Should two operators throw listening keys of the same trunk simultaneously, that key which first closes the lower series contact circuit will take charge of the trunk. Similarly, should an operator attempt to connect two trunks together by throwing two listening keys, the upper series contacts will prevent two LR's (Fig. 17) at the same position from operating simultaneously, and while an LR relay is energized there can be no connection with the trunk.

There are two kinds of series contacts on the listening keys: one for each position at which the trunk appears, and the other for each trunk at the same position. The first prevents two or more operators from connecting their telephone set to the same trunk and the second prevents an operator from connecting with more than one trunk at a time.

HR locks up over a second winding across the "*a*" and "*b*" wires of the trunk in series with high impedance relay TR and a trunk release key. TR operates. The circuit connections at the main or central office will now be in the condition indicated at TD. HR places battery on the operating windings of HR and LR in multiple with the back contact of CR (Fig. 17*a*). This prevents the release of LR (Fig. 17) and HR should the operator be listening in on the trunk when the called station answers.

HR releases BR and opens the "*t*" wire so that potential PN9 will not be again connected to the T-terminal when BR makes its back contact. HR lights the busy lamp BL over the contact of TA. BR releases TA and extinguishes the calling lamp CL.

*PABX operator keys first digit (6) of wanted number (635)*

As soon as the PABX operator hears the number or name of the wanted station, she may immediately depress the first digit key at her position (Fig. 18) without disturbing the conversation. This key set is arranged in the same manner as the ones at the substations. A register is automatically picked up and the first digit is stored, after which the digit key is released. By this time the operator will, in most cases, have checked the name and number of the wanted station and, therefore, may key quickly the remaining two digits. The operator need not listen for the keying tone as a station does.

Should the wrong first digit key be depressed, the operator may release the connection instantly by momentarily throwing the common breakdown key BDK (Fig. 18) after which the correct number may be keyed, another register being automatically picked up. During normal traffic, the average time from the depression of the first digit key to its release is about one second—not longer than the minimum time required by the PABX operator to check the wanted station or number with the calling party.

When the first digit key 6 is depressed, common key contact 2 (Fig. 18) closes a circuit from ground, contact 2, back OAR, winding OAR, concentration key, conductor 6, front LR (Fig. 17*a*), winding ER to battery. OAR (Fig. 18) locks up over a front contact. The digit key remains depressed and OBR (Fig. 18) operates over a front contact of OAR. OAR bridges one winding of OCR across the A and B terminals of the trunk over conductors 7 and 8, and back ODR and OCR. Common key contact 5 opens.

ER (Fig. 17*a*) disconnects the A and B terminals from the trunk wires, closes the starting circuit Z (Fig. 3) to the R-links, and places calling potential PC1 on the T-terminal.

In the same manner as when a subscriber calls, an R-link picks up a B-link and then a register, after which a line finder picks up the calling trunk of Figs. 17, 17*a*. The trunk is double tested in the usual way. When the line finder (Fig. 6) seizes the trunk, the cut-off relay COR (Fig. 17*a*) operates over its two windings in series, disconnects calling potential PC1 from the T-terminal and removes battery from the starting circuit Z. The hunting R-links come to rest.

After the trunk has been picked up by the line finder and RER (Fig. 10) of the register operates, GSR3 energizes and connects ground to the "*a*" wire and the winding of AR1 to the "*b*" wire, thus closing the "*a*" and "*b*" wire circuit through the bridged winding of OCR (Fig. 18). AR1 (Fig. 10) locks up and holds the register, the circuit being as shown in Fig. 11*a*. OCR (Fig. 18) becomes energized and releases slow releasing relay OBR which makes its back contact after GSR3 (Fig. 10) has made its back contacts. When OBR makes its back contact, it operates ODR which, due to a long changeover, momentarily opens the line circuit and releases AR1 (Fig. 10) and AR. The length of opening by ODR is about the same as that of common contact 3 of the ten-button key set of the operator. When ODR closes its front contact, it places the key set across the register circuit and as digit key 6 is depressed, the register operates and stores digit 6 just as though it had been keyed from a station.

After storing the first digit, the register operates the key release magnet RM (Fig. 18) in the usual way, which frees the depressed digit key 6. Key contact 5 closes and places a 600 ohm holding shunt R across the "a" and "b" wires to the register. Relays OAR, OCR and ODR remain locked up until the operator's listening key LK (Fig. 17) is restored.

The group selector operates and selects a final under the control of the register in the usual way.

*Operator keys remaining two digits (3) and (5)*

The PABX operator keys these two digits in the same manner as a station would. Each time a key is depressed, the line circuit to the register is momentarily opened by contact 3 (Fig. 18) and the shunt is removed from the key set by contact 5.

*Operator's key set released*

When the third digit is stored, XHR3 (Fig. 10c) closes a circuit from battery, front XHR3, back FCR (Fig. 10a), D-brush of R-link (Fig. 4), front ER, D-terminal of B-link (Fig. 5), wire *t*, line finder post 4 (Fig. 6), AR back, post 4, wiper T, T-terminal of trunk (Fig. 17a), front COR, front ER, rectifier S2, in multiple through FSR and KR, front TR (Fig. 17) to ground. KR operates but not FSR. KR does a number of things: (*a*) It places a holding shunt including RET across the A and B terminals so as to hold the register when the key set is disconnected, and then to hold the R-link; (*b*) it short-circuits OAR (Fig. 18) of the operator's telephone circuit which releases relays OCR and ODR and disconnects the key set; (*c*) it closes an energizing circuit over a winding of S1R and S2R (Fig. 17a).

S1R energizes CR (Fig. 17a) which does the following things: (*a*) It short-circuits the locking winding of HR (Fig. 17); (*b*) it removes the short-circuit from transmission circuit condensers C1 and C2 and connects transmission bridge supervisory relays S1R and S2R to the called station side of the trunk; (*c*) it substantially short-circuits the high resistance winding of COR (Fig. 17a) over low resistance relay FR, which does not operate under these conditions since it requires double current to operate; (*d*) it removes battery from HR and LR (Fig. 17) which, however, is replaced over a front contact of KR (Fig. 17a) so that the operator may listen in at will until KR is released.

The shunting of the high resistance winding of COR (Fig. 17a) by FR energizes CR1 (Fig. 5) of the B-link which energizes ER (Fig. 5) and removes the local transmission bridge preparatory to trunk connection. ER (Fig. 5) energizes AR which holds the B-link.

*PABX operator may handle a call while supervising others*

On normal calls the PABX operator restores the listening key to normal as soon as the key set is released but not before. This is indicated to her by the release of the last digit key which takes place almost immediately after depression. The call will automatically proceed and the operator needs only to supervise it from time to time.

*Called line free—PABX operator receives "ringing flash"*

If the called line is free, the R-link goes to the ringing position, as above described. Before the register releases and removes battery from the "*d*" wire of the R-link, BR (Fig. 4) of the R-link operates and connects the "*d*" wire to battery in multiple over resistor R and flash interrupter FI1 which intermittently places full battery potential on the "*d*" wire.

When the full negative potential is placed by the interrupter on the "*d*" wire, and thence through the B-link and the line finder on the *t* wire of the trunk, FSR (Fig. 17a) operates. When only the resistor R (Fig. 4) is in the circuit, FSR falls off. In this way the circuit of the supervisory lamp SL (Fig. 17a) is intermittently opened and a distinctive ringing flash is given to the PABX operator. FSR also connects the trunk wires to the A and B terminals through small condensers C4, C5 so that the ringing or busy tone may be heard during the flash intervals.

The supervisory lamp may be flashed four distinctive ways: (1) ringing flash, (2) busy flash, (3) operator call flash, and (4) extra charge flash. These flashes may be timed in any conventional manner; the flash (1) may be slow regular, (2) slow irregular, (3) fast regular, and (4) fast irregular. By means of these flashes the PABX operator is enabled to supervise more or less continuously and without listening in. We are now concerned only with the ringing flash which the operator receives in addition to the ringing tone heard also by the calling subscriber.

*Called station answers*

When the called station answers, the R-link releases. The high resistance winding of the cut-off relay COR (Fig. 17a) being substantially short-circuited by CR, CR1 (Fig. 5) of the B-link is energized. ER (Fig. 5) energizes and removes the local transmission bridge. ER energizes RR and holds the B-link busy. When BR (Fig. 4) of the R-link falls off, battery is removed from the "*t*" wire of the trunk and KR (Fig. 17a) and FSR release. KR releases ER (Fig. 17a) which extends the transmission circuit, including S1R and S2R through to the called station. KR removes ground from S1R which now remains energized in series with the called station.

With KR de-energized and CR energized, the operator may not now listen in. However, should she be listening at the moment when the called station answers, a warning tone circuit will be closed from the *a* wire, back KR (Fig. 17a), front TR (Fig. 17), front LR, small condenser C6, common warning tone transformer TT to ground. This warning tone is not objectionable and will be sufficient to inform the parties that the PABX operator is still in on the connection. HR and LR (Fig. 17) are energized over a front contact of HR but once the listening key is restored, these relays fall away, the right-hand winding of HR being short-circuited by CR (Fig. 17a).

The supervisory lamp SL (Fig. 17a) goes out when ER releases. The busy lamp BL (Fig. 17), however, remains burning as long as the trunk is in use.

*Called station busy—PABX operator receives "busy flash"*

Should the called station be busy, the register sends the R-link to the busy position in the usual way and the group and final selectors release. Since LR (Fig. 4) is energized in place of DR, the busy tone is applied to the trunk and the busy flash to the "*d*" wire over flash interrupter FI2. Thus FSR (Fig. 17a) is intermittently operated and transmits the busy flash to the PABX operator.

*Calling subscriber hangs up first after successful call*

When the outside subscriber hangs up first, the connection at the central office breaks down as far as the final which is held by the shunt over the *a* wire, relay TR (Fig. 17), CR front (Fig. 17*a*), COR front, FSR back and the *b* wire (Fig. 17). When the called station hangs up, S1R and S2R (Fig. 17*a*) fall off and S1R releases CR which removes the above traced shunt from the trunk. The final at the central office releases.

CR removes also the shunt from the high resistance winding of COR, thus causing CR1 (Fig. 5) of the B-link to fall off and release ER. ER releases RR, and the B-link releases the final and returns to normal.

*Called station hangs up first*

Should the called station hang up first, S1R, S2R, CR and COR (Fig. 17*a*) of the trunk will release, after which the B-link and the final release. High resistance relay JR (Fig. 17) is now bridged across the trunk from the *b* wire, over COR back (Fig. 17*a*) rectifier S1 (Fig. 17), BR and LR back, to the *a* wire. JR remains energized, holds the trunk busy by opening its back contact, and lights the busy lamp BL until the calling subscriber hangs up, at which time the final releases since the resistance of JR is too high to hold it. The direction of current flow is reversed when the central office end of the trunk returns to normal as shown at N (Fig. 17). JR releases, closes the "*t*" wire circuit and extinguishes the busy lamp, thus freeing the trunk.

*Calling subscriber hangs up on no-answer or busy call*

As previously explained, FSR (Fig. 17*a*) operates during the closed intervals of the ringing and busy flash interrupters. When operated, FSR removes the short-circuit from JR (Fig. 17) which is closed over FSR back and COR front (Fig. 17*a*). TR (Fig. 17) falls off when FSR operates, but JR operates and maintains closed the circuit of slightly slow releasing relay KR (Fig. 17).

The introduction of this high resistance bridge across the trunk wires gives the ringing and busy signals to the city operator, if one is involved and if the city office is suitably equipped to receive such signals, and it also gives the final selector time to release when the calling subscriber hangs up on a busy call or on a no-answer call.

When the trunk at the city exchange returns to condition N (Fig. 17), owing to the poling of rectifier S, JR does not operate when FSR pulls up. KR falls away and releases the PABX end of the connection. The release of the trunk thus becomes entirely automatic and does not require the intervention of the PABX operator.

*PABX operator releases trunk*

The PABX operator may release the trunk before a connection is established by momentarily throwing the trunk release key RK (Fig. 17) when the calling party hangs up. The holding shunt through one winding of HR and TR is broken by the release key.

*Operator breaks down connection*

The operator may break down the connection as long as she remains in on the trunk. To do this she momentarily throws the common breakdown key BDK (Fig. 18) while the listening key LK (Fig. 17) is thrown. This applies ground over CK, conductor 9, LR front (Fig. 17*a*), to the "*c*" wire and short-circuits the BR relay of the line finder (Fig. 6). First the line finder and then the rest of the connection is released.

The operator may now establish a new connection by keying the next number in the usual way.

*Operator talks to answering station with trunk cut*

If the PABX operator wishes to talk to the called station without being heard by the outside calling party, she may do so by throwing the common station key STA.K (Fig. 18) when the ringing flash appears on the supervisory lamp. The common station key disconnects the operator's telephone set from the city side and connects it to the station side of the trunk. At the same time the key energizes OER (Fig. 18) which bridges current supply impedance RET across the station side of the trunk and places ground on ER (Fig. 17*a*) of the trunk.

When the called station answers, the R-link is released in the usual way. Relay KR (Fig. 17*a*) of the trunk becomes deenergized, but not ER (Fig. 17*a*) which is held by ground applied to conductor 6 at STA.K (Fig. 18). This holds CR (Fig. 17*a*) energized and the trunk circuit open. S1R and S2R release but this is without consequence.

Since CR1 (Fig. 5) of the B-link is energized, the local current bridge is removed by ER, hence the necessity for the current supply bridge in the operator's telephone circuit (Fig. 18).

When the PABX operator is satisfied that the wanted station has been obtained, she restores the station key to normal which releases OER (Fig. 18) and ER (Fig. 17*a*), whereupon the calling party is connected with the called party over the back contacts of ER. When the operator restores the listening key, she cuts herself out permanently.

Should the answering party not be the wanted party, the PABX operator breaks down the connection by momentarily depressing the common breakdown key BDX (Fig. 18), then restores the station key to normal and with or without consulting the calling trunk party, calls another station in the usual way.

TOLL OR URGENT TRUNK CALL OFFERED TO BUSY PABX STATION

Toll and city calls are received over the same trunks and are extended by the PABX operator to the PABX station in the same manner. If the call does not require special attention, it is handled as above-described. However, if the call is such that it must be offered to the wanted station even though busy, then the PABX operator proceeds as follows:

*Common holding key HK thrown*

The PABX operator throws the common holding key HK (Fig. 18) at any time before the completion of keying and restores it to normal at any time after the ringing or busy flash, as the case may be, appears on the trunk supervisory lamp SL (Fig. 17*a*). The common holding key has no function if the called line is free. Such calls are handled as previously described.

*Final held if called station is busy*

If the called station is busy, the register energizes LR (Fig. 4) of the R-link. LR operates BR, and BR operates AR. AR bridges GR1 and GR2 across the A and B terminals of the trunk. Since the "*a*" wire of the trunk is grounded by HK (Fig. 18), GR1 (Fig. 4) does not operate. The E-brush circuit to the B-link remains, therefore, open, and FR2 (Fig. 5) does not operate. It will be recalled that normally FR3 operates to release the group selector and the final.

When the PABX operator restores the holding key HK after receiving the busy flash, GR2 (Fig. 4) has already operated and released CR and ER. When GR1 makes its front contact, the pulse circuit is opened at front ER and the final remains on the terminals of the busy line. The A and B circuits are also open at the R-link so that the busy connection is not disturbed. The operator hears the busy tone but is not yet connected with the busy connection.

*Operator releases R-link*

To release the R-link, the PABX operator throws the common station key (Fig. 18) which disconnects her telephone set from the trunk and connects it over conductors 2 and 3 to the *a* and *b* wires of the trunk. She throws also for an instant the common release key RK (Fig. 18).

Key RK applies battery over HK, OAR back, RRK, conductor 8, and LR front (Fig. 17*a*) to the *b* wire of the trunk, short-circuiting GR2 (Fig. 4) of the R-link which falls away and releases AR and BR and the R-link.

RK (Fig. 18) also energizes OTR (Fig. 18) which removes the current supply bridge and locks up over front OER, STA.K to ground.

Since CR1 (Fig. 5) of the B-link, and consequently ER, are energized, the local transmission bridge is removed from the B-link.

BR (Fig. 4) opens the circuit of KR (Fig. 17*a*) of the trunk which releases and removes the shunt from the A and B terminals. However, ER (Fig. 17*a*) remains energized since a ground is maintained on lead 6 over a contact on the common station key STA.K (Fig. 18). ER (Fig. 5) of the B-link being also energized, the B-link cannot release and it is not necessary that the PABX operator place a current supply bridge or a D. C. shunt across the trunk wires to hold it.

The PABX operator is now placed in direct telephonic communication with the busy connection without a D. C. bridge of any kind. Thus conversation is not disturbed, apart from the unobjectionable warning tone which is given when the operator is connected. The circuit of this warning tone may be traced from common tone transformer TT (Fig. 17), small condenser C6, front LR, front TR, back KR (Fig. 17*a*) to the A-terminal. Since ER (Fig. 17*a*) is energized, the outside calling party does not hear the warning tone.

*Operator offers toll call*

The PABX operator talks to the parties of the busy connection and if the party wanted agrees to take the toll call, the PABX operator asks both parties to hang up. Should the called station be the calling party in a local connection, then his line will be freed when the called party of the local connection hangs up. Should the called staton be a party to another outside trunk call, then his line will be freed when the called party of that connection hangs up. Should the called station be the called party of a local connection, then his line will be freed only when the local calling station hangs up.

When the PABX operator is sure that the line is free, she throws the common re-ring key RRK (Fig. 18) to signal the wanted station. The key connects ground over conductor 8 to the *b* wire, and ringing current over OGR back and winding and conductor 7 to the *a* wire.

When the wanted station answers, OGR operates and cuts off the ringing currents. The PABX operator restores the common station key and the other common keys, thereby completing the toll or trunk call. When the operator finally restores the listening key, she cuts herself out permanently.

OUT-TRUNK CALLS

It is assumed that the digit 9 is assigned to city trunks. Any station may key this digit but only unrestricted stations will be connected with an outside trunk. Restricted stations are automatically connected over a local trunk to the PABX operator just as though the digit 0 had been keyed.

When the night switching key NSK (Fig. 17) is thrown, certain unrestricted stations may be converted to restricted stations by changing their calling potential from PC1 to PC2 and in this way further limit the number of stations which can make city calls during hours when the PABX is unattended by operators. For this purpose, as shown in Fig. 2, a key NK may be provided at the operator's position to switch the front contact of the line relay from potential PC1 to PC2. Otherwise these potentials would be connected directly to terminal PC.

*Station keys digit (9)*

When the digit 9 is keyed by an unrestricted PABX station, the register stores the digit in the usual way and locks up relays XR1 and XR4 (Fig. 10*c*) of the first group of digit storing relays.

*B-link connected to idle trunk*

The group selector of the selected B-link (Fig. 6) hunts for a free trunk to the city exchange (Fig. 17*a*). To the T-terminal of this trunk potential PN9 is normally applied over BR back (Fig. 17), HR and JR back, and COR back (Fig. 17*a*). When a free trunk is found, the register stops the group selector and makes a second test—all as though the group selector were selecting a final selector.

After the second test, COR (Fig. 17*a*) of the trunk circuit is operated over the *c* wire in series with the low resistance winding of BR (Fig. 6) of the group selector. At this stage of the connection, both windings of the cut-off relay COR (Fig. 17*a*) are in series with CR2 (Fig. 5) of the B-link which does not operate. COR (Fig. 17*a*) removes potential PN9 from the "*t*" wire, disconnects the "*t*" wire from the "*b*" wire and connects the "*b*" wire of the trunk to the B-terminal. Relay DR (Fig. 17*a*) is energized and busy lamp BL (Fig. 17) at the operator's position is lighted. This indicates the busy condition of the trunk to the PABX operators, as well as to the group selectors.

*Register converted for out-trunking*

When upon the energization of GVR2 (Fig. 10) RCR (Fig. 10*a*) becomes energized, it closes a circuit from ground over brush E of P0 (Fig. 10*b*), front RCR (Fig. 10a), winding DRR, front XR1, (Fig. 10b) front XR4, back RSR, back and winding RHR (Fig. 10a) to battery. RHR locks up to ground over a front contact of R1R (Fig. 10) and energizes RMR (Fig. 10).

When RHR (Fig. 10a) breaks its back contact, DRR releases and closes the release circuit of the digit storing relays which now release in the usual way.

RMR (Fig. 10) transfers the grids of V2 and V4 from brush G of the R-link finder to brush A (Fig. 10a) of the switch PT. The F and G terminals of the R-link finder or, in other words, the "a" and "b" wires of the group selector are now connected to the out-trunk pulse circuit in the upper left-hand part of Fig. 10a.

*Line relay at central office end of trunk operates*

A line relay LR1 at the central office is connected from battery to the "a" wire as shown at N in Fig. 17, the current flow being the reverse of that shown at TD.

When RMR (Fig. 10) operates, a circuit is established from the battery at the central office, winding of said line relay LR1 (Fig. 17), back contact of the central office cut-off relay to the "a" wire, back CR (Fig. 17a), back ER, brush A of the group selector, through the B- and R-links to terminal G of the register, front RMR (Fig. 10), back RUR and RKR, (Fig. 10a) rectifier S, winding of PR, front RMR (Fig. 10), terminal F of register finder, R- and B-links, brush B of the group selector, front COR (Fig. 17a), back ER, back CR, "b" wire, central office, and back contact of COR (Fig. 17) to ground. LR1 operates but, on account of the poling of S, PR does not operate. When the dialing or group selector circuit TD is connected at the central office, the current is reversed as shown at TD. PR (Fig. 10a) now operates, energizes PAR which, in turn, connects PR1 and S2 in parallel with PR and S1. PR1 does not operate. PAR locks up to ground at R1R (Fig. 10).

The register is now in a condition to transmit pulses to the central office directly and without repeating relays in the trunk circuit. The trunk transmission relays are automatically cut into the trunk circuit upon the completion of selection as previously explained.

*PABX station keys city number (BO 9–3800)*

The calling station may key the first three digits of the office prefix almost as rapidly as the keys can be depressed. The first three digits are stored in the three groups of digit storing relays. The key for the fourth digit remains depressed until a free trunk has been selected and the first group of digit storing relays released. The fourth digit is then stored in the first group of storing relays and the digit key is released. From then on the calling station may key the remaining four digits as rapidly as the central office is able to absorb them. When keying into a Strowger type exchange, the average speed of releasing keys will be about one per second. Exchanges equipped with modern registers will release the keys at an average speed of about two per second.

*Fourth digit key held depressed awaiting release of first group of digit storing relays*

When four keys are depressed in rapid succession, relays XHR1 (Fig. 10b), XHR2 and XHR3 lock up and close a series circuit from ground, front RIR (Fig. 10), front XHR3 (Fig. 10b) front XHR2, front XHR1, winding ER (Fig. 10) to battery. This takes place immediately after GSR3 releases for the third time..

ER removes ground from the "b" wire and from the armature of GVR3, and over a front contact places ground on the winding of R1R.

When the fourth digit key is depressed AR1 and AR fall away but nothing happens. There being no ground on the back contact of GVR3, DR does not become energized.

The removal of ground from the "b" wire opens the line circuit and prevents the energization of NR should a key 6 to 0 be depressed.

As soon as a trunk is selected, the first group of digit storing relays release, including XHR1 (Fig. 10b). XHR1 opens the circuit of ER (Fig. 10) which falls off, closes the line circuit and places ground on the armature of GVR3.

The selection and storing of the fourth digit then proceeds from where it stopped and when complete, the fourth digit key is released.

*Register pulses first digit (B) of central office number*

When PR (Fig. 10a) operates due to reversal of current at the central office, i. e. when the circuit is as indicated at TD (Fig. 17), it closes its front contact and, since the first digit of the central office number has been keyed, a circuit is established from ground, front XHR2, (Fig. 10b) terminal 2, brush B of the out-control switch P0, front RGR, (Fig. 10) back RQR, back GVR1, back GSR1, front RFR, front RMR, front PR, (Fig. 10a) winding RKR, interrupter INT to battery. The speed of this interrupter is set to meet the requirements of the central office; that is, 10 steps per second for a Strowger type office and 20 steps per second for a register controlled office. When INT closes, RKR operates and energized RJR and the magnet of switch PT. RJR locks up and short-circuits PR, thus removing this impedance from the pulsing circuit. When INT opens the circuit PT releases and brushes A and B (Fig. 10a) go to position 2, in which the short-circuit normally closed over brush B is removed from the back contact of RKR. The first pulse is not used as it may be of insufficient length.

When INT closes and opens its circuit for the second time, RKR sends the first pulse to the central office by opening the trunk circuit for the proper length of time. PT goes from position 2 to position 3.

When INT closes and opens its circuit for the third time, a second pulse is sent to the central office and PT goes from position 3 to position 4.

Assuming that the digit B, or its equivalent 2, has been keyed, the potential PN2 on the third terminal A of PT agrees with the potential placed by the storing relays on terminal 2, brush C (Fig. 10b) of P0, GV1 (Fig. 10) fires and energizes GVR1. GVR1 opens the circuit of RKR (Fig. 10a) so that no further pulses will be sent to the central office.

GVR1 (Fig. 10) energizes GSR3 and as potential PN2 is still on the grid of V3, GV2 fires when GR closes the high tension battery circuit. GVR1 energizes GSR1 which releases RQR, removes the high tension battery from GV1 and GVR1 and energizes RCR (Fig. 10a). GVR1 (Fig. 10) releases GR, GR releases GSR1 and this, in turn, releases RCR which sends P0 from position 2 to position 3.

During this time the high speed switch PT (Fig. 10a) is restored to normal over a back contact of RJR and interrupter X, RJR having been unlocked upon the energization of GSR1.

*Out-trunk pulsing continues*

The remaining six digits of the city number are pulsed in the same way and the central office switches will select the called subscriber.

*Register and R-link release and trunk transmission bridge connected*

When the wipers P0 (Fig. 10*b*) of the out-control switch go to position 9 upon the completion of pulsing, RUR (Fig. 10) is operated over brush E (Fig. 10*b*) and energizes RVR which releases BR and opens the circuit of the slow releasing relay R1R.

RUR opens the pulsing loop over one back contact and the circuit over the E-terminal of the register finder over another. Over a front contact RUR places battery on the D-terminal which is extended over the D-brush of R-link (Fig. 4), front ER, D-brush and terminal of B-link finder (Fig. 5), the *t* wire of the B-link, the T-brush of the group selector and the T-terminal of the city trunk (Fig. 17*a*), front COR, back ER, front DR, S—5, winding CR (Fig. 17*a*) to ground. CR operates and bridges the supervisory relays S1R and S2R across the A and B terminals of the trunk, and the high impedance relay TR (Fig. 17) across the "*a*" and "*b*" wires to hold the trunk. S1R and S2R do not operate since RUR (Fig. 10) has opened the register pulsing loop.

CR (Fig. 17*a*) effectively short-circuits the high resistance winding of COR, thereby causing CR2 (Fig. 5) of the B-link to operate and energize ER (Fig. 5) which removes the local transmission bridge from the B-link preparatory to the release of DR and also of the B-link.

When slow releasing R1R (Fig. 10) breaks its front contacts, the register releases and the "*c*" wire to the R-link is opened. CR (Fig. 4) falls away and releases ER in the R-link and DR (Fig. 5) in the B-link. DR connects the transmission bridge of the city trunk circuit through to the calling PABX station. S1R (Fig. 17*a*) and S2R operate. S1R releases DR (Fig. 17*a*) but maintains energized the slow releasing trunk relay CR (Fig. 17*a*).

*Calling station hangs up and releases connection*

When the calling station hangs up, S1R (Fig. 17*a*) and S2R fall away. S1R releases CR. CR removes the shunt from the high resistance winding of COR. This releases CR2 (Fig. 5) of the B-link which in turn releases ER (Fig. 5) and RR and the B-link. CR (Fig. 17*a*) removes the shunt including TR from the trunk and releases the central office connection.

*PABX operator establishes trunk call direct*

Each PABX operator is provided with a dial (Fig. 18) by means of which she may establish a trunk call without going through the automatic equipment of the PABX. A call so established may then be extended to any PABX station.

The PABX operator selects a free trunk, i. e. one whose busy lamp BL (Fig. 17) is not burning, throws the trunk release key RK (Fig. 17) and the listening key LK of the selected trunk, and the common dialing key DK (Fig. 18). LK (Fig. 17) operates HR and LR in the usual way. HR opens the "*t*" wire and makes the trunk busy at the PABX, but as the release key RK is thrown, HR does not lock up across the trunk in series with TR. DK (Fig. 18) places a retardation coil shunt across the operator's telephone circuit so that when it is bridged across the "*a*" and "*b*" wires over leads 2 and 3 and front contacts of LR (Fig. 17), it energizes the line relay LR1 at the central office. LR (Fig. 17) disconnects in its back contact high resistance relay JR from the trunk so that no shunt except that of the high resistance ringing relay AR (Fig. 17) in series with condenser $C_3$ remains across the trunk during dialing.

When the operator hears the dialing tone, she dials the wanted number in the usual way. Each time the dial (Fig. 18) is moved off normal, it operates relay OFR (Fig. 18) which opens the operator's receiver circuit and then short-circuits the bridged impedance. Thus no impedance remains in the circuit during dialing and the operator does not receive an objectionable click. Each time the dial returns to normal, OFR is released, the receiver is reconnected and the impedance re-introduced. The PABX operator receives the usual ringing or busy signal.

If the operator wishes to hold the trunk after dialing, she may do so by restoring the trunk release key RK to normal before restoring the common dialing key. HR (Fig. 17) then locks up across the trunk in series with TR.

*PABX operator extends trunk call to PABX station*

The PABX operator may extend the city call thus established to any PABX station in the same manner as she would an incoming city call.

*Non-numerical release of register*

On most calls the register automatically releases after the selection of the called line of trunk, whether its number consists of one, two, three or more digits. For example, when the digit 0 is keyed as the first digit, the register releases as soon as the single selection is complete, when the two digits 81 and 82 are keyed, the register also releases after a single selection, when a three-digit PABX station is keyed, the register releases after the third selection, when the digit 7 is keyed for a tie line, the register releases after the pulsing of the three digits of the tie line number, when digit 9 is keyed for a trunk, the register is released after the completion of the pulsing of the seven digits of the city number.

These arrangements are purely arbitrary and the register may be easily adapted to meet any other local requirement.

However, since one cannot foresee all of the possible future conditions, provision is made in the register for its automatic release at any time during trunk or tie line pulsing by reversing the current in the out trunk or tie line after completing the pulsing of any digit.

As above explained PR (Fig. 10*a*) does not operate until after the pulsing conditions have been established at the central office. When RKR operates for the first time, it energizes RJR which locks up over a back contact of GSR1 (Fig. 10). At the same time it energizes RNR and ROR (Fig. 10*b*) in parallel. Brush A of PT will apply only PN potentials to the grids of the triodes and not a mixture of PN and PT potentials.

After pulsing a digit, RJR (Fig. 10*a*) releases and removes the short-circuit from PR which, under normal conditions, operates promptly and opens its back contact. PR closed through its front contact an energizing circuit for PAR which locked up to ground at R1R (Fig. 10). PR1 does not pull up in parallel with PR because rectifier S2 is poled for passing only current flowing in the opposite direction.

Should the current in the trunk be reversed, PR will release and PR1 operate to energize RUR (Fig. 10). This will release the register.

SUPERVISION OF OUT-TRUNK TOLL CALLS BY PABX OPERATOR

To illustrate the method of operation, it is assumed that the city number assigned for calling when a station-to-station toll connection is desired is (0), and for particular party toll calls 211. An unrestricted PABX station may key these numbers after keying the digit 9 to obtain a free trunk leading from the PABX to the central office.

In order to permit the PABX operator to supervise all such extra charge calls which are made direct from a PABX station, a special flash is produced in the trunk supervisory lamp whenever a station keys either of the above-mentioned toll numbers after keying 9. The register may, of course, be adapted to produce the same result with other toll numbers.

*PABX station keys (0) for a particular party toll call*

After keying the digit 9 which causes the register to control the selection of a free trunk in the usual way, the station keys the digit 0 and energizes relays XR1, XR2 and XR3 of the second group of digit storing relays (Fig. 10*b*).

The trunk and register are converted for out-trunking as previously described and ten pulses are sent out over the trunk corresponding to the digit 0. As soon as XR1, XR2 and XR3 of the second group operate, a series circuit is established from positive battery, the top front contacts and armatures of XR3, XR2, XR1, back FCR (Fig. 10*a*) to the "*d*" wire of the R-link (Fig. 4), thence through the B-link (Fig. 5) to the "*t*" wire of the selector (Fig. 6) and trunk (Fig. 17*a*), front COR, back ER, rectifier S4 which passes positive polarized current, winding TCR to ground. TCR operates and locks up over a second winding and a back contact of HR (Fig. 17) to battery, and over another front contact closes the circuit of the supervisory lamp SL (Fig. 17*a*) through flash interrupter FI4 which is of a distinctive nature and thus indicates to the PABX operator that a toll call is being made.

*PABX operator listens in*

The PABX operator allows the supervisory lamp to flash for a second or so to give the trunk circuit time to free itself from the register. TCR places battery on the listening key so that the PABX operator may listen in and take note of the order given to the answering city toll operator. When the PABX operator listens in, the talking parties hear the usual warning tone.

Should it be preferred that the operator supervise continuously, the locking circuit of TCR may be connected to a front contact of CR (Fig. 17*a*).

*PABX station keys 211 for station to station toll call*

If instead of "0," the PABX station keys the number 211 after keying the number 9, the digit 2 is stored in the second group of digit storing relays, and the first digit 1 in the first group of digit storing relays, as soon as the city trunk is selected and this group becomes free.

Digit 2 energizes XR2 (Fig. 10*b*) in the second group and as RHR (Fig. 10*a*) is energized, XR2 operates CR9 (Fig. 10*b*) over FCR back and RHR front (Fig. 10*a*). CR9 locks up to RIR front (Fig. 10). When XR1 (Fig. 10*b*) of the third group operates, it energizes relay CR10 (Fig. 10*b*) which also locks up.

When, therefore, relay XR1 of the first group, which records the last digit of the number 211, operates, positive battery is placed on the "*d*" wire over front CR9, front CR10, front XR1 (first group), back FCR (Fig. 10*a*) to the "*d*" wire.

From here on the circuit operates as though the digit 0 had been keyed.

INFORMATION CALL

While holding on to a trunk call, whether incoming or outgoing, any PABX station may call any other PABX station to obtain information. To do this, the station, which we shall call station A, and which is connected with a trunk, as indicated in Fig. 21, keys the digit 1, establishing the condition shown in Fig. 21*a*.

A register being connected, when the keying tone is heard, station A keys the number of the wanted station B in the usual way.

This will establish a connection diagrammatically illustrated in Fig. 21*b*. When station B answers, conversation is carried on between stations A and B, unheard by the outside party on the trunk, and during this time the trunk is held.

At the end of conversation station A again keys 1, whereupon the connection with station B is released and the connection between station A and the trunk is restored to the condition of Fig. 21. The operation of the circuits is as follows:

*Transfer (TR) link selected*

When station A keys the digit 1, the line circuit is momentarily opened and S2R and S1R (Fig. 17*a*) release, after which resistor R1 (Fig. 12*c*) is bridged across the line and S1R operates but not S2R. In case the resistance R1 is too high, any one of the other three resistors may be used either by depressing a different digit key or by switching resistors and then re-assigning the potentials in the register and TR-link accordingly. S1R (Fig. 17*a*) holds CR, and CR maintains the holding shunt through TR (Fig. 17) across the trunk.

When S2R makes its back contact, it energizes FR (Fig. 9) of all idle transfer (TR) links, circuit from ground, front S1R (Fig. 17*a*), back DR, back S2R, back KR (Fig. 9), back HR, JR, and CR, winding FR to battery. At the same time, calling potential PC3 is placed on the T-terminal of the trunk over front CR (Fig. 17*a*), back S2R, back DR, back ER, front COR to the T-terminal. This potential PC3 is positive (see table of Fig. 16), and no current flows through rectifier S4 (Fig. 17*a*) and TCR to ground.

*TR-link selects second B-link*

Figure 9:
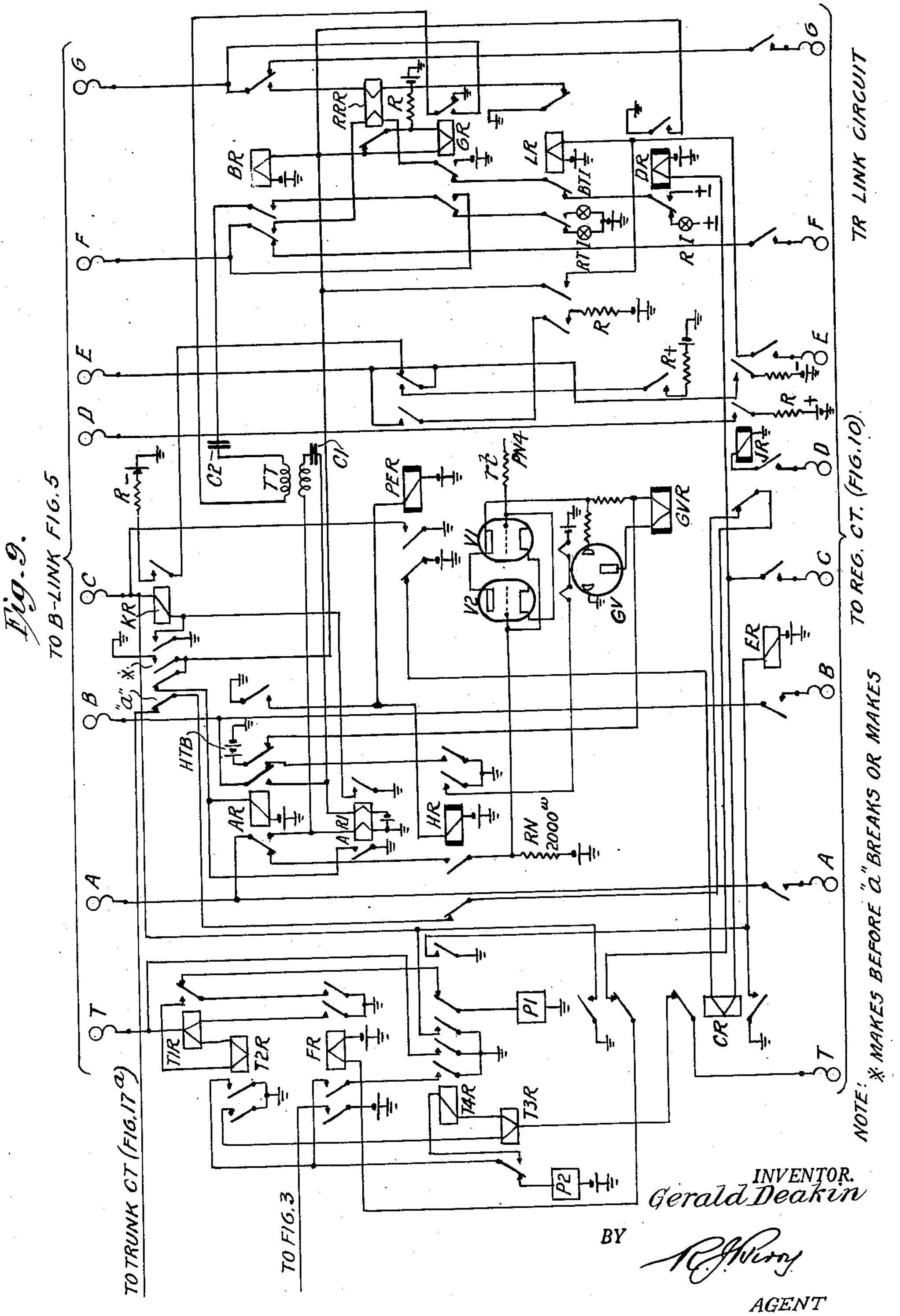
Fig. 9 illustrates a transfer link.

FR (Fig. 9) has a front contact connected so as to place battery on any convenient starting circuit lead Z (Fig. 3) thus applying a test potential to the T-terminals of the B-links. At the same time FR energizes its associated B-link finder magnet P1 (Fig. 9).

The TR-link picks up a free B-link in the same manner as does an R-link. The test relays TR1, TR2, TR3 and TR4 (Fig. 9) operate exactly as their corresponding numbers do in the R-link (Fig. 4).

*TR-link picks up register*

The TR-link selects a register in the same manner as an R-link. However, when a register is picked up, a ground through JR (Fig. 9) is placed on the D-terminal, circuit from ground, winding JR, front ER, brush D of the register finder, terminal D of register (Fig. 10), back RFR, high resistance winding of RWR to battery. RWR operates but not JR, and places potential PC3 on the grids of V1 and V3 in place of PC1. The calling potential of the register now agrees with the calling potential PC3 placed on the T-terminal of the trunk.

*Second B-link picks up trunk*

The line finder of the second B-link selects the city trunk in the usual way, except that the line finder will be hunting for potential PC3 instead of PC1. The line finder will be stopped by this potential, because RWR (Fig. 10) is energized and the *b* wire is connected to PC3 in Fig. 17*a*.

When the second B-link is connected with the trunk, the "*a*," "*b*" and "*c*" wires are connected in multiple with those of the first B-link. However, since the high resistance winding of the cut-off relay COR (Fig. 17*a*) is short-circuited, CR1 (Fig. 5) of the second B-link as well as the corresponding relay of the first B-link operate and energize their respective ER relays, thereby removing all local transmission bridges.

The current in the "*c*" wire of the trunk is doubled to operate FR (Fig. 17*a*) and then ER (Fig. 17*a*) which disconnects the trunk wires from the wires of the B-links. CR (Fig. 17*a*) remains locked up over a front contact of ER and keeps the high resistance winding of COR (Fig. 17*a*) short-circuited, shunted by the low resistance winding of FR.

Station A is now connected straight through to a register over a clean pair of wires. This is the condition which is diagrammatically illustrated in Fig. 21*a*.

*Second test of trunk not made*

The B-terminal of the trunk cannot now be used for the customary second test. GSR1 (Fig. 10) closes a circuit on the first test from ground, front GSR1, front RWR, back RVR, back RPR, winding R1R to battery, and in multiple over a back contact of RER, winding GSR3 to battery. R1R energizes RAR, RGR and RFR, and the latter disconnects the slow releasing RWR.

*Register releases digit key (1)*

GSR3 operates as previously described, and the fundamental keying circuit is closed as shown in Fig. 11, except that in this case RWR replaces the ground on the "*a*" wire by positive battery. This changes the fundamental circuit to the condition shown in Fig. 11*c* whereby the release magnet RM of the substation key set is energized and digit key 1 returns to normal. AR1 (Fig. 10) operates and energizes AR and the normal holding condition (Fig. 11*a*) is reestablished.

*Station B selected*

Station A now keys the number of station B in the usual way to establish the connection indicated in Fig. 21*b*.

If the called line is free, RPR (Fig. 10) of the register energizes DR (Fig. 9) of the TR-link. DR energizes BR and parallel therewith, over a back contact of KR, also AR. AR energizes slow releasing relays HR and PER. AR bridges the two windings of AR1 to the calling line before the register is disconnected. AR1 locks up AR and over another front contact grounds the winding of KR. PER releases CR and ER after grounding brush C of the B-link finder.

The register is disconnected when ER releases and it is restored to normal when R1R (Fig. 10) makes its back contacts.

*Station B answers*

When BR (Fig. 9) operates, it supplies ringing current to station B through the windings of ringing relay RRR, first directly and, when DR releases, through the ringing interrupter RI. BR connects the primary winding of transformer TT through the ringing tone interrupter RTI. The secondary of TT with condenser C1 in series is bridged across the line to station A to convey the ringing tone.

When station B answers, RRR (Fig. 9) breaks its back contact, to remove the short-circuit from GR which operates and disconnects the ringing relay from the ringing current source and in place thereof connects it to ground and battery for speech transmission. At the same time GR disconnects one winding of tone transformer TT from the ringing tone interrupter and ground, and bridges it across the F and G brushes.

Telephone communication is now established between the A and B stations through tone transformer TT, relay AR1 supplying transmission current to station A and relay RRR to station B.

*Station A releases station B*

To release station B, station A keys digit 1 the second time. The high resistance thus introduced into the line releases AR1 (Fig. 9). AR1 releases AR. KR remains locked up over its front contact and holds BR energized.

When AR makes its back contacts, it closes a circuit from battery, resistor RN, front of slow releasing relay HR, back AR, "*a*" wire through resistor R1 (Fig. 12*c*) at the subscriber's station, back over the "*b*" wire, back AR (Fig. 9), front HR to ground. This places a potential corresponding to P1 on the grid of V2 (Fig. 9) but as the grid of V1 is connected to potential PN4, GV does not fire when AR places, upon its de-energization, high tension battery on GV and GVR.

AR opens the circuit of slow releasing relays HR and PER. When PER makes its back contacts, a circuit is established from negative battery, resistor R, front KR, back PER, brush E of the B-link finder, rectifier S2 (Fig. 5) of the B-link, winding FR2 to ground. FR2 opens the "*c*" wire of the group selector, whereupon first the group selector and then the final selector release.

FR2 also opens the circuit of the slow releasing B-link relay RR. When RR breaks its front contacts, it opens the "*c*" wire circuit and releases the line finder of the B-link and when it makes its back contacts, it short-circuits KR (Fig. 9) of the TR-link, circuit from ground, back RR (Fig. 5), front FR2, brush C of B-link, winding KR, front KR to ground. KR falls away, releases BR and restores the TR-link to normal.

The second B-link which was taken into use by the TR-link and station B are now completely released.

*Trunk connection with station A re-established*

When the "*c*" wire of the line finder of the second B-link is opened, current through FR (Fig.

17*a*) of the trunk circuit is reduced to normal. FR falls away and releases ER which re-establishes the connection between the trunk, the first B-link and station A as indicated in Fig. 21.

*Station B busy*

Should the called station B be busy, RVR (Fig. 10) in the register will operate in the usual way. RVR grounds brush E of the register finder and energizes LR of the TR-link (Fig. 9). LR energizes AR and BR and transfers the primary of transformer TT from the ringing tone interrupter RTI to the busy tone interrupter BTI. AR connects AR1 to the line and station A hears the busy tone until the second B-link is released shortly thereafter.

*Second B-link released*

AR energizes slow energizing and releasing PER which establishes a circuit from negative battery, resistor R, front LR, front PER, brush E, rectifier S2 (Fig. 5) of the second B-link, FR2 to ground. FR2 releases the second B-link and consequently the TR-link and selector in the usual way.

*Trunk automatically reconnected to station A when station B is busy*

From the above it will be seen that when station A calls a busy station, it receives a momentary busy tone and is then automatically reconnected to the trunk as indicated in Fig. 21.

TRANSFER CALL

Any station on a trunk call, whether incoming or outgoing, may transfer the call to any other PABX station. To do this the station, which we shall call station A, depresses key 1 establishing the connection as shown in Fig. 21*a*.

When the keying tone is heard, station A keys the number of station B as on an information call, see Fig. 21*b*. If station B is reached and agrees to take the trunk call, then station A depresses key 9, whereupon station B is connected to the trunk and station A is released. This condition is shown in Fig. 21*c*.

The operation of the circuits is as follows:

*Station A calls station B*

Station A calls station B as on an information call. Station B receives the ringing signal or a momentary busy tone is sent to A. We shall assume that the station B is free and answers over the connection shown in Fig. 21*b*.

*Station A transfers trunk to station B*

To transfer the trunk to station B, station A depresses key 9 which momentarily opens the line circuit and releases AR1 (Fig. 9) of the TR-link. When the line circuit is again closed, the total resistance is increased to 1600 ohms (see Fig. 12*b*). AR1 (Fig. 9) remains de-energized as on an information call. When AR de-energizes and closes the fundamental keying circuit from the substation, potential PN4 is placed over the *a* wire, the A brush of the B-link finder (Fig. 9), AR back, HR front and then on the grid of V2 (Fig. 9). GV fires instantly and energizes GVR whereupon a circuit is established from positive battery, resistor R, front GVR, front PER, brush E, rectifier S1 (Fig. 5) of the second B-link, FR1 to ground. It will be noted that HR and PER being slow to release, stay up after AR releases and thus insure the closing of the above-described circuits.

*First B-link released*

FR1 grounds for an instant wires "*c*1" and "*c*2" of the line finder of the second B-link (Fig. 6). The ground on "*c*2" is extended over AR back and the C brush of the line finder directly to the "*c*" wire of the trunk (Fig. 17*a*) and short-circuits the series windings of the BR relays of the line finders of both B-links. The BR relay of the first B-link releases, after which the first B-link and final return to normal.

The BR relay of the line finder of the second B-link does not release since it is maintained energized over its high resistance winding by the ground on wire "*c*1."

*TR-link released*

At the same time when FR1 (Fig. 5) grounds the C-brush of the trunk and releases the line finder of the first B-link, it also grounds the "*c*" wire of the R-link and short-circuits KR (Fig. 9) which releases BR and restores the TR-link to normal. The circuit of FR1 (Fig. 5) remains closed long enough to insure proper operation, taking into account the slowness of PER and GVR (Fig. 9).

*Trunk connected to station B*

When the first B-link is released, and the current in the *c* wire is reduced to normal, FR (Fig. 17*a*) falls away and releases ER which completes the connection between the trunk wires, the remaining second B-link and, station B as shown in Fig. 21*c*.

FLASH-IN CALL

Any station on a trunk call, whether incoming or outgoing, may flash in the PABX operator at any time. To do this, the station depresses key 1 which establishes the connection shown in Fig. 21*a*.

When the keying tone is heard, the digit 0 is keyed. The supervisory lamp SL (Fig. 17*a*) of the trunk is connected to an interrupter and a distinctive flash is produced to call the PABX operator. When the supervisory lamp flashes, the PABX operator may listen in, but not otherwise.

The operation of the circuits is as follows:

*Station keys digit (1)*

When the station keys the digit 1, a TR-link, (Fig. 9) a second B-link (Fig. 5) and a register (Fig. 10) are picked up in the same manner as previously described in connection with the establishment of an information or transfer call (Fig. 21*a*).

*Station keys digit (0)*

When key 1 is released, the station keys the digit 0 and the first group of digit storing relays of the register store the digit, after which the group selector (Fig. 6) connected with the selected B-link (Fig. 5) hunts for a free trunk numbered 0 and leading to the PABX operator's position. As soon as one is found, RUR in the register operates circuit from ground, brush E (Fig. 10*b*) of P0 position 1, front RCR (Fig. 10*a*), low resistance winding DRR, front XR2, XR3 and XR1, (Fig. 10*b*), brush D of P0, terminal 1, winding RUR (Fig. 10) to battery.

DRR prevents the release of the digit storing relays until after RUR has operated and, in this particular case, the register is released. DRR opens the short-circuiting battery circuit from the front of RCR. It will be recalled that when the digit 9 was keyed to transfer a call, DRR operated in series with RHR but when the quick operating RHR broke its back contact and locked up, DRR fell away and allowed RCR to short-circuit and release the locked up digit storing relays.

*PABX operator flashed in*

RUR places full battery potential on brush D and energizes JR (Fig. 9) of the TR-link. JR momentarily places positive battery on the D-terminal of the B-link. Through the *t* wire of the B-link (Fig. 5), the positive battery is extended over the associated line finder to the T-terminal of the city trunk with which the PABX station is connected. There is a second connection to the T-terminal of the trunk selected by the group selector, but that has no effect. The first-mentioned connection over the line finder energizes OR (Fig. 17*a*) over a circuit including rectifier S3, ER front and COR front. It will be recalled from the description of an information call that when two line finders are connected with a trunk, then FR (Fig. 17*a*) is operated and energizes the associated ER relay.

OR locks up over a second winding and a back contact of HR (Fig. 17), and connects the supervisory lamp SL to interrupter FI3. SL flashes.

*Group selector of second B-link released*

At the same time, the group selector of the second B-link is released and in turn releases the trunk 0 which it selected. This is accomplished by JR (Fig. 9) which places negative battery on the E-brush of the B-link finder, thereby energizing FR2 (Fig. 5) of the B-link.

The TR-link is released when R1R (Fig. 10) of the register breaks its front contacts and removes ground from the C-brush, thereby releasing CR (Fig. 9) which in turn removes ground from the "*c*" wire of the B-link. FR2 (Fig. 5) is energized long enough to give time for RR to release and completely free the second B-link.

*PABX operator listens in*

With OR (Fig. 17*a*) energized, battery is placed on the operating windings of HR and LR (Fig. 17), so that when the the operator throws the listening key of the trunk identified by the lamp, HR and LR operate in the usual manner. A warning tone is placed across the trunk so that the parties to the trunk call are made aware of the operator's presence. The operator may talk on the connection and then take such action as may be necessary.

If the PABX station wishes the call transferred to some other station, the operator may do so in the usual way by momentarily throwing the common breakdown key BDK (Fig. 18) which releases the local part of the connection, after which she may establish a new call in the usual way by keying the number of the wanted station.

When the operator listens in, OR (Fig. 17*a*) is unlocked in HR back and the flashing of the supervisory lamp SL ceases. When the operator restores the listening key, she is permanently cut out of the connection.

LOCAL TRUNK TO PABX ATTENDANT

*Subscriber keys 0*

It is assumed that 0 is assigned to the local trunks (Fig. 20) leading to the attendant's position. When it is keyed, digit storing relays (Fig. 10*b*) XR1, XR2 and XR3 of the first group are energized, after which XHR1 is energized and the group selector (Fig. 6) of the B-link hunts for a trunk connected to potential PN0 in the same manner as it hunts for a final.

*Local trunk operates*

The "*c*" wire of the group selector is closed from ground, front RR (Fig. 5), back FR2, winding low resistance relay CR2, wire *c*, lower contact ONC2 of group selector (Fig. 6), low resistance winding BR, front BR, back AR, brush C, winding CR (Fig. 20) of the selected local trunk to battery. CR operates. This relay has the same resistance as the cut-off relay of the subscriber's line circuit (Fig. 2). For that reason CR2 (Fig. 5) of the B-link does not operate when connected in series. CR (Fig. 20) disconnects potential PN0 from the "*t*" wire and disconnects the "*t*" wire from the "*b*" wire. The trunk is now busy to any B-link whose group selector may be hunting.

CR (Fig. 20) lights the line lamps LL over a back contact of AR. This had happened for a short time also when the operator was flashed in on a city trunk connection. However, the momentary lighting of LL accompanied by the distinctive flashing of SL (Fig. 17*a*) indicates that the operator should listen-in on the city trunk rather than the local trunk.

It will be noted that the local trunk may be multiplied on as many attendant's positions as desired.

*Register and R-link released*

After the selection of the local trunk, RCR (Fig. 10*a*) operates and closes a circuit from ground, brush E (Fig. 10*b*) front RCR (Fig. 10*a*) winding of low resistance relay DRR, front XR2 (Fig. 10*b*), front XR3, front XR1, brush D of P0, terminal 1, winding RUR (Fig. 10) to battery. RUR energizes RVR which releases R1R. When R1R breaks its front contacts, the register is released and returns to normal in the usual way.

When R1R removes ground from the "*c*" wire to the R-link, CR (Fig. 4) releases and restores the R-link to normal. When CR removes ground from the C-brush of the B-link finder, DR (Fig. 5) of the B-link releases and connects the calling subscriber through to the local trunk.

*Attendant answers*

Any attendant may answer the call by throwing the associated answering key AK (Fig. 20) which connects the telephone circuit (Fig. 18) to the trunk and energizes AR (Fig. 20). This relay locks up and extinguishes the line lamps LL. The condenser in the operator's telephone circuit (Fig. 18) prevents the flow of current at supervisory relay S2R (Fig. 5) of the B-link through the operator's telephone set. When any answering key AK (Fig. 20) is thrown, ground is removed from lead 14 to the trunk circuit (Fig. 17*a*), thus making it impossible for an operator to connect a local trunk with a city trunk.

*Release*

When the calling subscriber hangs up, S1R (Fig. 5) of the B-link falls away and releases RR which releases the B-link, the subscriber's line circuit and the local trunk.

AUTOMATIC IN-TRUNK NIGHT SWITCHING

During the night or hours of light traffic when the attendant's position is shut down, all or a portion of the PABX trunks may be converted to automatic in-trunk switching to a predetermined PABX station by throwing the night switching key which forms part of each trunk.

For this direct switching service individual numbers are assigned to the trunks and listed in the telephone directory as night numbers. The lamps on the attendant's switchboard operate substantially as usual so that all calls may, when desired, be supervised. No lamp remains burning when the calling city party hangs up and frees the trunk.

When a trunk converted for night switching is selected at the central office, it is automatically picked up at the PABX by a special night switching link (Fig. 22) which, without using the PABX register, control the selectors automatically to extend the trunk call to the PABX station assigned to night service.

The city call is not metered until the PABX station answers. If the trunk is busy at the central office, the city subscriber receives the usual busy tone but if the trunk is free, the city subscriber receives the usual ringing tone. This ringing tone will continue until the PABX station answers or until the calling station hangs up. If the PABX station is busy, the city subscriber will receive the busy tone from the PABX.

In case of a trunk call made via the PABX attendant, the meter operates when the attendant answers, even though the wanted station subsequently may be found busy.

This automatic in-switching facility may, of course, be used during normal traffic hours when desired. When trunks are so used, the calling lamp caps may be given special colors or the trunks otherwise identified so that the attendants may know that such calls will be extended automatically.

The PABX stations assigned for automatic selection may be called over other trunks through the attendant's position in the usual way. Such stations may make local, outgoing trunk, information, transfer and flash-in calls in the usual way. In other words, assigning a station to a trunk does not restrict its customary use. Assigned as well as unassigned PABX stations may pick up any trunk when making out-trunk calls. When, therefore, the night keys are thrown, all the trunks remain available to all the stations for out-trunking.

The B-link finders of the night switching links (Fig. 22) are like those provided for the R-links. Their terminal banks have a capacity for 120 B-links. The number of night switching links required depends upon the number of automatic switching calls to be handled simultaneously. Usually two or three NS-links will be sufficient for a large PABX.

Referring now to the specific means for performing the above-described functions:

*Night switching key NSK thrown*

To convert a trunk for automatic in-switching service, it is only necessary to throw the night switching key NSK (Fig. 17). When this key is thrown, ground is placed upon the filaments of the tubes V1—V4 in the night switching circuit (Fig. 22). These triodes and their associated gas valves GV1, GV2 and relays function in the same manner as the corresponding equipment described in connection with the register. The tubes burn only when a night switching key is thrown.

The night switching key has one contact to place a distinctive calling potential PC4 on a front contact of BR (Fig. 17). Over a second contact the key connects terminals T of the B-link finder banks of the night switching links (Fig. 22) to another front contact of BR (Fig. 17). To the same T-terminal is connected through resistor R2 a starting relay GSR which is common to all trunks appearing in a given quadrant of the link finder banks. Should the trunks be distributed over all quadrants as shown on the bank chart (Fig. 7), there would be four GSR relays.

*Trunk selected at central office*

When a trunk is selected at the central office, ringing current is applied to it in the usual way and AR (Fig. 17) operates to energize BR. BR locks up over a back contact of HR, and the contact of TA. BR places calling potential PC4 on the T-terminal (Fig. 17*a*) of the trunk. This will insure the selection of the trunk only by the line finder of a B-link connected with an NS-link, since PC4 is normally connected over CR2 back (Fig. 22) to the grids of V1 and and V3.

BR also places battery on terminal T of the NS-link (Fig. 22) through resistor R1 and energizes through resistor R2, GSR (Fig. 17). GSR places battery on the common starting lead Z1 to the starting circuit (Fig. 3), thus making it possible for the NS-link (Fig. 22) to select a first choice B-link (Fig. 5).

*NS-link picks up B-link*

GSR (Fig. 17) places ground on common lead X to all the NS-links (Fig. 22) and energizes FR in each link over a back contact of T4R. FR energizes the associated B-link finder magnet P1 over back contacts of T1R and T4R and at the same time places ground on the high resistance winding of T1R.

The NS-links hunt for an idle B-link in the same manner as R-links hunt for an idle B-link on a regular call.

When a B-link is picked up, T1R operates and shunts its high resistance winding by its low resistance winding in series with T2R, thus making the selected B-link busy.

*NS-link picks up trunk*

T2R (Fig. 22) closes the circuit of the trunk and translator finder magnet P2 and places ground on the high resistance winding of T3R. The trunk and translator finder is like the customary register finder. However, its wiper T hunts for the city trunk, and its wipers A, B, C for potentials connected in combinations determined by the number of the station to which such calls are channelled.

When wiper T reaches the calling trunk T3R operates over a circuit from ground, front T2R, high resistance winding T3R, brush T, resistor R1 (Fig. 17) of the trunk, NSK, front BR to battery. T3R (Fig. 22) operates, energizes T4R, disconnects P2 and makes the selected trunk busy.

The low resistance test circuit thus established shunts out GSR (Fig. 17) which releases and causes any other hunting NS-links to come to rest. GSR also removes battery from the Z1-lead to the starting circuit.

T4R (Fig. 22) disconnects the X-lead running from GSR (Fig. 17) to FR (Fig. 22) but before doing so, closes a circuit for FR to ground and over another front contact. T3R closes a holding and busying test circuit through T3R and T4R. T4R opens the circuit of P1, thus preventing its re-energization when T1R and T2R fall off.

*B-links selects trunk*

T4R energizes DR over a back contact of RRR, thus closing the fundamental selection control circuit from the "a" wire of the B-link (Fig. 5), brush A of the B-link finder, front DR, back CR2, back AR, back GSR1, back GVR1 to ground. The circuit of the "b" wire is closed from the B-terminal, front DR, back CR2 to the grids of triodes V2 and V4.

The line finder in which the B-link terminates hunts for the city trunk in substantially the same manner as any other B-link under the control of a register hunts on a regular call for a calling line. The only difference is that the line finder of the B-link is now hunting for the potential PC4 placed on the T-terminal of the trunk over key NSK (Fig. 17) and a front contact of BR. Since the grids of V1 (Fig. 22) and V3 are connected to the same PC4 potential over a back contact of CR2, when the calling trunk is found, GV1 fires in the usual manner and energizes GVR1 which removes ground from the "a" wire and causes the line finder to come to rest on the city trunk.

*Second test at line finder*

GVR1 energizes GR. GR energizes GSR1 and places high tension battery on the second group of electronic discharge devices including GV2, V3 and V4.

GSR1 energizes QR which locks up over a back contact of GVR2 and front DR. When high tension battery is placed on V3 and V4, a second test is made in the same manner as in the register from the grid of V4, over CR2 back, DR front, the *b* wire, the B-terminal of the trunk (Fig. 17*a*), back contacts of COR, JR (Fig. 18) and HR, BR front, NSK to PC4. GV2 fires and energizes GVR2.

GVR2 releases QR and over a front contact energizes CR1.

GSR1 opens the high tension battery to GV1 which GV1 de-ionizes and releases GVR1, releasing GR and, in turn, GSR1. As GSR1 is somewhat slow releasing, it maintains open the fundamental circuit so that ground is not again immediately placed on the "a" wire. When GR breaks its front contact it de-ionizes GV2, releasing GVR2 which removes the short-circuit from CR2. CR1 locks up in series with CR2, circuit from ground, front DR, winding CR2, front CR1, winding CR1 to battery.

*Group selector selects final*

We shall assume that the station assigned to answer calls on the trunk has the number 342.

When CR2 makes its front contact, it grounds the "a" wire of the first group selector (Fig. 6) over brush F (Fig. 22) front DR, back BR, front CR2, back AR, back GSR1, back GVR1 to ground.

Potential PN3 corresponding to the first digit of the wanted number is placed on the grids of V1 and V3 over a resistance *rt*, terminal and brush C of the trunk and translator finder, back CR4, front CR2 to grids V1 and V3.

The group selector selects an idle final (Fig. 13) in the usual way after which a second test is made, again in the usual way and when successful GVR2 operates for the second time and energizes CR3 over a front contact of CR2.

*Final selects "tens"*

When GVR2 falls away for the second time, CR4 locks up in series with CR3 and the fundamental circuit is again closed. This time potential PT4, corresponding to the second digit, is placed on the grids of V1 and V3 over brush B of the trunk and translator finder, back CR6, front CR4 and front CR2. The "tens" is selected in the usual way after which the usual second test is made.

*Final selects units*

When GVR2 operates for the third time, CR5 operates and when it releases CR5 locks up in series with CR6 and the fundamental circuit is closed for the third and last time. Potential PN2, corresponding to the last digit of the number, is placed on the grids of V1 and V2 over wiper A of the translator finder, and front contacts CR6, CR4 and CR2. When the called line is reached GVR1 operates and the final comes to rest on the terminals of the assigned station.

*Called station free*

If the called station is free, GVR2 operates for the fourth time and energizes FR1, circuit from ground, front DR, front GVR2, front CR2, front CR4, front CR6, winding FR1 to battery. FR1 energizes BR which locks up to ground over a front contact of DR. BR connects the "a" wire of the called line over brush F to ringing current source through RRR, and over the G-brush, the "b" wire of the line to ground. FR1 supplies over a front contact an immediate ring.

When GVR2 breaks its front contact and FR1 makes its back contact, ringing current is supplied over the usual ringing interrupter RI. The city subscriber receives the central office ringing tone.

*Called station answers*

When the station answers, marginal ringing relay RRR (Fig. 22) breaks its back contact and releases DR which disconnects the ringing current from the called line.

DR also releases BR but as BR is slightly slow releasing, a momentary circuit is established from negative battery, front BR, back DR, brush D and the B-link (Fig. 5), thence to the T-terminal of the trunk (Fig. 17*a*), front COR, back ER, front DR, rectifier S5, winding CR to ground.

*Trunk connected through to the called station*

CR (Fig. 17*a*) energizes and bridges the low resistance high impedance relay TR (Fig. 17) across the trunk, thereby tripping the ringing relay (not shown) at the central office and completing the call at that end.

TR removes ground from the holding circuit of BR (Fig. 17). BR releases and removes battery from the T-brush of the trunk and translator finder (Fig. 22), thus releasing relays T3R and T4R which releases FR. The night switching link is now entirely freed.

CR (Fig. 17*a*) bridges the supervisory relays S1R and S2R across the A and B terminals of the trunk. At the same time CR effectively short-circuits the high resistance winding of COR, thereby causing CR1 (Fig. 5) of the B-link to operate and energize ER, which removes the local transmission bridge from the B-link. The answering station now receives transmitter current from the bridge in the trunk circuit over a clean pair of wires through the B-link and final.

*Release*

The release of the trunk is accomplished in the same manner as on trunk calls established via the attendant.

*Called station busy*

Should the called station be busy, GVR2 (Fig. 22) will not operate. Therefore, when GSR1 makes its back contact, a circuit will be established from ground, back GSR1, front QR, winding AR to battery and in multiple over a back contact of AR, winding ER to battery. ER is disconnected by AR but operates long enough to place negative battery on brush E, thereby momentarily operating FR2 (Fig. 5) of the B-link which releases the final and group selector as on a normal busy call.

AR (Fig. 22) bridges the primary winding of busy tone transformer TT, the center point of which is grounded, across the "*a*" and "*b*" wires of the trunk to the central office.

Condenser C prevents the flow of current to the "*b*" wire but ground on the "*a*" wire trips the ringing relay at the central office (Fig. 17) and thereby connects the calling city subscriber to the trunk. The calling subscriber hears the busy tone but the meter is not operated since the "*b*" wire is not grounded.

*Release*

Ordinarily the calling subscriber hangs up promptly when he hears the busy tone. However, should he not hang up promptly, the busy tone will cease within a maximum of five seconds since removal of ringing current from the trunk de-energizes AR (Fig. 17), thus permanently closing the circuit of TA over the front contact of BR. In five seconds or so, TA opens the locking circuit of BR. BR releases, disconnects TA and removes battery from the T-terminal of the trunk and translator finder which releases T3R (Fig. 22), T4R and FR.

T4R releases DR. DR opens the locking circuit of QR and this in turn de-energizes slow releasing relay AR. However, before AR releases, DR applies ground over its back contact and a front contact of AR to energize slow releasing relay ER. ER places battery on the E-brush of the B-link and again energizes FR2 (Fig. 5). Since both AR (Fig. 22) and ER are slow releasing, the circuit of FR2 (Fig. 5) is held closed long enough to allow RR to de-energize and break its front contact to release the B-link.

The B-link and the NS-link are now restored to normal.

Should the calling subscriber fail to hang up after the busy tone ceases, the trunk is held busy at the central office by the final and at the PABX by energization of the high resistance relay JR (Fig. 17) which opens the "*t*" wire circuit, thus preventing the trunk from being picked up by a B-link at the PABX. The energizing circuit of JR may be traced from ground, one winding of DR or SR of the central office, "*a*" wire, back LR, back BR, rectifier S1, back COR (Fig. 17*a*), winding JR (Fig. 17), "*b*" wire, other winding of DR or SR to battery. When the calling subscriber finally hangs up, the condition at the central office changes from that indicated at TD to that indicated at N. With this reversal of polarity, no current flows through rectifier S1 and JR releases.

TWO-WAY AUTOMATIC TIE LINE

Figs. 23 and 24 show a two-way tie line circuit for interconnecting two PABX's, A and B. The method of operation is the same no matter from which end of the tie line the call originates. Each end of the tie line is connected to the banks of the line finders and group selectors of B-links at the two PABX's. At PABX "A," the group selector of a B-link picks up one end of the tie line, and at PABX "B," the line finder of a B-link picks up the other end of the tie line. A register is connected with the B-link at each PABX through an R-link in the usual way.

It is assumed that the tie line number is 7. Whenever this digit is keyed by a station A (Fig. 23), register A is converted to dial pulsing as on an out-trunk call. These pulses are received by the tie line at PABX "B" and converted by the tie line to normal key pulses so as to operate register B in the normal way. The tie line at the receiving end acts as a repeater-translator.

*Station keys tie line digit 7*

When station A removes the handset, an R-link, a B-link and a register are connected to the calling line in the usual way.

When the digit 7 is keyed, the register stores the digit in the usual way and locks up relays XR2 (Fig. 10*b*) and XR3 of the first group of digit storing relays.

*B-link at PABX "A" chooses idle tie line*

The group selector of the selected B-link hunts for a free tie line (Fig. 24) the T-terminal of which has potential PN7 applied over ER, BR, KR, FR back. When a free tie line is found, the register stops the group selector and makes a second test just as it would in case it were selecting a final.

*Register A converted to out-trunking*

When RCR (Fig. 10*a*) makes it front contact, it closes a circuit from ground, brush E of the out-control switch (Fig. 10*b*) terminal 1, front RCR, winding low resistance DRR, front XR2, front XR3, back XR1, back RHR, winding RHR to battery. RHR operates and locks up over a front contact of R1R. As soon as RHR breaks its back contact, DRR releases and RCR short-circuits XR2 and XR3. These relays release and in turn release XHR1. RHR energizes RMR (Fig. 10) which disconnects brushes F and G from the normal selection circuit and in place thereof connects them to the out-trunk dial pulsing circuit.

When RCR releases, P0 goes from position 1 to position 2.

*PABX "A" end of tie line operates*

When the group selector reaches the tie line, the first test over the "*t*" wire may be traced from terminal T (Fig. 24), back FR, back KR, back BR, back ER, resistor to potential PN7. The second test over the "*b*" wire may be traced from the B-terminal, back JR, back BR, second back BR, back ER, resistor to potential PN7.

After the second test, AR (Fig. 24) operates, circuit from ground (Fig. 5), front RR, back FR2, winding low resistance CR2, lower contact ONC2 (Fig. 6), low resistance winding of BR, front BR, back AR, brush C, back KR (Fig. 24), back BR, back FR, back ER, winding of AR to battery. AR applies a momentary impulse of ringing current over the tie line to PABX "B" and closes a circuit from ground, front AR, resistor R, winding of BR to battery. BR opens the circuit of AR and locks up over a front contact and a back contact of KR to the C-terminal. BR disconnects the B-terminal from the T-terminal, disconnects the bridge including relay CR from the tie line. When AR releases and removes ringing current from the tie line, the "*a*" and "*b*" wires are extended through from the A and B terminals of the group selector to the distant PABX "B."

*"B" end of tie line operates*

In tracing the following circuits, one must bear in mind that the B end of the line is a mirror image of the A end shown in Fig. 24.

When relay AR (Fig. 24) applies ringing current to the originating end of the tie line, relay CR of the tie line (Fig. 24) in PABX "B" operates in series with condenser C3 and locks up over a circuit from ground, back FR, front CR, winding CR, winding ER to battery. CR also energizes slow release relay R1R which places a holding shunt across the A and B bank terminals. This circuit may be traced from terminal A, back JR, back HR, resistor R, front R1R, back HR, back JR to the B-terminal. This will hold the register when one is connected to the tie line, as explained hereinafter.

R1R also energizes R2R and magnet P of a marker switch having brushes A and B. The brushes do not advance from position 1 to position 2 until the circuit of P is opened by DR when the latter operates. Contacts "X" and "Y" of the marker switch close as soon as P moves out of its home position 1.

*R-link, B-link and register connected to tie line at PABX "B"*

When ER (Fig. 24) in PABX "B" operates, it energizes the starting circuit (Fig. 3) and places potential PC on the "*t*" wire, circuit from PC (Fig. 24), resistor, front ER, back BR, back KR, back FR to the T-terminal. An R-link at PABX "B" picks up a B-link and then a register, after which the register causes the line finder of the B-link to pick up the tie line exactly as though a station in PABX "B" were calling. The tie line is double-tested in the usual way. When the line finder is connected to the tie line, FR (Fig. 24) operates. The circuit from the C-terminal at the B end of the tie line may be traced over back KR, back BR, back FR, front ER, winding FR to battery. FR locks up to the "*c*" wire and bridges pulsing relay DR across the "*a*" and "*b*" wires. DR operates in series with PR (Fig. 10*a*) of register B and the marker switch goes from position 1 to position 2 when P de-energizes.

The operating circuit of DR (Fig. 24) at PABX "B" may be traced from ground, one winding of DR, front FR, "*b*" wire to PABX "A," back FR, back AR, front BR, back JR, terminal A, brush A of group selector (Fig. 6), thence through the B-link (Fig. 5) and R-link (Fig. 4) to terminal F of register A (Fig. 10), thence front RMR, winding PR (Fig. 10*a*) and in parallel rectifier S1, back RKR, back RUR, front RMR, terminal F, thence through the R and B links to brush B of the group selector, thence terminal B of the tie line (Fig. 24), back JR, front BR, back AR, back FR, "*a*" wire to PABX "B," thence front FR and the other winding of DR to battery. It will be seen that the direction of current flow is such as to operate PR (Fig. 10*a*) of the register.

*Station 1 keys number of station 2*

The subscriber at station 1 (Fig. 23) keys number 635 which we will assume is the number of station 2, and the digits 6, 3 and 5 are recorded and stored by the second, third and first groups of digit-storing relays, respectively, of the register at PABX "A" in the same manner as the first three digits of a city number on an out-trunk call.

*Register A transmits dial pulses to tie line at PABX "B"*

When PR (Fig. 10*a*) of the register operates, it energizes PAR which locks up over a front contact of R1R. PAR connects PR1 in series with rectifier S2 in multiple with PR and S1 but as S2 has the opposite polarity of S1, no current flows through PR1 until pulsing is completed, as explained later. PR (Fig. 10*a*) closes the circuit of RKR and six dial pulses corresponding to the first digit 6 are sent out by RKR exactly as on a city call. The marker switch P (Fig. 24) of the tie line at PABX "B" advances six steps; that is, from position 2 to position 8.

*Conversion of dial-type pulses to key-type pulses*

Brushes A and B of marker switch P (Fig. 24) at PABX "B," as previously stated, are in position 2 when pulsing starts. They may be advanced one to ten steps depending upon the number of pulses sent by the register at A. R2R does not fall off during pulsing but at the end of a series of pulses DR remains on its front contact long enough to allow R2R to make its back contact and to release R3R.

When one pulse is sent by register A, DR advances P to position 3. When R2R makes its back contact, it energizes HR over contact Y, brush A and terminal 3. HR is a long changeover relay and when it breaks its back contacts it releases AR1 (Fig. 10) of the register at B. When it makes its front contacts, it bridges resistor R1 (Fig. 24) across the "*a*" and "*b*" wires leading to register B, and also rectifier S in series with resistor R1. The rectifier is so polarized that the circuit simulates the condition when key 1 (Fig. 12*c*) is depressed.

When brush B of the marker switch (Fig. 24) is advanced two steps to terminal 4, it simulates the condition that exists when key 2 is depressed, and so on. When brushes A and B are advanced six steps, corresponding to the digit 6, resistor R1 is bridged across the register circuit and at the same time the connections of rectifier S are reversed by GR, thus simulating the depression of key 6 at a calling station.

*Register B receives key-type pulses from tie line*

DR (Fig. 24), upon receiving the first series of pulses, sends P to position 6. When R2R releases, it closes a circuit from ground, back R2R, contact "Y" of P, brush A, terminal 8, winding GR, winding HR to battery. As previously explained, the keying condition of digit 6 is simulated and register B receives and stores digit 6, after which it causes the group selector of the B-link in PABX "B" to select a final identified by potential PN6.

R3R (Fig. 24) releases shortly after R2R and returns P to its home position.

The remaining two digits 3 and 5 are received by the register at PABX "B" in the usual way and the chosen final is caused to select station 2.

*Register B releases*

When the third digit is stored, XHR3 (Fig. 10*b*) of register B operates and establishes a circuit from battery, front XHR3, resistor R, back FCR, terminal D, brush D of R-link (Fig. 4), front ER, brush D of B-link finder, terminal D of B-link (Fig. 5), "*t*" wire, back AR of line finder (Fig. 6), brush T, (the "*t*" wire circuit via the group selector is open at the final), terminal T of tie line (Fig. 24), front FR, one winding of KR to ground. KR does not at this moment operate because of the presence of resistor R. However, when the selection of the called line is completed, register B releases and sends the R-link to the ringing or busy position, as the case may be. Full battery is now placed on the "d" wire of the R-link (Fig. 5) or the "t" wire of the tie line (Fig. 24) over either interrupter FI1 or FI2. This full battery operates KR (Fig. 24) which locks up to the "c" wire over a second winding, at the same time releasing FR and energizing BR. JR does not operate as it does at the originating PABX "A" since KR has opened its operating circuit.

A momentary holding circuit is now established from the bridge in register A to the bridged relays GR1 (Fig. 4) and GR2 in the R-link at PABX "B."

*Register A and R-link at PABX "A" release*

During pulsing the direction of current flow in the "a" and "b" wires from DR (Fig. 24) at PABX "B" to PABX "A" is such as to operate relay PR (Fig. 10) of register A. However, when FR (Fig. 24) is released, the direction of current flow in the "a" and "b" wires is reversed and current now flows from the G-terminal (Fig. 10) of register A to the F-terminal and consequently over front PAR, winding PR1 and rectifier S2. PR1 operates RUR which releases the register as on an out-trunk call.

*Holding shunt placed on tie line at PABX "A"*

RUR places full battery on the "d" wire of the R-link which is transmitted through the R and B links and group selector to the "t" wire of the tie line (Fig. 24) and energizes JR, which relay did not operate when XHR3 (Fig. 10) placed battery on the "d" wire through resistor R. The circuit from the T-terminal may be traced via back FR (Fig. 24), back KR, front BR, back AR, winding JR to ground. JR locks up over a front contact and a front contact of BR, at the same time disconnecting itself from the "t" wire. JR removes the short-circuit from transmission condensers C1 and C2 and places the holding retardation coil shunt across the originating end of the tie line, thus holding the R-link and subsequently the B-link busy at PABX "B." Condensers C1 and C2 prevent a flow of current from the transmission relays S1R and S2R in the B-link (Fig. 5) at PABX "A." The tie line circuit is operated and maintained on a full metallic basis.

*Called station 2 answers*

When the called station 2 answers, the R-link at PABX "B" releases in the usual manner and the tie line connection is established through the B-links at PABX's "A" and "B."

*Release*

The release of the connection is always under the control of the originating station; that is, station A of PABX "A." When this station hangs up, the B-link releases in the usual manner and frees the tie line; whereupon BR and JR (Fig. 24) release and remove shunt from the tie line. Supervisory relay S1R of the B-link at PABX "B" falls away and releases the connection at the distant PABX.

What I claim is:

1. In a telephone system, a PABX having stations and city trunks, a two-conductor line leading to each station, means including automatic selector switches for establishing local and trunk connections, a controller at each station and comprising a plurality of different resistances and keys adapted momentarily to bridge one of the resistances across the line wires when a key is depressed representative of a digit of the called number for controlling the operation of the selectors, means responsive to the connection of a certain one of the resistances at the station connected with a trunk for initiating the establishment of a connection over selector switches to a second PABX station, means operative thereupon in response to the connection of resistances corresponding to the number of the second PABX station for establishing the connection to the second PABX station and means responsive to a subsequent connection of said certain resistance for releasing the last-mentioned connection with said second PABX station.

2. In a telephone system, a PABX having stations and city trunks, lines leading to the stations, means including normally inactive line finder and selector switches for establishing local and trunk connections, controllers at the PABX stations operable in accordance with the digits of called numbers for controlling the operation of the selector switch, a source of potentials, terminal banks for said line finders in which lines leading to the PABX stations and said trunks terminate, means responsive to said potentials upon the initiation of a call at a station and on a trunk for taking into use a line finder and operating to select the terminals of the calling line or trunk, a plurality of normally inactive transfer links operative when selected to control the establishing of a connection between two PABX stations one of which is engaged in a trunk call, means responsive to the actuation in accordance with a predetermined digit of the controller at a PABX station engaged in a trunk call for holding said trunk, applying to the terminals thereof the calling potential, and selecting an idle one of said transfer links, and means for taking into use an idle line finder.

3. In a telephone system, a PABX having stations and city trunks, lines leading to the stations, means including normally inactive line finder and selector switches for establishing local and trunk connections, said switches having terminal banks and wipers cooperating therewith, local links interconnecting the selector and finder wipers in pairs, said lines and trunks terminating in the banks of the finders to which they are multipled, controllers at the PABX stations operable in accordance with the digits of called numbers, means operable upon the initiation of a call at a station for selecting a local link, a source of potentials, means responsive to said potentials for operating upon the initiation of a call at a station and on a trunk for operating the line finder of the selected local link to select the terminals of the calling line or trunk, means responsive to the operation of the controller at the calling station for controlling the numerical operation of the selector switch connected with the local link to connect the calling station to a called station or trunk, a plurality of transfer links for operation when selected to control the establishing of connection between two PABX stations one of which is engaged in a trunk call, means responsive to the actuation in accordance with a predetermined digit of the controller at a PABX station engaged in a trunk call for holding said trunk, means for applying to the terminals of the trunk held the calling potential, means also responsive to said digit for selecting an idle transfer link, means operative thereupon for selecting a second idle local link, and means for operating the finder of the last-mentioned local link for connecting it with the terminals of the trunk held.

4. The system according to claim 3, and means responsive to the actuation of the controller in accordance with said predetermined digit at the calling PABX station connected with the transfer link for releasing the second local link.

5. The system according to claim 3, and means responsive to the actuation of the controller in accordance with a certain other digit at the calling PABX for connecting the second local link with the trunk and disconnecting the first local link.

6. The system according to claim 3, a plurality of normally inactive registers operable in accordance with the setting of the controllers and adapted to control the operation of the selector of the local link employed, a register link selectable upon the initiation of a call on a station or trunk for taking into use an idle register and connecting it with the selected local link, and means operative upon the selection of a transfer link for taking into use an idle register and connecting it with said second local link.

7. In a telephone system, a PABX having stations and city trunks, means including switching means and local links for establishing local and trunk connections, means including a transfer link for connecting a PABX station connected with a trunk to another PABX station over a local link, a first relay in each trunk, contacts over which the trunk wires are connected controlled by said first relay, a cut-off relay in each trunk connected in series with said first relay, means controlled in the local link connected with a trunk and connected to said relays for operating only the cut-off relay, and means in the transfer link connected to said relays to control the operation of the first relay.

8. In a telephone system, a PABX having stations and city trunks, switching means for establishing local and trunk connections, a normally inactive transfer link, means for taking into use the transfer link for connecting a PABX station connected with a trunk to another PABX station while holding the trunk, a low resistance relay associated with each trunk, contacts controlled by said relay over which the trunk wires are connected, a high resistance cut-off relay in each trunk connected in series with said relay, means operative upon the taking into use of the transfer link and connected to said relays for increasing the flow of current through said relays to operate the low resistance relay, and means responsive to the release of the transfer link for de-energizing said low resistance relay while maintaining the cut-off relay energized.

9. In a telephone system, a PABX having a plurality of stations and outside trunks, means including automatic switching means for establishing local and trunk connections as well as transfer connections, means including a controller at each station operable in accordance with the digits of the called number for controlling the operation of the switching means, means responsive to the predetermined digital operation of the controller at a station engaged in a trunk connection for opening the trunk connection, holding the trunk and initiating the establishment of a transfer connection, and means responsive to the busy condition of the station called for re-establishing the trunk connection.

10. In a telephone system, a PABX having stations and two-wire city trunks, automatic selector switches in the PABX, a controller at each PABX station operable in accordance with the digits of the called number, means including the controller at a calling station for interconnecting a station with another PABX station or with a trunk, means including said automatic switches for establishing a connection between a PABX station connected with a trunk and also a transfer call with a second PABX station while holding the trunk, a normally inactive transfer link for controlling the establishment of transfer calls, means for selecting the transfer link by a predetermined digital operation of the controller at a PABX station connected with the trunk, a relay associated with the trunk for opening its two wires while the trunk is so held, means for preventing the establishment of a connection with a busy PABX station, means in the transfer link for signaling the calling station of the busy condition, and means in the transfer link responsive to the busy condition of a called station for operating said relay so as to close the two wires of the trunk.

11. In a telephone system, a PABX having stations and city trunks, a two-conductor line leading to each station, means including automatic selector switches for establishing local and trunk connections, a controller at each station and comprising a plurality of different resistances and keys adapted momentarily to bridge one of the resistances at a time across the line wires in accordance with the digits of the called number for controlling the operation of the selectors, means responsive to the connection of a certain one of the resistances at the station connected with a trunk for initiating the establishment of a connection over selector switches to a second PABX station, means operative thereupon in response to the connection of resistances corresponding to the number of the second PABX station for establishing the connection to the second PABX station, and means responsive to the subsequent connection of a certain other resistance across the line wires by the operation of a key for connecting the second PABX station with the trunk and releasing the connection between the first-mentioned PABX station and the trunk.

12. In a telephone system, a PABX having stations and city trunks, a controller at each station operable in accordance with the digits of a desired number, automatic switches including line finders and selectors for establishing local and trunk connections, a local link connecting each finder with a selector, a plurality of registers, means in the register including an electrical discharge device in each register operated by the controller of the calling station to control the operation of a selector, a register link operative upon the initiation of a call for connecting an idle register with a local link, means for releasing said register link and the connected register upon the completion of the desired connection, means including the discharge device in a connected register and responsive to a predetermined digital actuation of the controller at a calling station for controlling the selector connected with the selected local link for connecting the station with an idle trunk, a normally inactive transfer link adapted to connect an idle one of said registers with a second local link, means responsive to a predetermined different digital actuation of the controller at a station connected with a trunk for operating said transfer link, means operative thereupon under the control of the controller of the last-mentioned station to control through the register the establishment of a connection over the second local link with a desired station, means operative thereupon for releasing the register, means in the transfer link responsive to a repetition of the first mentioned digital actuation of the controller at the last-mentioned station for connecting said trunk over the second local link with said desired station, and means operative thereupon for releasing the transfer link and the first local link.

13. In a telephone system, a PABX having stations and city trunks, a two-wire line leading to each station, a key set at each station operable in accordance with the digits of a desired number, a D. C. source at the PABX, a plurality of different resistances at each station adapted to be variably bridged across the line leading thereto for establishing D. C. potentials on the line characteristic of the operated key, automatic switches including line finders and selectors having wipers and terminals for establishing local and trunk connections, a local link connecting the wipers of each finder with the wipers of a selector, a plurality of registers, means in the register including an electrical discharge device in each register variably operated depending on the potential applied at the calling station to control the operation of a selector, a register link operative upon the initiation of a call for connecting an idle register with a local link, means for releasing said register link and the connected register upon the completion of the desired connection, means including the discharge device in a connected register and responsive to the actuation of a predetermined one of said keys at a calling station for controlling the selector to connect the calling station with an idle trunk, a normally inactive transfer link adapted to connect an idle one of said registers with a second local link, means responsive to the actuation of a predetermined other one of the keys at a station connected with a trunk for operating said transfer link, means operative thereupon under the control of the key set of the last-mentioned station to control through the register the establishment of a connection over the second local link with a desired station, means operative thereupon for releasing the register, means including an electrical discharge device in the transfer link and responsive to the following actuation of said predetermined key at the last-mentioned station for connecting said trunk over the second local link with said desired station, and means operative thereupon for releasing the transfer link and the first local link.

14. In a telephone system, two offices, inter-office trunks, stations at the offices, switching means for establishing intra- and inter-office talking connections, a source of current, a relay associated with the switching means to supply talking current from said source for intra-office connections, a relay associated with each trunk to supply talking current from said source for inter-office connections, a transfer link at an office for controlling the establishment of intra-office connections between stations one of which is in an inter-office connection over a trunk, and a relay associated with the transfer link to supply talking current from said source for a connection established through its agency.

15. The system according to claim 14, and means for operating the relay associated with the trunk when the transfer link is taken into use to disconnect the current supply from the talking circuit.

16. The system according to claim 14, and means for preventing the operation of the relay associated with the switching means when the transfer link is taken into use.

17. In a telephone system, a PABX having stations and city trunks, a controller for each station variably operated in accordance with the digits of the called number, means including selector switches variably operable depending on the operation of the controller of the calling station for establishing local and trunk connections, said selector switches including pairs of line finders and selectors interconnected by a link, means responsive upon the initiation of a call on a station for selecting a link, an operator's position associated with said trunks and having a supervisory lamp for each trunk, a listening key and a listening key relay for each trunk, a control relay for each supervisory lamp arranged to prepare it for one of two distinct operations, a circuit for the listening key relay of each trunk including a contact of said control relay, means responsive to the actuation in accordance with a predetermined two-digit number of the controller at a station engaged in a connection for selecting a second link and therethrough one of said trunks, means operative thereupon for actuating said control relay, and means operative upon the subsequent actuation of the listening key associated with the selected trunk for releasing said control relay and the second link.

18. In a telephone system, a PABX having stations, a city exchange, inter-exchange trunks, automatic selector switches at both exchanges, an impulse controller at each PABX station operable in accordance with the digits of the called number, a register at the PABX, a source of different D. C. potentials at the PABX, means in the register for selecting a potential in accordance with the operation of the controller at the calling station, means dependent on the potential selected in the register for controlling the operation of a selector at the PABX, an impulse sender in the register, means in the register for variably operating the impulse sender depending on the potentials selected in the register, means in the register actuated when the calling station's controller is operated in accordance with a predetermined digit to select a trunk, and a relay in the register operated thereupon for connecting the impulse sender with the selected trunk.

19. The system according to claim 18, in which said relay responds to current flowing in a given direction, and means in the selected trunk for controlling the direction of current flow in the circuit of said relay.

20. In an automatic telephone exchange system, a plurality of lines, a plurality of stages of automatic switches for interconnecting calling and called lines, a plurality of normally inactive registers, means operative upon the initiation of a call for seizing an idle register and then operating it in accordance with the digits of the called number, a control circuit established from the register towards said switches successively to control them in accordance with said digits, and means responsive to the reversal of current in said control circuit for releasing the operated register upon the completion of its control of the switches in accordance with any digit.

21. In a telephone system, a plurality of exchanges having lines and inter-exchange trunks, means including automatic selector switches in each exchange for establishing intra- and inter-exchange connections, a register in each exchange, means operative upon the initiation of a call in an exchange for taking into use the local register, means controlled by the register taken into use for controlling local and inter-exchange selecting operations, means operable upon the completion of the desired connection for releasing the register taken into use, and means for releasing at any time the register taken into use by reversing the direction of current flow over the trunk line selected under the control of the register.

22. In a telephone system, a private and a main automatic exchange, each comprising a plurality of stages of switches for establishing connections, lines terminating at said exchanges, inter-exchange trunks, a plurality of normally inactive registers at the private exchange arranged to control the setting of said switches, a private exchange operator's position, controllers at the position and at each private exchange line for operating the register in accordance with the digits of the called number, means operable upon the initiation of a call on a private exchange line for taking into use a register, automatic means for releasing the register when the called private exchange line is selected, means responsive to the operation of a register in accordance with a predetermined digit to control the selection of the operator's position, automatic means operative thereupon for releasing the register, and automatic means for releasing the register upon the selection of a line at the main exchange.

23. In a telephone exchange system, a plurality of stations, automatic line finder and selector switches, means controlled by a calling station for operating said switches to establish a desired connection, a source of potentials, at least one of which characterizes restricted service, means operating upon the initiation of a call for applying one of said potentials to the calling station terminal of one of said line finder switches characteristic of the class of service to which the calling station is entitled, means for operating said line finder switch and stopping it when said terminal is reached, an operator's position, and means responsive to the potential characterizing restricted service for connecting the calling line over said selector switches to said operator's position.

24. The system according to claim 23, and an operator's key for changing the characteristic potential of a line.

25. In a telephone system, a PABX, a city exchange, a plurality of lines terminating at each exchange, a line relay and a numerically operable controller for each PABX line, trunks interconnecting said exchanges, an operator's position at the PABX, selector means at the PABX, a register operable by the controller of a calling line for operating the selector means to establish a connection with any one of the PABX lines or a trunk, a source of D. C. potentials, means for applying a characteristic potential from said source to the front contacts of the line relays of lines entitled only to service restricted to the PABX, means operative for establishing a connection between a calling PABX line and the register, means for applying said potential through said connection to the register, a relay in said register, and means controlled by the relay for adjusting the register to control the selector means to connect the restricted calling PABX line with said operator's position whenever it operates the register to control the selection of one of said trunks.

26. The telephone system according to claim 25, and in which an electrical discharge device in the register is responsive to said characteristic potential and controls the associated relay.

27. In a telephone system, a PABX, a city exchange, a plurality of stations in the PABX, trunks interconnecting the exchanges, automatic selector switches including line finders having terminals in which lines leading to said stations terminate, means controlled by a calling station for operating said selector switches to extend a connection to a called station or to one of said trunks, an operator's position at the PABX, a line relay for each line and operable upon the initiation of a call thereon for starting the establishment of said connection, a source of D. C. potentials, a key for the operator for connecting a first or a second potential to the line relay front contact from said source, means responsive to the first potential only for controlling the selector to connect the calling line to whose line relay the potential is connected to select the operator's position when controlled by the subscriber to select one of said trunks.

28. In a telephone system, a PABX having city trunks and a plurality of lines, a plurality of local links in the PABX, line finders and selectors having wipers and terminals, the wipers of each finder being connected with those of a selector over a local link, a line relay for each line arranged when energized to connect a characteristic potential to a line finder terminal, a normally inactive register in the PABX, a controller at each line adapted for variable operation in accordance with the digits of the called number, a source of D. C. potentials, means responsive to the controller to apply different potentials to the register, a plurality of multi-electrode discharge devices in the register, means responsive to the initiation of a call for selecting a local link and operating its line finder to connect the register with the calling line, means including the controller of the calling line for applying a characteristic potential to one electrode of each device over a line finder wiper and a front contact of the calling line relay, means for operating one device when one, and a second when another characteristic potential is applied by the calling line relay, means for stopping the line finder on the calling line when either of the last-mentioned devices is operated, means controlled by the controller of the calling line for applying over the calling line variable potentials to the one electrode of the devices depending on the called number, means including the selector of the selected local link for connecting the calling with the called line or trunk under the control of the register, an operator's position accessible through said selector, and means including said selector and controlled by the register for connecting the calling line with said operator's position when the controller is operated to actuate the register in accordance with the designation of a city trunk.

29. In a telephone system, a PABX having city trunks and a plurality of stations, a two-wire line leading to each station, a plurality of local links in the PABX, line finders and selectors having wipers and terminals, the wipers of each finder being connected with those of a selector over a local link, a line relay for each line arranged when energized to connect a characteristic potential to a line finder terminal, a normally inactive register in the PABX, a controller at each station adapted for variable operation in accordance with the digits of the called number, a source of D. C. potentials, means responsive to the controller to apply different potentials to the register.

a first, a second and a third pair of triodes in the register, means responsive to the initiation of a call for selecting a local link and operating its line finder to connect the register with the calling station, means including the controller of the calling station for applying a characteristic potential to the grid of a triode in each pair over a line finder wiper and a front contact of the calling line relay, means for operating one pair of triodes when one, and a second pair of triodes when another characteristic potential is applied by the calling line relay, means for stopping the line finder on the calling line when either of the last-mentioned pairs of triodes is operated, means controlled by the controller of the calling station for applying over the calling line variable potentials to the grids of the triodes depending on the called number, means including the selector of the selected local link for connecting the calling with the called station or trunk under the control of the register, an operator's position at the PABX accessible through said selector, and means including said selector and controlled by the register for connecting the calling station with said operator's position whenever the controller is operated to actuate the register in accordance with the designation of a city trunk.

30. In an automatic telephone exchange system, a plurality of lines, means including selectively operable switches and a register controlling them for connecting a calling with a called line, each switch having wipers cooperating with sets of terminals, sources of different potentials representing said sets of terminals, potential comparing means in the register operable only when two potentials simultaneously connected thereto bear a predetermined relationship to one another, means controlled by the comparing means for seizing a set of terminals by a switch, means in the register for applying any potential to the comparing means, means in a switch for applying a potential representing a set of terminals to said comparing means, means operative thereupon for applying a second time a potential representing said set of terminals to the comparing means, and means operable only upon two successive operations of said comparing means for causing the seizure of a set of terminals by a switch.

31. The telephone system according to claim 30, and in which at least one of the switches is a line finder having a calling line terminating in its sets of terminals and a trunk in its wipers.

32. The telephone system according to claim 30, and in which at least one of the switches is a group selector having trunks terminating in its wipers and in its sets of terminals.

33. The telephone system according to claim 30, and in which one of said switches is a final selector.

34. The telephone system according to claim 30, and in which the comparing means comprises electrical discharge devices having electrodes to which said potentials are applied.

35. The telephone system according to claim 30, and in which means are provided in said switches for first applying said potential via one wiper and the second time via a second wiper of the switch.

36. The telephone system according to claim 35, and in which the comparing means comprises two electrical discharge devices, each having electrodes, and means to apply the potential over the first wiper to an electrode of one device and over the second wiper to an electrode of the second device.

37. The telephone system according to claim 36, and in which each electrical discharge device comprises a pair of tubes having electrodes to which the means in the register applies potentials, and means jointly controlled by the two pairs of devices to operate the means for causing seizure by the switch of a set of terminals.

38. The telephone system according to claim 30, and in which the two potentials successively applied in a switch are different, and means in the comparing means selectively responsive to the different potentials.

39. In an automatic telephone exchange system, a plurality of lines, means including selectively operable switches and a register controlling them for connecting a calling with a called line, said switches including a line finder having a plurality of wipers cooperating with sets of terminals, sources of different potentials representing said sets of terminals, potential comparing means in the register operable only when the connected potentials bear a predetermined relationship to one another to select a set of terminals, means in the register for applying any potential to the comparing means, means associated with calling lines for applying potentials to its sets of terminals representing the class of service to which the line is entitled and the calling or non-calling condition of the line, means in the line finder for applying the class of service potential over a first wiper, means operative thereupon for applying the calling potential over a second wiper, and means operable only upon the operation of said comparing means in response to both the class of service and calling potentials for causing the seizure of the terminal set of the calling line by the line finder.

40. The automatic telephone system according to claim 39, and means in the potential comparing means responsive to certain class-of-service potential for preventing the establishment of a connection from the calling line to certain called lines.

41. The automatic telephone system according to claim 39, in which the potential comparing means comprises three electrical discharge devices, a circuit for operating the first discharge device when a certain class of service potential is applied, a circuit for operating the second discharge device when a different class of service potential is applied, a circuit for operating the third discharge device when the calling potential is applied, circuits controlled jointly by the third device and either the first or second device for operating the line finder to seize the calling line, and circuits controlled by the second device for preventing the establishment of a connection from the calling line to certain called lines.

42. In an automatic telephone exchange system, a plurality of lines, means including a selectively operable switch for connecting a calling with a called line, said switch having wipers cooperating with sets of terminals, sources of different potentials representing said sets of terminals, multi-electrode electrical discharge devices operable only when two potentials simultaneously applied thereto bear a predetermined relationship to one another, means controlled by said discharge devices for seizing a set of terminals by the switch, means for applying any desired potential to one electrode and for simultaneously applying via the switch to another electrode a potential representing a set of terminals, means operative thereupon for applying via the switch a second time a potential representing said set of terminals to an electrode and simultaneously a desired potential to another electrode, and means operable only upon two successive operations of the discharge device for causing the seizure of a set of terminals by the switch.

43. The telephone system according to claim 42, and in which the switch is a line finder having a calling line terminating in its sets of terminals.

44. The telephone system according to claim 42, and in which the switch is a group selector having trunks terminating in its wipers and in its sets of terminals.

45. The telephone system according to claim 42, and in which said switch is a final selector.

46. The telephone system according to claim 42, and in which means are provided in said switch for first applying a potential via one wiper and the second time via a second wiper of the switch.

GERALD DEAKIN.

REFERENCES CITED

The following references are of record in the file of this patent:

UNITED STATES PATENTS

| Number | Name | Date |
|---|---|---|
| 1,256,126 | Goodrum | Feb. 12, 1918 |
| 1,492,995 | Lubberger | May 6, 1924 |
| 1,627,929 | Richardson | May 10, 1927 |
| 1,721,748 | Richardson et al. | July 23, 1929 |
| 2,040,291 | Bonomi | May 19, 1936 |
| 2,041,083 | Myers | May 19, 1936 |
| 2,242,776 | Clark | May 20, 1941 |
| 2,289,895 | Abbott | July 14, 1942 |
| 2,335,481 | Boswau | Nov. 30, 1943 |
| 2,374,072 | Beaumont | Apr. 17, 1945 |
| 2,376,346 | Deakin | May 22, 1945 |
| 2,380,950 | Deakin | Aug. 7, 1945 |
| 2,381,727 | Deakin | Aug. 7, 1945 |